US009218567B2

(12) United States Patent
Macready et al.

(10) Patent No.: US 9,218,567 B2
(45) Date of Patent: Dec. 22, 2015

(54) QUANTUM PROCESSOR BASED SYSTEMS AND METHODS THAT MINIMIZE AN OBJECTIVE FUNCTION

(75) Inventors: William G. Macready, West Vancouver (CA); Mani Ranjbar, Burnaby (CA); Firas Hamze, Vancouver (CA); Geordie Rose, Vancouver (CA); Suzanne Gildert, Vancouver (CA)

(73) Assignee: D-WAVE SYSTEMS INC., Burnaby, BC (CA)

( * ) Notice: Subject to any disclaimer, the term of this patent is extended or adjusted under 35 U.S.C. 154(b) by 5 days.

(21) Appl. No.: 13/806,404

(22) PCT Filed: Jul. 6, 2012

(86) PCT No.: PCT/US2012/045843
§ 371 (c)(1),
(2), (4) Date: Mar. 13, 2014

(87) PCT Pub. No.: WO2013/006836
PCT Pub. Date: Jan. 10, 2013

(65) Prior Publication Data
US 2014/0187427 A1 Jul. 3, 2014

Related U.S. Application Data

(60) Provisional application No. 61/505,044, filed on Jul. 6, 2011, provisional application No. 61/515,742, filed on Aug. 5, 2011, provisional application No. 61/540,208, filed on Sep. 28, 2011, provisional application No.

(Continued)

(51) Int. Cl.
*G06N 3/12* (2006.01)
*G06N 5/02* (2006.01)

(Continued)

(52) U.S. Cl.
CPC . *G06N 5/02* (2013.01); *B82Y 10/00* (2013.01); *G06N 99/002* (2013.01); *G06N 3/00* (2013.01); *G06N 3/12* (2013.01)

(58) Field of Classification Search
None
See application file for complete search history.

(56) References Cited

U.S. PATENT DOCUMENTS 7,135,701 B2 11/2006 Amin et al.
7,418,283 B2 8/2008 Amin (Continued)

FOREIGN PATENT DOCUMENTS

WO 2012/064974 A2 5/2012

OTHER PUBLICATIONS

Balicki, An Adaptive Quantum-based Evolutionary Algorithm for Multiobjective Optimization, WSEAS Transactions on Systems and Control, Issue 12, vol. 4, Dec. 2009, pp. 603-612.*

(Continued)

*Primary Examiner* — Wilbert L Starks
(74) *Attorney, Agent, or Firm* — Seed IP Law Group PLLC

(57) ABSTRACT

Quantum processor based techniques minimize an objective function for example by operating the quantum processor as a sample generator providing low-energy samples from a probability distribution with high probability. The probability distribution is shaped to assign relative probabilities to samples based on their corresponding objective function values until the samples converge on a minimum for the objective function. Problems having a number of variables and/or a connectivity between variables that does not match that of the quantum processor may be solved. Interaction with the quantum processor may be via a digital computer. The digital computer stores a hierarchical stack of software modules to facilitate interacting with the quantum processor via various levels of programming environment, from a machine language level up to an end-use applications level.

127 Claims, 14 Drawing Sheets

Related U.S. Application Data

61/550,275, filed on Oct. 21, 2011, provisional application No. 61/557,783, filed on Nov. 9, 2011, provisional application No. 61/569,023, filed on Dec. 9, 2011, provisional application No. 61/636,309, filed on Apr. 20, 2012, provisional application No. 61/666,545, filed on Jun. 29, 2012.

(51) Int. Cl.
*G06N 99/00* (2010.01)
*B82Y 10/00* (2011.01)
*G06N 3/00* (2006.01)

(56) References Cited

U.S. PATENT DOCUMENTS

| | | | |
|---|---|---|---|
| 7,533,068 B2 | 5/2009 | Maassen van den Brink et al. |
| 7,876,248 B2 | 1/2011 | Berkley et al. |
| 7,984,012 B2 | 7/2011 | Coury et al. |
| 8,008,942 B2 | 8/2011 | van den Brink et al. |
| 8,035,540 B2 | 10/2011 | Berkley et al. |
| 8,073,808 B2 | 12/2011 | Rose |
| 8,169,231 B2 | 5/2012 | Berkley |
| 8,174,305 B2 | 5/2012 | Harris |
| 8,175,995 B2 | 5/2012 | Amin |
| 8,190,548 B2 | 5/2012 | Choi |
| 8,195,596 B2 | 6/2012 | Rose et al. |
| 2008/0052055 A1 | 2/2008 | Rose et al. |
| 2008/0109500 A1 | 5/2008 | Macready et al. |
| 2008/0176750 A1 | 7/2008 | Rose et al. |
| 2008/0260257 A1 | 10/2008 | Rose |
| 2008/0313114 A1 | 12/2008 | Rose |
| 2009/0121215 A1 | 5/2009 | Choi |
| 2009/0167342 A1 | 7/2009 | van den Brink et al. |
| 2011/0022820 A1 | 1/2011 | Bunyk et al. |
| 2011/0060710 A1 | 3/2011 | Amin |
| 2011/0238607 A1 | 9/2011 | Coury et al. |
| 2012/0023053 A1 | 1/2012 | Harris et al. |
| 2013/0282636 A1* | 10/2013 | Macready et al. ............... 706/46 |

OTHER PUBLICATIONS

Aghaei et al., "A Hybrid Algorithm for the shortest-path problem in the graph," Proceedings of the 2008 International Conference on Advanced Computer Theory and Engineering, Dec. 20, 2008, pp. 251-255.

Amin, "Effect of Local Minima on Adiabatic Quantum Optimization," arXiv:0709.0528v2 [quant-ph] Apr. 4, 2008, 4 pages.

Macready, W., "Methods for Solving Computational Problems Using a Quantum Processor," U.S. Appl. No. 13/300,169, filed Nov. 18, 2011, 49 pages.

International Search Report, mailed Nov. 28, 2012, for PCT/US2012/045843, 5 pages.

Written Opinion, mailed Nov. 28, 2012, for PCT/US2012/045843, 6 pages.

\* cited by examiner

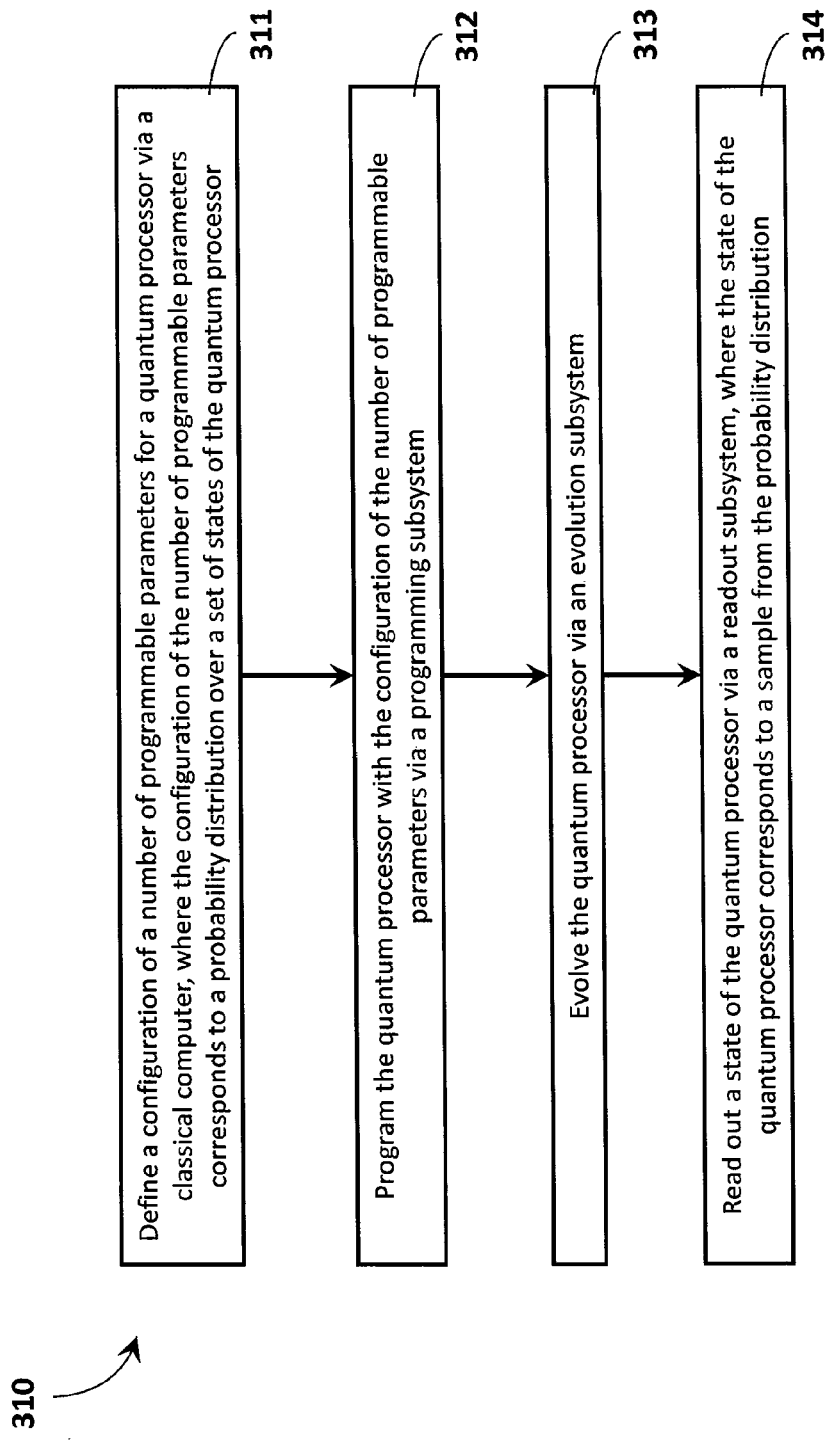

QUANTUM PROCESSOR BASED SYSTEMS AND METHODS THAT MINIMIZE AN OBJECTIVE FUNCTION

CROSS REFERENCE TO RELATED APPLICATIONS

This application is a U.S. national stage application filed under 35 U.S.C. §371 of International Patent Application PCT/US2012/045843, accorded an international filing date of Jul. 6, 2012, which claims benefit under 35 U.S.C. 119(e) of U.S. Provisional Patent Application Ser. No. 61/505,044, filed Jul. 6, 2011; U.S. Provisional Patent Application Ser. No. 61/515,742, filed Aug. 5, 2011; U.S. Provisional Patent Application Ser. No. 61/540,208, filed Sep. 28, 2011; U.S. Provisional Patent Application Ser. No. 61/550,275, filed Oct. 21, 2011; U.S. Provisional Patent Application Ser. No. 61/557,783, filed Nov. 9, 2011; U.S. Provisional Patent Application Ser. No. 61/569,023, filed Dec. 9, 2011; U.S. Provisional Patent Application Ser. No. 61/636,309, filed Apr. 20, 2012; and U.S. Provisional Patent Application Ser. No. 61/666,545, filed Jun. 29, 2012, each of which is incorporated herein by reference in its entirety.

BACKGROUND

Field

The present systems and methods generally relate to use of quantum processors, and particularly relate to the use of quantum processors to minimize an objective function.

Adiabatic Quantum Computation

Adiabatic quantum computation typically involves evolving a system from a known initial Hamiltonian (the Hamiltonian being an operator whose eigenvalues are the allowed energies of the system) to a final Hamiltonian by gradually changing the Hamiltonian. A simple example of an adiabatic evolution is given by:

$$H_e = (1-s)H_i + sH_f$$

where $H_i$ is the initial Hamiltonian, $H_f$ is the final Hamiltonian, $H_e$ is the evolution or instantaneous Hamiltonian, and s is an evolution coefficient which controls the rate of evolution. As the system evolves, the evolution coefficient s goes from 0 to 1 such that at the beginning (i.e., s=0) the evolution Hamiltonian $H_e$ is equal to the initial Hamiltonian $H_i$ and at the end (i.e., s=1) the evolution Hamiltonian $H_e$ is equal to the final Hamiltonian $H_f$. Before the evolution begins, the system is typically initialized in a ground state of the initial Hamiltonian $H_i$ and the goal is to evolve the system in such a way that the system ends up in a ground state of the final Hamiltonian $H_f$ at the end of the evolution. If the evolution is too fast, then the system can be excited to a higher energy state, such as the first excited state. In the present systems and methods, an "adiabatic" evolution is considered to be an evolution that satisfies the adiabatic condition:

$$\dot{s}|\langle 1|dH_e/ds|0\rangle| = \delta g^2(s)$$

where $\dot{s}$ is the time derivative of s, g(s) is the difference in energy between the ground state and first excited state of the system (also referred to herein as the "gap size") as a function of s, and $\delta$ is a coefficient much less than 1.

The evolution process in adiabatic quantum computing may sometimes be referred to as annealing. The rate that s changes, sometimes referred to as an evolution or annealing schedule, is normally slow enough that the system is always in the instantaneous ground state of the evolution Hamiltonian during the evolution, and transitions at anti-crossings (i.e., when the gap size is smallest) are avoided. Further details on adiabatic quantum computing systems, methods, and apparatus are described in, for example, U.S. Pat. No. 7,135,701 and U.S. Pat. No. 7,418,283.

Quantum Annealing

Quantum annealing is a computation method that may be used to find a low-energy state, typically preferably the ground state, of a system. Somewhat similar in concept to classical annealing, the method relies on the underlying principle that natural systems tend towards lower energy states because lower energy states are more stable. However, while classical annealing uses classical thermal fluctuations to guide a system to its global energy minimum, quantum annealing may use quantum effects, such as quantum tunneling, to reach a global energy minimum more accurately and/or more quickly than classical annealing. It is known that the solution to a hard problem, such as a combinatorial optimization problem, may be encoded in the ground state of a system Hamiltonian (e.g., the Hamiltonian of an Ising spin glass) and therefore quantum annealing may be used to find the solution to such a hard problem. Adiabatic quantum computation may be considered a special case of quantum annealing for which the system, ideally, begins and remains in its ground state throughout an adiabatic evolution. Thus, those of skill in the art will appreciate that quantum annealing systems and methods may generally be implemented on an adiabatic quantum computer, and vice versa. Throughout this specification and the appended claims, any reference to quantum annealing is intended to encompass adiabatic quantum computation unless the context requires otherwise.

Quantum annealing uses quantum mechanics as a source of disorder during the annealing process. The optimization problem is encoded in a Hamiltonian $H_P$, and the algorithm introduces strong quantum fluctuations by adding a disordering Hamiltonian $H_D$ that does not commute with $H_P$. An example case is:

$$H_E = H_P + \Gamma H_D,$$

where $\Gamma$ changes from a large value to substantially zero during the evolution and $H_E$ may be thought of as an evolution Hamiltonian similar to $H_e$ described in the context of adiabatic quantum computation above. The disorder is slowly removed by removing $H_D$ (i.e., reducing $\Gamma$). Thus, quantum annealing is similar to adiabatic quantum computation in that the system starts with an initial Hamiltonian and evolves through an evolution Hamiltonian to a final "problem" Hamiltonian $H_P$ whose ground state encodes a solution to the problem. If the evolution is slow enough, the system will typically settle in the global minimum (i.e., the exact solution), or in a local minimum close to the exact solution. The performance of the computation may be assessed via the residual energy (distance from exact solution using the objective function) versus evolution time. The computation time is the time required to generate a residual energy below some acceptable threshold value. In quantum annealing, $H_P$ may encode an optimization problem and therefore $H_P$ may be diagonal in the subspace of the qubits that encode the solution, but the system does not necessarily stay in the ground state at all times. The energy landscape of $H_P$ may be crafted so that its global minimum is the answer to the problem to be solved, and low-lying local minima are good approximations.

The gradual reduction of $\Gamma$ in quantum annealing may follow a defined schedule known as an annealing schedule. Unlike traditional forms of adiabatic quantum computation where the system begins and remains in its ground state throughout the evolution, in quantum annealing the system may not remain in its ground state throughout the entire annealing schedule. As such, quantum annealing may be implemented as a heuristic technique, where low-energy states with energy near that of the ground state may provide approximate solutions to the problem.

Quantum Processor

A quantum processor may take the form of a superconducting quantum processor. A superconducting quantum processor may include a number of qubits and associated local bias devices, for instance two or more superconducting qubits. A superconducting quantum processor may also employ coupling devices (i.e., "couplers") providing communicative coupling between qubits. Further details and embodiments of exemplary quantum processors that may be used in conjunction with the present systems and methods are described in, for example, U.S. Pat. Nos. 7,533,068, 8,008,942, US Patent Publication 2008-0176750 (now U.S. Pat. No. 8,195,596), US Patent Publication 2009-0121215 (now U.S. Pat. No. 8,190,548), and US Patent Publication 2011-0022820.

The types of problems that may be solved by any particular embodiment of a quantum processor, as well as the relative size and complexity of such problems, typically depend on many factors. Two such factors may include the number of qubits in the quantum processor and the connectivity (i.e., the availability of communicative couplings) between the qubits in the quantum processor. Throughout this specification, the term "connectivity" is used to describe the maximum number of possible communicative coupling paths that are physically available (e.g., whether active or not) to communicably couple between individual qubits in a quantum processor without the use of intervening qubits. For example, a qubit with a connectivity of three is capable of directly communicably coupling to up to three other qubits without any intervening qubits. In other words, there are direct communicative coupling paths available to three other qubits, although in any particular application all or less than all of those communicative coupling paths may be employed. In a quantum processor employing coupling devices between qubits, this would mean a qubit having a connectivity of three is selectively communicably coupleable to each of three other qubits via a respective one of three coupling devices. Typically, the number of qubits in a quantum processor limits the size of problems that may be solved and the connectivity between the qubits in a quantum processor limits the complexity of the problems that may be solved.

Many techniques for using adiabatic quantum computation and/or quantum annealing to solve computational problems involve finding ways to directly map a representation of a problem to the quantum processor itself. For example, US Patent Publication 2008-0052055 describes solving a protein folding problem by first casting the protein folding problem as an Ising spin glass problem and then directly mapping the Ising spin glass problem to a quantum processor, and US Patent Publication 2008-0260257 (now U.S. Pat. No. 8,073,808) describes solving a computational problem (e.g., an image-matching problem) by first casting the problem as a quadratic unconstrained binary optimization ("QUBO") problem and then mapping the QUBO problem directly to a quantum processor. In both cases, a problem is solved by first casting the problem in a contrived formulation (e.g., Ising spin glass, QUBO, etc.) because that particular formulation maps directly to the particular embodiment of the quantum processor being employed. In other words, an intermediate formulation is used to re-cast the original problem into a form that accommodates the number of qubits and/or connectivity constraints in the particular quantum processor and then the intermediate formulation is directly mapped to the quantum processor. This "direct mapping" approach is motivated, at least in part, by limitations inherent in the architecture of the quantum processor being employed. For example, a quantum processor that employs only pair-wise interactions between qubits (i.e., a quantum processor employing coupling devices that provide communicative coupling between respective pairs of qubits but not, for example, between larger sets of qubits, such as three or more qubits) is intrinsically well-suited to solve problems having quadratic terms (e.g., QUBO problems) because quadratic terms in a problem map directly to pair-wise interactions between qubits in the quantum processor.

The approach of re-casting a problem in an intermediate formulation and then directly mapping the intermediate formulation to the quantum processor can be impractical for some types of problems. For example, for a quantum processor architecture that inherently solves quadratic (e.g., QUBO) problems because it employs only pair-wise couplings between qubits, casting a generic computational problem as a QUBO problem requires casting the generic computational problem in a form having only pair-wise interactions between qubits. Any higher-order interactions that may exist in the original problem need to be broken down into pair-wise terms in order to be re-cast in QUBO form. Many computational problems have higher-order (i.e., beyond pair-wise) interactions between variables, and these problems can require significant pre-processing in order to be re-cast in QUBO form. Indeed, the pre-processing required to re-cast a generic problem in QUBO form and directly map the corresponding QUBO problem to a quantum processor can, in some cases, be of similar computational complexity to the original problem. Furthermore, breaking down higher-order interactions into pair-wise terms can force multiple qubits to be used to represent the same variable, meaning the size of the problem that can be solved is reduced.

Clearly, these "direct mapping" techniques for interacting with quantum processors limit the type, size, and complexity of problems that can be solved. There is a need in the art for techniques of using quantum processors that are less dependent on the architecture of the processors themselves and enable a broader range of problems to be solved.

Quadratic Unconstrained Binary Optimization Problems

A quadratic unconstrained binary optimization ("QUBO") problem is a form of discrete optimization problem that involves finding a set of N binary variables {Xi} that minimizes an objective function of the form:

$$E(x_1, \ldots, x_N) = \sum_{i \leq j}^{N} Q_{ij} x_i x_j$$

where Q is typically a real-valued upper triangular matrix that is characteristic of the particular problem instance being studied. QUBO problems arise in many different fields, for example machine learning, pattern matching, economics and finance, and statistical mechanics, to name a few.

BRIEF SUMMARY

The present systems and methods generally relate to use of quantum processors to minimize an objective function by operating the quantum processor as a sample generator providing samples from a probability distribution over the states of the quantum processor, and shaping the probability distribution via a digital computer. Due to the effects of noise and thermal energy, operating a quantum processor as a sample generator may be a preferred mode of operating the quantum processor for certain applications. Operating a quantum processor as a sample generator may also enable a broader range of problems to be solved compared to, for example, the direct mapping approach of using a quantum processor previously described. For example, such may allow the solution of problems which could not otherwise be solved, or problems which would require significantly larger processors (e.g., quantum processors with a much larger number of qubits and couplers) which are technically difficult to manufacture on a commercial scale and/or to maintain, or problems which may require computationally exhaustive (and in some cases, prohibitive) pre-processing in order to be directly mapped to a quantum processor. Cooperatively employing both quantum processor(s) and digital (i.e., classical) processor(s) in a "hybrid" system may provide one or more synergistic technical effects. Techniques described herein can address problems having more variables than qubits present in the quantum processor, and/or problems having interactions between variables that cannot be directly mapped to couplings between qubits in a quantum processor. Approaches described herein may also produce more accurate solutions and/or more quickly coalesce on a solution than conventional approaches. Such may be particularly advantageous particularly in solving combinatorial optimization problems, such as minimization problems. Such may additionally, or alternatively, eliminate the need to re-cast an objective function in an intermediate formulation that maps directly to a native problem of a quantum processor. Such simplifies operation and renders use of quantum processors less dependent on the architecture of the quantum processors themselves as compared to the direct mapping approach, advantageously enabling a broad range of problems to be solved. Furthermore, the techniques and corresponding software modules described herein enable a user to interact with a quantum processor and realize the computational advantages described above without requiring the user to learn the complicated machine language of the quantum processor. Operating a quantum processor as a sample generator "abstracts away" the complicated inner workings of the quantum processor and enables a user, via the software modules described herein, to treat the quantum processor as a "black box solver" invoked from any familiar developer environment via a digital computer system.

A method of operation in a hybrid problem solving system that comprises both a quantum processor and a digital computer to at least approximately solve a problem, the quantum processor and the digital computer communicatively coupled to one another and the quantum processor operated as a sample generator providing samples, may be summarized as including: generating at least one sample from a probability distribution via the quantum processor, wherein a shape of the probability distribution depends on a configuration of a number of programmable parameters for the quantum processor and wherein a number of low-energy states of the quantum processor respectively correspond to a number of high probability samples of the probability distribution; processing the at least one sample via the digital computer; shaping the probability distribution of the quantum processor based on the processing of the at least one sample via the digital computer, wherein shaping the probability distribution of the quantum processor includes changing the configuration of the number of programmable parameters for the quantum processor to produce a shaped probability distribution; generating at least one additional sample from the shaped probability distribution via the quantum processor; processing the at least one additional sample via the digital computer; and determining an at least approximate solution to the problem via the digital computer based on the processing of the at least one additional sample via the digital computer. The problem may include an at least approximate minimization of an objective function and determining an at least approximate solution to the problem via the digital computer may include determining an at least approximate minimization of the objective function via the digital computer. Processing the at least one sample via the digital computer may include determining a respective result of the problem that corresponds to each sample via the digital computer, and processing the at least one additional sample via the digital computer may include determining a respective result of the problem that corresponds to each additional sample via the digital computer. Determining an at least approximate solution to the problem via the digital computer may include returning a sample from the at least one additional sample if the result of the problem that corresponds to the sample from the at least one additional sample satisfies at least one solution criterion. Returning the sample from the at least one additional sample if the result of the problem that corresponds to the sample from the at least one additional sample satisfies at least one solution criterion may include returning the sample from the at least one additional sample if the result of the problem that corresponds to the sample from the at least one additional sample satisfies at least one of: a minimum degree of solution accuracy, a maximum allowed computation time, or a maximum allowed number of samples generated. Processing the at least one sample via the digital computer may include casting each sample as a respective starting point for a classical heuristic optimization algorithm via the digital computer, and processing the at least one additional sample via the digital computer may include casting each additional sample as a respective starting point for a classical heuristic optimization algorithm via the digital computer. Casting each sample as a respective starting point for a classical heuristic optimization algorithm via the digital computer may include casting each sample as a respective starting point for at least one of: a local search algorithm, a tabu search algorithm, a simulated annealing algorithm, a path re-linking algorithm, or a genetic algorithm; and casting each additional sample as a respective starting point for a classical heuristic optimization algorithm via the digital computer may include casting each additional sample as a respective starting point for at least one of: a local search algorithm, a tabu search algorithm, a simulated annealing algorithm, a path re-linking algorithm, or a genetic algorithm. Determining an at least approximate solution to the problem via the digital computer may include returning a result of casting each additional sample as a respective starting point for a classical heuristic optimization algorithm as the at least approximate solution to the problem via the digital computer. Processing the at least one sample via the digital computer may include generating at least one respective local sample from a respective neighborhood of each sample via the digital computer, and processing the at least one additional sample via the digital computer may include generating at least one respective local sample from a respective neighborhood of each additional sample via the digital computer. Processing the at least one sample via the digital computer may further include determining a respective result of the problem that corresponds to each respective local sample from the respective neighborhood of each sample via the digital computer, and processing the at least one additional sample via the digital computer may further include determining a respective result of the problem that corresponds to each respective local sample from the respective neighborhood of each additional sample via the digital computer. Determining an at least approximate solution to the problem via the digital computer may include returning a local sample from the neighborhood of an additional sample if the result of the problem that corresponds to the local sample from the neighborhood of the additional sample satisfies at least one solution criterion. Returning a local sample from the neighborhood of an additional sample if the result of the problem that corresponds to the local sample from the neighborhood of the additional sample satisfies at least one solution criterion may include returning the local sample from the neighborhood of the additional sample if the result of the problem that corresponds to the local sample from the neighborhood of the additional sample satisfies at least one of: a minimum degree of solution accuracy, a maximum allowed computation time, or a maximum allowed number of samples generated. Each sample may correspond to a respective bit string having N bits and generating at least one respective local sample from a respective neighborhood of each sample via the digital computer may include generating at least one respective local sample from within a Hamming distance of less than or equal to about 0.1 N from each sample via the digital computer. Shaping the probability distribution of the quantum processor based on the processing of the at least one sample via the digital computer may include at least one of: changing the configuration of a number of programmable parameters for the quantum processor to assign high probability to at least one sample based on the processing of the at least one sample via the digital computer, or changing the configuration of a number of programmable parameters for the quantum processor to assign low probability to at least one sample based on the processing of the at least one sample via the digital computer. Generating at least one sample via the quantum processor may include performing at least one of adiabatic quantum computation or quantum annealing via the quantum processor. The method may also include constructing a model of the problem via the digital computer and evolving the model via the digital computer based at least partially on the processing of the at least one additional sample via the digital computer.

A hybrid problem solving system may be summarized as including: a quantum processor that generates samples from a probability distribution, wherein a shape of the probability distribution depends on a configuration of a number of programmable parameters for the quantum processor and wherein a number of low-energy states of the quantum processor respectively correspond to a number of high probability samples of the probability distribution; and a digital computer that processes the samples from the quantum processor and controls the configuration of the number of programmable parameters for the quantum processor to shape the probability distribution of the quantum processor, wherein the quantum processor and the digital computer are communicatively coupled to one another. The quantum processor may include a superconducting quantum processor comprising a plurality of superconducting qubits. The quantum processor may include at least one of an adiabatic quantum processor or a processor that performs quantum annealing. The system may further include a programming subsystem that programs the quantum processor with the configuration of programmable parameters; an evolution subsystem that evolves the quantum processor; and a readout subsystem that reads out a state of the quantum processor, wherein the state corresponds to a sample from the probability distribution. The digital computer may include a machine language module that generates programming instructions in the machine language of the quantum processor; and an abstraction module that processes an objective function to be minimized via the quantum processor and invokes the machine language module that generates programming instructions in the machine language of the quantum processor that define the configuration of the number of programmable parameters for the quantum processor. The system may include a Web server communicatively coupled between the quantum processor and the digital computer such that the quantum processor and the digital computer are communicatively coupled to one another via the Web server.

A method of operation in a hybrid problem solving system that comprises both a quantum processor and a digital computer communicatively coupled to one another to at least approximately minimize an objective function, may be summarized as including: operating the quantum processor as a sample generator to provide samples from a probability distribution, wherein a shape of the probability distribution depends on a configuration of a number of programmable parameters for the quantum processor and a number of low-energy states of the quantum processor respectively correspond to a number of high probability samples of the probability distribution, and wherein operating the quantum processor as a sample generator may be summarized as including: defining a configuration of the number of programmable parameters for the quantum processor via the digital computer, wherein the configuration of the number of programmable parameters corresponds to a probability distribution over a set of states of the quantum processor; programming the quantum processor with the configuration of the number of programmable parameters via a programming subsystem; evolving the quantum processor via an evolution subsystem; and reading out a state of the quantum processor via a readout subsystem, wherein the state of the quantum processor corresponds to a sample from the probability distribution; and processing samples from the quantum processor via the digital computer, wherein processing samples from the quantum processor via the digital computer, which may be summarized as including: determining a respective value of the objective function corresponding to each respective sample from the quantum processor via the digital computer; determining at least one additional state based on at least one sample from the quantum processor via the digital computer; and determining a respective value of the objective function corresponding to each additional state via the digital computer; and returning a state that corresponds to an at least approximate minimum of the objective function via the digital computer. Determining at least one additional state based on at least one sample from the quantum processor via the digital computer may include performing a classical heuristic optimization algorithm to determine at least one additional state based on at least one sample from the quantum processor via the digital computer. Performing a classical heuristic optimization algorithm to determine at least one additional state based on at least one sample from the quantum processor via the digital computer may include performing at least one of: a local search algorithm, a tabu search algorithm, a simulated annealing algorithm, a path re-linking algorithm, or a genetic algorithm, via the digital computer. Determining at least one additional state based on at least one sample from the quantum processor via an digital computer may include determining at least one local state from a neighborhood of at least one sample from the quantum processor via the digital computer. Each state may correspond to a respective bit string having N bits and determining at least one local state from a neighborhood of at least one sample from the quantum processor via the digital computer may include determining at least one local state from within a Hamming distance of less than or equal to about 0.1 N from at least one sample from the quantum processor via the digital computer. Evolving the quantum processor via an evolution subsystem may include performing at least one of adiabatic quantum computation or quantum annealing. Operating the quantum processor as a sample generator to provide samples from a probability distribution may further include re-defining a configuration of the number of programmable parameters for the quantum processor via the digital computer based on the processing of the samples from the quantum processor via the digital computer; re-programming the quantum processor with the configuration of the number of programmable parameters via the programming subsystem; re-evolving the quantum processor via the evolution subsystem; and reading out a state of the quantum processor via the readout subsystem, wherein the state of the quantum processor corresponds to a sample from the probability distribution. Defining a configuration of a number of programmable parameters for the quantum processor via the digital computer may include defining the configuration of the number of programmable parameters for the quantum processor based on the processing of the samples from the quantum processor via the digital computer, and the method may further include communicating a result of the processing of at least a first sample from the quantum processor via the digital computer to the operating of the quantum processor as a sample generator in order to provide at least one additional sample from the quantum processor based on the processing of the at least a first sample from the quantum processor. The method may further include shaping the probability distribution of the quantum processor based on the processing of the at least a first sample from the quantum processor via the digital computer, wherein shaping the probability distribution of the quantum processor may include changing the configuration of the number of programmable parameters for the quantum processor. Processing samples from the quantum processor via the digital computer may further include constructing a model of the objective function via the digital computer; and evolving the model via the digital computer based at least partially on the value of the objective function corresponding to at least one state.

A hybrid problem solving system to at least approximately minimize an objective function, may be summarized as including: a quantum processor that provides samples from a probability distribution, wherein a shape of the probability distribution depends on a configuration of a number of programmable parameters for the quantum processor and a number of low-energy states of the quantum processor respectively correspond to a number of high probability samples of the probability distribution; and a digital computer that: defines a configuration of the number of programmable parameters for the quantum processor, wherein the configuration of the number of programmable parameters corresponds to a probability distribution over a set of states of the quantum processor; determines a respective value of the objective function corresponding to each respective sample from the quantum processor; determines at least one additional state based on at least one sample from the quantum processor; determines a respective value of the objective function corresponding to each additional state; and returns a state that corresponds to an at least approximate minimum of the objective function. The hybrid system may further include a programming subsystem that programs the quantum processor with the configuration of the number of programmable parameters; an evolution subsystem that evolves the quantum processor to provide samples from the probability distribution; and a readout subsystem that reads out a state of the quantum processor, wherein the state of the quantum processor corresponds to a sample from the probability distribution. The quantum processor may include at least a portion of at least one of the programming subsystem, the evolution subsystem, or the readout subsystem. The quantum processor may include a superconducting quantum processor and a plurality of superconducting qubits.

A method of operating a quantum processor and a digital computer to at least approximately minimize an objective function, may be summarized as including: until a bit string that corresponds to an at least approximate minimum value of the objective function is found, iteratively: generating bit strings via the quantum processor; processing the bit strings via the digital computer, wherein processing the bit strings via the digital computer includes determining a respective value of the objective function corresponding to each respective bit string via the digital computer; and programming the quantum processor via a programming subsystem to assign relative probabilities to at least some of the bit strings based on the corresponding objective function values of the respective bit strings; and in response to finding a bit string that corresponds to an at least approximate minimum value of the objective function: stopping the iteration; and returning the found bit string that corresponds to the at least approximate minimum value of the objective function via the digital computer. Processing the bit strings via the digital computer may further include determining additional bit strings via the digital computer based on at least one of the bit strings from the quantum processor; and determining a respective value of the objective function corresponding to each respective additional bit string via the digital computer. Determining additional bit strings via the digital computer based on at least one of the bit strings from the quantum processor may include performing a classical heuristic optimization algorithm to determine at least one additional bit string based on at least one of the bit strings from the quantum processor via the digital computer. Performing a classical heuristic optimization algorithm to determine at least one additional bit string based on at least one of the bit strings from the quantum processor via the digital computer may include performing at least one of: a local search algorithm, a tabu search algorithm, a simulated annealing algorithm, a path re-linking algorithm, or a genetic algorithm, via the digital computer. Determining additional bit strings via the digital computer based on at least one of the bit strings from the quantum processor may include determining at least one local bit string from a neighborhood of at least one of the bit strings from the quantum processor via the digital computer. Each bit string may include N bits and determining at least one local bit string from a neighborhood of at least one of the bit strings from the quantum processor via the digital computer may include determining at least one local bit string from within a Hamming distance of less than or equal to about 0.1 N from at least one of the bit strings from the quantum processor via the digital computer. Returning the found bit string that corresponds to the at least approximate minimum value of the objective function via the digital computer may include returning a bit string that was determined via the digital computer based on at least one of the bit strings from the quantum processor. Returning the found bit string that corresponds to the at least approximate minimum value of the objective function via the digital computer may include returning a bit string that was generated via the quantum processor. Generating bit strings via the quantum processor may include performing at least one of adiabatic quantum computation or quantum annealing via the quantum processor. Programming the quantum processor via a programming subsystem to assign relative probabilities to at least some of the bit strings based on the corresponding objective function values of the respective bit strings may include at least one of:

programming the quantum processor via the programming subsystem to assign a high probability to at least one bit string having a low corresponding objective function value or programming the quantum processor via the programming subsystem to assign a low probability to at least one bit string having a high corresponding objective function value. Processing the bit strings via the digital computer may further include constructing a model of the objective function via the digital computer; and evolving the model via the digital computer based at least partially on the value of the objective function corresponding to at least one bit string.

A system to at least approximately minimize an objective function may be summarized as including: a quantum processor; a digital computer; and a programming subsystem; wherein until a bit string that corresponds to an at least approximate minimum value of the objective function is found: the quantum processor generates bit strings; the digital computer processes the bit strings and determines a respective value of the objective function corresponding to each respective bit string; and the programming subsystem programs the quantum processor to assign relative probabilities to at least some of the bit strings based on the corresponding objective function values of the respective bit strings; and in response to finding a bit string that corresponds to an at least approximate minimum value of the objective function: the digital computer returns the found bit string that corresponds to the at least approximate minimum value of the objective function and stops until a new problem is received. The system may further include an evolution subsystem that evolves the quantum processor to generate bit strings; and a readout subsystem that reads out a bit string from the quantum processor, wherein each bit in the bit string corresponds to a state of a respective qubit in the quantum processor. The quantum processor may include at least a portion of at least one of the programming subsystem, the evolution subsystem, or the readout subsystem. The quantum processor may include a superconducting quantum processor and a plurality of superconducting qubits.

A method of using both a quantum processor and a digital computer to at least approximately minimize an objective function having at least one minimum, may be summarized as including: operating the quantum processor as a sample generator to provide samples from a probability distribution, wherein a shape of the probability distribution depends on a configuration of a number of programmable parameters for the quantum processor and a number of low-energy states of the quantum processor correspond to a number of high probability samples of the probability distribution; shaping the probability distribution of the quantum processor to assign high probability to samples from a neighborhood of a minimum of the objective function via the digital computer; and determining a low-energy sample from the neighborhood of the minimum that at least approximately minimizes the objective function via the digital computer. The method may further include shaping the probability distribution of the quantum processor to assign low probability to samples outside the neighborhood of the minimum of the objective function via the digital computer. The at least one minimum of the objective function may include a global minimum of the objective function and at least one local minimum of the objective function, and shaping the probability distribution of the quantum processor to assign high probability to samples from a neighborhood of a minimum of the objective function via the digital computer may include shaping the probability distribution of the quantum processor to assign high probability to samples from a neighborhood of either the global minimum or a local minimum via the digital computer. Each sample may correspond to a respective bit string having N bits, and shaping the probability distribution of the quantum processor to assign high probability to samples from a neighborhood of a minimum of the objective function via the digital computer may include shaping the probability distribution of the quantum processor to assign high probability to bit strings within a Hamming distance of less than or equal to about 0.1 N of the minimum. Determining a low-energy sample from the neighborhood of the minimum that at least approximately minimizes the objective function via the digital computer may include determining a respective value of the objective function corresponding to each respective sample via the digital computer; and returning a sample that at least approximately minimizes the objective function via the digital computer. Determining a low-energy sample from the neighborhood of the minimum that at least approximately minimizes the objective function via the digital computer may further include determining additional samples via the digital computer based on at least one of the samples from the quantum processor. Determining additional samples via the digital computer based on at least one of the samples from the quantum processor may include performing a classical heuristic optimization algorithm to determine at least one additional sample based on at least one of the samples from the quantum processor via the digital computer. Performing a classical heuristic optimization algorithm to determine at least one additional sample based on at least one of the samples from the quantum processor via the digital computer may include performing at least one of: a local search algorithm, a tabu search algorithm, a simulated annealing algorithm, a path re-linking algorithm, or a genetic algorithm, via the digital computer. Determining additional samples via the digital computer based on at least one of the samples from the quantum processor may include determining at least one local sample from a neighborhood of at least one of the samples from the quantum processor via the digital computer. Each sample may correspond to a respective bit string having N bits and determining at least one local sample from a neighborhood of at least one of the samples from the quantum processor via the digital computer may include determining at least one local bit string within a Hamming distance of less than or equal to about 0.1 N of at least one of the bit strings from the quantum processor via the digital computer. Operating the quantum processor as a sample generator may include performing at least one of adiabatic quantum computation or quantum annealing via the quantum processor. Operating the quantum processor as a sample generator may include programming the quantum processor with the configuration of the number of programmable parameters via a programming subsystem; evolving the quantum processor via an evolution subsystem; and reading out a state of the quantum processor via a readout subsystem, wherein the state of the quantum processor may correspond to a sample from the probability distribution. Shaping the probability distribution of the quantum processor to assign high probability to samples from a neighborhood of a minimum of the objective function via the digital computer may include changing the configuration of the number of programmable parameters for the quantum processor via the digital computer.

A system to at least approximately minimize an objective function having at least one minimum may be summarized as including: a quantum processor that provides samples from a probability distribution, wherein a shape of the probability distribution depends on a configuration of a number of programmable parameters for the quantum processor and a number of low-energy states of the quantum processor correspond to a number of high probability samples of the probability distribution; and a digital computer that shapes the probability distribution of the quantum processor to assign high probability to samples from a neighborhood of a minimum of the objective function and determines a low-energy sample from the neighborhood of the minimum that at least approximately minimizes the objective function. The system may further include a programming subsystem that programs the quantum processor with the configuration of the number of programmable parameters; an evolution subsystem that evolves the quantum processor to provide samples from the probability distribution; and a readout subsystem that reads out a state of the quantum processor, wherein the state of the quantum processor corresponds to a sample from the probability distribution. The quantum processor may include at least a portion of at least one of the programming subsystem, the evolution subsystem, or the readout subsystem. The quantum processor may include a superconducting quantum processor and a plurality of superconducting qubits.

A method of operating a sample generator system that includes at least one quantum processor, at least one digital computer, a programming subsystem, an evolution subsystem, and a readout subsystem to generate samples, may be summarized as including: defining a first configuration of a number of programmable parameters for the at least one quantum processor via the at least one digital computer, wherein the first configuration of the number of programmable parameters characterizes a first probability distribution over a set of states of the at least one quantum processor; programming the at least one quantum processor with the first configuration of the number of programmable parameters via the programming subsystem; evolving the at least one quantum processor with the first configuration of the number of programmable parameters via the evolution subsystem; reading out a first state of the at least one quantum processor via the readout subsystem, wherein the first state of the at least one quantum processor corresponds to a first sample from the first probability distribution; processing the first state via the at least one digital computer; defining a second configuration of the number of programmable parameters for the at least one quantum processor via the at least one digital computer, wherein the second configuration of the number of programmable parameters characterizes a second probability distribution over the set of states of the at least one quantum processor, and wherein the second configuration of the number of programmable parameters is at least partially based on a result of the processing of the first state via the at least one digital computer; programming the at least one quantum processor with the second configuration of the number of programmable parameters via the programming subsystem; evolving the at least one quantum processor with the second configuration of the number of programmable parameters via the evolution subsystem; reading out a second state of the at least one quantum processor via the readout subsystem, wherein the second state of the at least one quantum processor corresponds to a first sample from the second probability distribution. Processing the first state via the at least one digital computer may include calculating a property of the first state via the at least one digital computer. Processing the first state via the at least one digital computer may include inputting the first state into an objective function and determining a corresponding objective function value for the first state via the at least one digital computer. Processing the first state via the at least one digital computer may include determining at least one additional state based on the first state via the at least one digital computer. Determining at least one additional state based on the first state via the at least one digital computer may include performing a classical heuristic optimization algorithm to determine at least one additional state based on the first state via the at least one digital computer. Performing a classical heuristic optimization algorithm to determine at least one additional state based on the first state via the at least one digital computer may include performing at least one of a local search algorithm, a tabu search algorithm, a simulated annealing algorithm, a path re-linking algorithm, or a genetic algorithm, via the at least one digital computer. Determining at least one additional state based on the first state via the at least one digital computer may include determining at least one local state from a neighborhood of the first state via the at least one digital computer. The first state may correspond to a bit string having N bits and determining at least one local state from a neighborhood of the first state via the at least one digital computer may include determining at least one bit string within a Hamming distance of less than or equal to about $0.1$ N of the first state via the at least one digital computer. Evolving the at least one quantum processor with the first configuration of the number of programmable parameters via the evolution subsystem may include performing at least one of adiabatic quantum computation or quantum annealing via the at least one quantum processor, and evolving the at least one quantum processor with the second configuration of the number of programmable parameters via the evolution subsystem may include performing at least one of adiabatic quantum computation or quantum annealing via the at least one quantum processor. Defining a second configuration of the number of programmable parameters for the at least one quantum processor via the at least one digital computer, the second configuration of the number of programmable parameters which characterizes a second probability distribution over the set of states of the at least one quantum processor, may include defining the second configuration of the number of programmable parameters for the at least one quantum processor such that the second probability distribution assigns higher or lower probability to the first state of the at least one quantum processor. The method may further include processing the second state via the at least one digital computer; defining a third configuration of the number of programmable parameters for the at least one quantum processor via the at least one digital computer, wherein the third configuration of the number of programmable parameters characterizes a third probability distribution over the set of states of the at least one quantum processor, and wherein the third configuration of the number of programmable parameters is at least partially based on a result of the processing of the second state via the at least one digital computer; programming the at least one quantum processor with the third configuration of the number of programmable parameters via the programming subsystem; evolving the at least one quantum processor with the third configuration of the number of programmable parameters via the evolution subsystem; and reading out a third state of the at least one quantum processor via the readout subsystem, wherein the third state of the at least one quantum processor corresponds to a first sample from the third probability distribution.

A sample generator system to generate samples from a probability distribution may be summarized as including: a quantum processor; a digital computer that defines configurations of a number of programmable parameters for the quantum processor, wherein each configuration of the number of programmable parameters characterizes a respective probability distribution over a set of states of the quantum processor, and processes states of the quantum processor; a programming subsystem that programs the quantum processor with configurations of the number of programmable parameters; an evolution subsystem that evolves the quantum processor with configurations of the number of programmable parameters; a readout subsystem that reads out states of the quantum processor, wherein each respective state of the quantum processor corresponds to a respective sample from a probability distribution defined by a respective configuration of the number of programmable parameters for the quantum processor. The quantum processor may include at least a portion of at least one of the programming subsystem, the evolution subsystem, or the readout subsystem. The quantum processor may include a superconducting quantum processor and a plurality of superconducting qubits.

A method of operation in a system that includes a quantum processor, a digital computer, and a programming subsystem, to at least approximately minimize an objective function, wherein a probability of the quantum processor outputting a state is inversely related to an energy of the state, may be summarized as including: until a state that corresponds to an at least approximate minimum value of the objective function is found, iteratively: defining a configuration of a number of programmable parameters for the quantum processor via the digital computer, wherein the configuration of the number of programmable parameters characterizes a probability distribution over a set of states of the quantum processor; programming the quantum processor with the configuration of the number of programmable parameters via the programming subsystem; generating samples from the probability distribution via the quantum processor, wherein each respective sample corresponds to a respective state of the quantum processor; and processing the samples from the probability distribution via the digital computer, wherein processing the samples via the digital computer includes determining a respective value of the objective function corresponding to each respective sample via the digital computer; and in response to finding a state that corresponds to an at least approximate minimum value of the objective function: stopping the iteration; and returning the found state that corresponds to the at least approximate minimum value of the objective function via the digital computer. Processing the samples from the probability distribution via the digital computer may further include determining additional samples via the digital computer based on at least one of the samples from the probability distribution; and determining a respective value of the objective function corresponding to each respective additional sample via the digital computer. Determining additional samples via the digital computer based on at least one of the samples from the probability distribution may include performing a classical heuristic optimization algorithm to determine at least one additional sample based on at least one of the samples from the probability distribution via the digital computer. Performing a classical heuristic optimization algorithm to determine at least one additional sample based on at least one of the samples from the probability distribution via the digital computer may include performing at least one of: a local search algorithm, a tabu search algorithm, a simulated annealing algorithm, a path re-linking algorithm, or a genetic algorithm, via the digital computer. Determining additional samples via the digital computer based on at least one of the samples from the probability distribution may include determining at least one local sample from a neighborhood of at least one of the samples from the probability distribution via the digital computer. Each respective sample may correspond to a respective bit string having N bits and determining at least one local sample from a neighborhood of at least one of the samples from the probability distribution via the digital computer may include determining at least one local bit string within a Hamming distance of less than or equal to about 0.1 N of at least one of the samples from the probability distribution via the digital computer. Returning the found state that corresponds to the at least approximate minimum value of the objective function via the digital computer may include returning a sample that was determined via the digital computer based on at least one of the samples from the probability distribution. Returning the found state that corresponds to the at least approximate minimum value of the objective function via the digital computer may include returning a sample that was generated via the quantum processor. Generating samples from the probability distribution via the quantum processor may include performing at least one of adiabatic quantum computation or quantum annealing via the quantum processor. The processing of the samples from the probability distribution via the digital computer in an $i^{th}$ iteration may influence the defining of a configuration of a number of programmable parameters for the quantum processor via the digital computer in an $(i+1)^{th}$ iteration, where i is an integer greater than zero. Determining a respective value of the objective function corresponding to each respective sample via the digital computer in the $i^{th}$ iteration may include determining a set of samples with low corresponding objective function values, and the defining of a configuration of a number of programmable parameters for the quantum processor via the digital computer in the $(i+1)^{th}$ iteration may include defining a configuration of the number of programmable parameters for the quantum processor that maps at least one sample from the set of samples with low corresponding objective function values from the $i^{th}$ iteration to a low-energy state of the quantum processor. Determining a respective value of the objective function corresponding to each respective sample via the digital computer in the $i^{th}$ iteration may include determining a set of samples with high corresponding objective function values, and the defining of a configuration of a number of programmable parameters for the quantum processor via the digital computer in the $(i+1)^{th}$ iteration may include defining a configuration of the number of programmable parameters for the quantum processor that maps at least one sample from the set of samples with high corresponding objective function values from the $i^{th}$ iteration to a high-energy state of the quantum processor. The system may further include an evolution subsystem and a readout subsystem, and generating samples from the probability distribution via the quantum processor may include evolving the quantum processor via the evolution subsystem; and reading out a state of the quantum processor via the readout subsystem, wherein the state of the quantum processor corresponds to a sample from the probability distribution. Processing the samples from the probability distribution via the digital computer may further include constructing a model of the objective function via the digital computer; and evolving the model via the digital computer based at least partially on the value of the objective function corresponding to at least one sample.

A hybrid system to at least approximately minimize an objective function may be summarized as including: a quantum processor, a digital computer, and a programming subsystem, wherein until a state that corresponds to an at least approximate minimum value of the objective function is found: the digital computer defines a configuration of a number of programmable parameters for the quantum processor, wherein the configuration of the number of programmable parameters characterizes a probability distribution over a set of states of the quantum processor; the programming subsystem programs the quantum processor with the configuration of the number of programmable parameters; the quantum processor generates samples from the probability distribution, wherein each respective sample corresponds to a respective state of the quantum processor; and the digital computer processes the samples from the probability distribution, by determining a respective value of the objective function corresponding to each respective sample; and in response to finding a state that corresponds to an at least approximate minimum value of the objective function: the digital computer returns the found state that corresponds to the at least approximate minimum value of the objective function and stops until a new problem is received. The hybrid system may further include an evolution subsystem that evolves the quantum processor to generate samples from the probability distribution; and a readout subsystem that reads out a state of the quantum processor, where the state of the quantum processor may correspond to a sample from the probability distribution. The quantum processor may include at least a portion of at least one of the programming subsystem, the evolution subsystem, or the readout subsystem. The quantum processor may include a superconducting quantum processor and a plurality of superconducting qubits.

A method of operating a hybrid computer system comprising a quantum processor having a plurality of qubits and a digital computer having a digital processor and a nontransitory computer-readable memory communicatively coupled to the digital processor, may be summarized as including: defining a function via the digital computer, wherein an input to the function is a bit string indicating binary states of a number of function parameters and an output from the function is a real number value; and determining a bit string that at least approximately minimizes the real number value output from the function, by: until a bit string that satisfies an exit criterion is found, iteratively: generating bit strings via the quantum processor, wherein each bit in a bit string corresponds to a state of a respective qubit in the quantum processor; processing the bit strings generated by the quantum processor via the digital computer, wherein processing the bit strings includes determining a respective real number value output by the function for each bit string via the digital computer; in response to finding the bit string that satisfies an exit criterion: stopping the iteration; and returning the bit string that satisfies the exit criterion via the digital computer. The nontransitory computer-readable memory may store a machine language module to generate programming instructions in the machine language of the quantum processor, and defining a function via the digital computer may include generating programming instructions corresponding to the function in the machine language of the quantum processor via the machine language module. The nontransitory computer-readable memory may store an abstraction module to process the function and invoke the machine language module to generate programming instructions that define a configuration of a number of programmable parameters for the quantum processor, and processing the bit strings generated by the quantum processor via the digital computer may include processing the bit strings generated by the quantum processor via the abstraction module. The quantum processor may include a programming subsystem, and the method may further include providing the programming instructions from the machine language module to the programming subsystem. The hybrid computer system may further include a Web server, and providing the programming instructions from the machine language module to the programming subsystem may include providing the programming instructions from the machine language module to the programming subsystem via the Web server. The quantum processor may include a programming subsystem, an evolution subsystem, and a readout subsystem, and generating bit strings via the quantum processor may include executing the programming instructions from the machine language module via the programming subsystem; evolving the quantum processor via the evolution subsystem; and reading out bit values via the readout subsystem. At least one exit criterion may include at least one of: a maximum number of iterations, a maximum allowed computation time, a maximum allowed number of bit strings generated, or a real number value output by the function that is below a specified threshold. Generating bit strings via the quantum processor may include performing at least one of adiabatic quantum computation or quantum annealing. Processing the bit strings generated by the quantum processor via the digital computer may further include determining additional bit strings via the digital computer based on at least one of the bit strings from the quantum processor; and determining a respective real number value output by the function for each respective additional bit string via the digital computer. Determining additional bit strings via the digital computer based on at least one of the bit strings from the quantum processor may include performing a classical heuristic optimization algorithm to determine at least one additional bit string based on at least one of the bit strings from the quantum processor via the digital computer. Performing a classical heuristic optimization algorithm to determine at least one additional bit string based on at least one of the bit strings from the quantum processor via the digital computer may include performing at least one of: a local search algorithm, a tabu search algorithm, a simulated annealing algorithm, a path re-linking algorithm, or a genetic algorithm, via the digital computer. Determining additional bit strings via the digital computer based on at least one of the bit strings from the quantum processor may include determining at least one local bit string from a neighborhood of at least one of the bit strings from the quantum processor via the digital computer. Each bit string may include N bits and determining at least one local bit string from a neighborhood of at least one of the bit strings from the quantum processor via the digital computer may include determining at least one local bit string within a Hamming distance of less than or equal to about 0.1 N of at least one of the bit strings from the quantum processor via the digital computer. Processing the bit strings generated by the quantum processor via the digital computer may further include constructing a model of the function via the digital computer; and evolving the model via the digital computer based at least partially on the real number value output by the function for at least one bit string.

A hybrid computer system may be summarized as including: a quantum processor comprising: a plurality of programmable elements; a programming subsystem that receives programming instructions in a machine language of the quantum processor and executes the programming instructions to program the programmable elements in accordance with the programming instructions; and a digital computer including a digital processor and a computer-readable memory communicatively coupled to the digital processor that stores a set of modules, each of the modules including a respective set of instructions executable by the digital processor to cause the digital processor to interact with the quantum processor, wherein the set of modules comprises: a machine language module that generates programming instructions in the machine language of the quantum processor for execution by the programming subsystem of the quantum processor; and an abstraction module that processes an objective function to be minimized via the quantum processor and invokes the machine language module that generates programming instructions for the programming subsystem that define a configuration of programmable parameters for the programmable elements of the quantum processor. The hybrid computer system may further include a Web server that provides a Web interface between the quantum processor and the machine language module of the digital computer. The quantum processor may include a superconducting quantum processor and the plurality of programmable elements may include a plurality of superconducting qubits. The plurality of programmable elements may further include a plurality of coupling devices to provide communicative coupling between qubits. The machine language module may generate programming instructions in the machine language of the quantum processor for execution by the programming subsystem of the quantum processor via manual input of instructions by a user. The machine language module may generate programming instructions in the machine language of the quantum processor for execution by the programming subsystem of the quantum processor automatically in response to an invocation by the abstraction module. The abstraction module may process an objective function to be minimized via the quantum processor via manual input of instructions by a user. The set of modules may further include a client library module that generates, stores, and executes a program via at least one high-level programming language, the program including at least one objective function to be minimized via the quantum processor. The client library module may include a plurality of client libraries and the at least one high-level programming language may include at least one of C, C++, Python, SQL, JAVA, LISP and MATLAB. The abstraction module may process an objective function to be minimized via the quantum processor automatically in response to an invocation by the client library module. The set of modules may further include an algorithm module that may generate, store, and execute an algorithm and invoke the client library module to execute a program, where the algorithm may include at least one objective function to be minimized via the quantum processor. The algorithm generated, stored, and executed by the algorithm module may include at least one of supervised binary classification, supervised multiple label assignment, or unsupervised feature learning. The set of modules may further include an application module that may generate, store, and execute an end-use application and invoke the algorithm module that executes an algorithm, where the end-use application may include at least one objective function to be minimized via the quantum processor.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

FIG. 3B is a flow-diagram showing exemplary low-level details of a method of operating a quantum processor as a sample generator to provide samples from a probability distribution in accordance with the present systems and methods.

DETAILED DESCRIPTION

Figure 1:
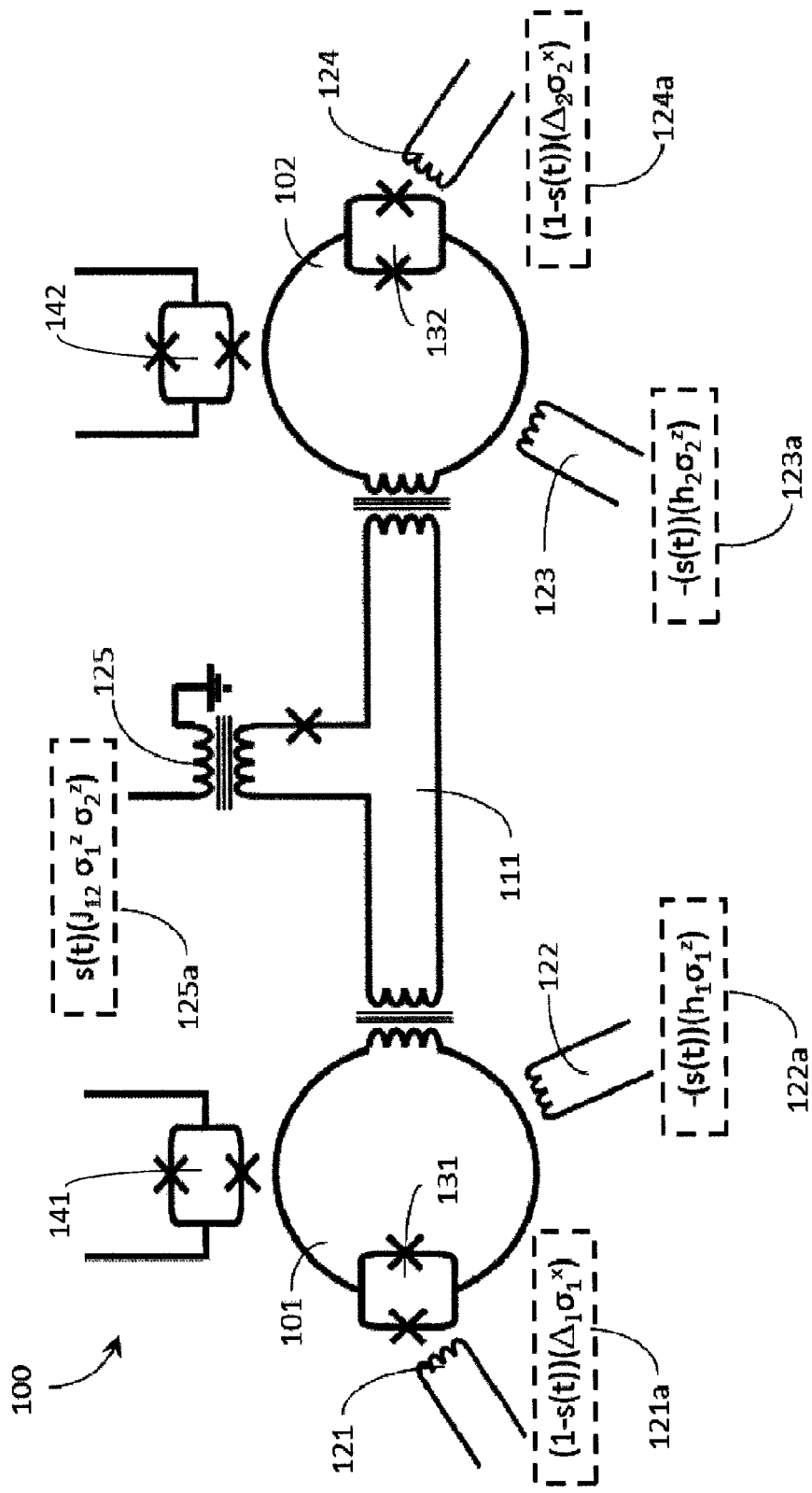
FIG. 1 is a schematic diagram of a portion of a superconducting quantum processor designed for adiabatic quantum computation and/or quantum annealing to implement the present systems and methods.

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with quantum processors, such as quantum devices, coupling devices, and control systems including microprocessors, drive circuitry and nontransitory computer- or processor-readable media such as nonvolatile memory for instance read only memory (ROM), electronically erasable programmable ROM (EEPROM) or FLASH memory, etc., or volatile memory for instance static or dynamic random access memory (ROM) have not been shown or described in detail to avoid unnecessarily obscuring descriptions of the embodiments of the present systems and methods. Throughout this specification and the appended claims, the words "element" and "elements" are used to encompass, but are not limited to, all such structures, systems and devices associated with quantum processors, as well as their related programmable parameters.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," or "an embodiment," or "another embodiment" means that a particular referent feature, structure, or characteristic described in connection with the embodiment is included in at least one embodiment. Thus, the appearances of the phrases "in one embodiment," or "in an embodiment," or "another embodiment" in various places throughout this specification are not necessarily all referring to the same embodiment. Furthermore, the particular features, structures, or characteristics may be combined in any suitable manner in one or more embodiments.

It should be noted that, as used in this specification and the appended claims, the singular forms "a," "an," and "the" include plural referents unless the content clearly dictates otherwise. Thus, for example, reference to a problem-solving system including "a quantum processor" includes a single quantum processor, or two or more quantum processors, including a grid or distributed network of multiple quantum processors. It should also be noted that the term "or" is generally employed in its sense including "and/or" unless the content clearly dictates otherwise.

The headings provided herein are for convenience only and do not interpret the scope or meaning of the embodiments.

The various embodiments described herein provide systems and methods for solving computational problems. More specifically, the various embodiments described herein provide systems and methods for converging on a minimum value for an objective function by recursively: processing samples from a sample generator and shaping a probability distribution of the sample generator based on the processing of the samples. The sample generator may, for example, comprise a quantum processor that intrinsically tends to provide samples from low-energy states with high probability by performing adiabatic quantum computation and/or quantum annealing and the samples may, for example, be processed via a digital computer employing classical heuristic optimization algorithms.

Throughout this specification and the appended claims, the terms "sample," "sampling," and "sample generator" are frequently used. These terms are used herein in like manner to their corresponding uses in the arts of statistics and statistical analysis. The term "sample" as used throughout this specification and the appended claims refers to a subset of a population, and the term "sampling" refers to the process of extracting a sample from a population. For example, in any population, database, or collection of objects, a sample may refer to any individual datum, datapoint, object, or subset of data, datapoints, and/or objects. The term "sample generator" is used throughout this specification and the appended claims to refer to a system or device that generates samples. In other words, the system or device provides, for example, individual data or data objects or subsets of data by sampling from a population of data or data objects. As described in more detail later, the population of data may be sampled according to a probability distribution, where the probability distribution assigns a respective probability (of being sampled) to each datum in the population. A person of skill in the art will appreciate that some datapoint(s) in a population may be assigned zero probability in a probability distribution. In accordance with the present systems and methods, a quantum processor, and in particular a quantum processor designed to perform adiabatic quantum computation and/or quantum annealing, may be operated as a sample generator where each "sample" correspond to a state of the quantum processor and the "population" corresponds to all possible states of the quantum processor. Indeed, due to the effects of noise and thermal energy, operating a quantum processor as a sample generator may be a preferred mode of operating the quantum processor for certain applications. Operating a quantum processor as a sample generator may also enable a broader range of problems to be solved compared to, for example, the direct mapping approach of using a quantum processor previously described. Operating a quantum processor as a sample generator may comprise, for example, sampling from the population of all possible states of the quantum processor by performing adiabatic quantum computation and/or quantum annealing, where each sample corresponds to a respective state obtained by a respective iteration of adiabatic quantum computation and/or quantum annealing.

A quantum processor typically comprises a number N of qubits. The "state" of the quantum processor is defined by the configuration of the respective states of all of the N qubits. Since each qubit is a binary variable (in particular, at the end of a computation when the state of each qubit is either a "1" or a "0"), the state of the quantum processor may be described by a bit string, where each respective state of the quantum processor corresponds to a respective (and unique) bit string. A quantum processor typically operates by receiving a problem and returning a state, or bit string, that corresponds to a solution to the problem. This bit string has a finite length, typically equal to (or less than) N. Thus, there are $2^N$ different configurations for this bit string, so the total number of possible outputs from (i.e., states of) the quantum processor is $2^N$.

Programming a quantum processor to solve a particular problem typically involves programming the quantum processor with a particular problem formulation and/or configuration of a number of programmable parameters. A quantum processor may include a number of programmable elements and/or parameters, and programming the quantum processor with a particular problem formulation and/or configuration of the number of programmable parameters may involve assigning specific values to these programmable elements and/or parameters.

In accordance with some embodiments of the present systems and methods, a quantum processor may be designed to perform adiabatic quantum computation and/or quantum annealing. As previously discussed, a typical adiabatic evolution may be represented by equation 1:

$$H_e = (1-s)H_{In} + sH_f \tag{1}$$

where $H_{In}$ is the initial Hamiltonian, $H_f$ is the final or "problem" Hamiltonian, $H_e$ is the evolution or instantaneous Hamiltonian, and s is the evolution coefficient which controls the rate of evolution. In general, s may vary from 0 to 1 with time t as s(t). A common approach to adiabatic quantum computation ("AQC"), described, for example, in Amin, M.H.S., "Effect of local minima on quantum adiabatic optimization", PRL 100, 130503 (2008), is to start with an initial Hamiltonian of the form shown in equation 2:

$$H_{In} = -\frac{1}{2}\sum_{i=1}^{N}\Delta_i\sigma_i^x \quad (2)$$

where N represents the number of qubits, $\sigma_i^x$ is the Pauli x-matrix for the $i^{th}$ qubit and $\Delta_i$ is the single qubit tunnel splitting induced in the $i^{th}$ qubit. Here, the $\sigma_i^x$ terms are examples of "off-diagonal" terms. An initial Hamiltonian of this form may, for example, be evolved to a final Hamiltonian of the form:

$$H_f = -\frac{\varepsilon}{2}\left[\sum_{i=1}^{N}h_i\sigma_i^z + \sum_{i,j=1}^{N}J_{ij}\sigma_i^z\sigma_j^z\right] \quad (3)$$

where N represents the number of qubits, $\sigma_i^z$ is the Pauli z-matrix for the $i^{th}$ qubit, $h_i$ and $J_{i,j}$ are dimensionless local fields coupled into each qubit, and $\varepsilon$ is some characteristic energy scale for $H_f$. Here, the $\sigma_i^z$ and $\sigma_i^z\sigma_j^z$ terms are examples of "diagonal" terms. Throughout this specification, the terms "final Hamiltonian" and "problem Hamiltonian" are used interchangeably. Hamiltonians such as $H_{In}$ and $H_f$ in equations 2 and 3, respectively, may be physically realized in a variety of different ways. A particular example is realized by an implementation of superconducting qubits.

FIG. 1 is a schematic diagram of a portion of an exemplary superconducting quantum processor 100 designed for AQC (and/or quantum annealing) that may be used to implement the present systems and methods. The portion of superconducting quantum processor 100 shown in FIG. 1 includes two superconducting qubits 101, 102 and a tunable ZZ-coupler 111 coupling information therebetween (i.e., providing pairwise coupling between qubits 101 and 102). While the portion of quantum processor 100 shown in FIG. 1 includes only two qubits 101, 102 and one coupler 111, those of skill in the art will appreciate that quantum processor 100 may include any number of qubits and any number of coupling devices coupling information therebetween.

The portion of quantum processor 100 shown in FIG. 1 may be implemented to physically realize AQC and/or QA by initializing the system with the Hamiltonian described by equation 2 and evolving the system to the Hamiltonian described by equation 3 in accordance with the evolution described by equation 1. Quantum processor 100 includes a plurality of interfaces 121-125 that are used to configure and control the state of quantum processor 100. Each of interfaces 121-125 may be realized by a respective inductive coupling structure, as illustrated, as part of a programming subsystem and/or an evolution subsystem. Such a programming subsystem and/or evolution subsystem may be separate from quantum processor 100, or it may be included locally (i.e., on-chip with quantum processor 100) as described in, for example, U.S. Pat. Nos. 7,876,248 and 8,035,540.

In the operation of quantum processor 100, interfaces 121 and 124 may each be used to couple a flux signal into a respective compound Josephson junction 131, 132 of qubits 101 and 102, thereby realizing the $\Delta_i$ terms in the system Hamiltonian. This coupling provides the off-diagonal $\sigma^x$ terms of the Hamiltonian described by equation 2 and these flux signals are examples of "disordering signals." Similarly, interfaces 122 and 123 may each be used to couple a flux signal into a respective qubit loop of qubits 101 and 102, thereby realizing the $h_i$ terms in the system Hamiltonian. This coupling provides the diagonal $\sigma^z$ terms of equation 3. Furthermore, interface 125 may be used to couple a flux signal into coupler 111, thereby realizing the $J_{ij}$ term(s) in the system Hamiltonian. This coupling provides the diagonal $\sigma_i^z\sigma_j^z$ terms of equation 3. In FIG. 1, the contribution of each of interfaces 121-125 to the system Hamiltonian is indicated in boxes 121a-125a, respectively. Thus, throughout this specification and the appended claims, the terms "problem formulation" and "configuration of a number of programmable parameters" are used to refer to, for example, a specific assignment of $h_i$ and $J_{ij}$ terms in the system Hamiltonian of a superconducting quantum processor via, for example, interfaces 121-125.

Throughout this specification and the appended claims, the term "quantum processor" is used to generally describe a collection of physical qubits (e.g., qubits 101 and 102) and couplers (e.g., coupler 111). The physical qubits 101 and 102 and the couplers 111 are referred to as the "programmable elements" of the quantum processor 100 and their corresponding parameters (e.g., the qubit $h_i$ values and the coupler $J_{ij}$ values) are referred to as the "programmable parameters" of the quantum processor. In the context of a quantum processor, the term "programming subsystem" is used to generally describe the interfaces (e.g., "programming interfaces" 122, 123, and 125) used to apply the programmable parameters (e.g., the $h_i$, $J_{ij}$ and terms) to the programmable elements of the quantum processor 100 and other associated control circuitry and/or instructions. As previously described, the programming interfaces of the programming subsystem may communicate with other subsystems which may be separate from the quantum processor or may be included locally on the processor. As described in more detail later, the programming subsystem may be configured to receive programming instructions in a machine language of the quantum processor and execute the programming instructions to program the programmable elements in accordance with the programming instructions. As illustrated in FIG. 1, programming interfaces 122, 123, and 125 of the programming subsystem of quantum processor 100 may be communicatively coupled, via communication conduits 151 and 152, to a machine language module 150. At least a respective portion of each of communication conduits 151 and 152 may be included "on-chip" (e.g., as superconducting lines or traces) in quantum processor 100. Exemplary characteristics of machine language module 150 are discussed in detail later. Similarly, in the context of a quantum processor, the term "evolution subsystem" is used to generally describe the interfaces (e.g., "evolution interfaces" 121 and 124) used to evolve the programmable elements of the quantum processor 100 and other associated control circuitry and/or instructions. For example, the evolution subsystem may include annealing signal lines and their corresponding interfaces (121, 124) to the qubits (101, 102).

Quantum processor 100 also includes readout devices 141 and 142, where readout device 141 is configured to read out the state of qubit 101 and readout device 142 is configured to read out the state of qubit 102. In the embodiment shown in FIG. 1, each of readout devices 141 and 142 comprises a respective DC-SQUID that is configured to inductively couple to the corresponding qubit (qubits 101 and 102, respectively). In the context of quantum processor 100, the term "readout subsystem" is used to generally describe the readout devices 141, 142 used to read out the final states of the qubits (e.g., qubits 101 and 102) in the quantum processor to produce a bit string. The readout subsystem may also include other elements, such as routing circuitry (e.g., latching elements, a shift register, or a multiplexer circuit) and/or may be arranged in alternative configurations (e.g., an XY-addressable array, an XYZ-addressable array, etc.). Qubit readout may also be performed using alternative circuits, such as that described in PCT Patent Publication 2012-064974.

While FIG. 1 illustrates only two physical qubits 101, 102, one coupler 111, and two readout devices 141, 142, a quantum processor (e.g., processor 100) may employ any number of qubits, couplers, and/or readout devices, including a larger number (e.g., hundreds, thousands or more) of qubits, couplers and/or readout devices. The application of the teachings herein to processors with a different (e.g., larger) number of computational components should be readily apparent to those of ordinary skill in the art.

The operation of the quantum processor systems described herein is typically affected by environmental factors such as noise and thermal energy, and these factors (together with, in some cases, the underlying quantum mechanical nature of the algorithm being employed) can render the output of the quantum processors probabilistic. For a given problem formulation or configuration of a number of programmable parameters for the quantum processor, a quantum processor may not return the same output in repeated applications of the same algorithm (e.g., in repeated iterations of adiabatic quantum computation and/or quantum annealing). In accordance with the present systems and methods, the output of the quantum processors described herein, and in particular the output of a quantum processor designed to perform adiabatic quantum computation and/or quantum annealing, may be processed as a sample from a probability distribution, where the sample itself is a state of the quantum processor (e.g., a bit string) and the probability distribution is a representation of the relative probabilities of all $2^N$ states of the quantum processor.

Figure 2:
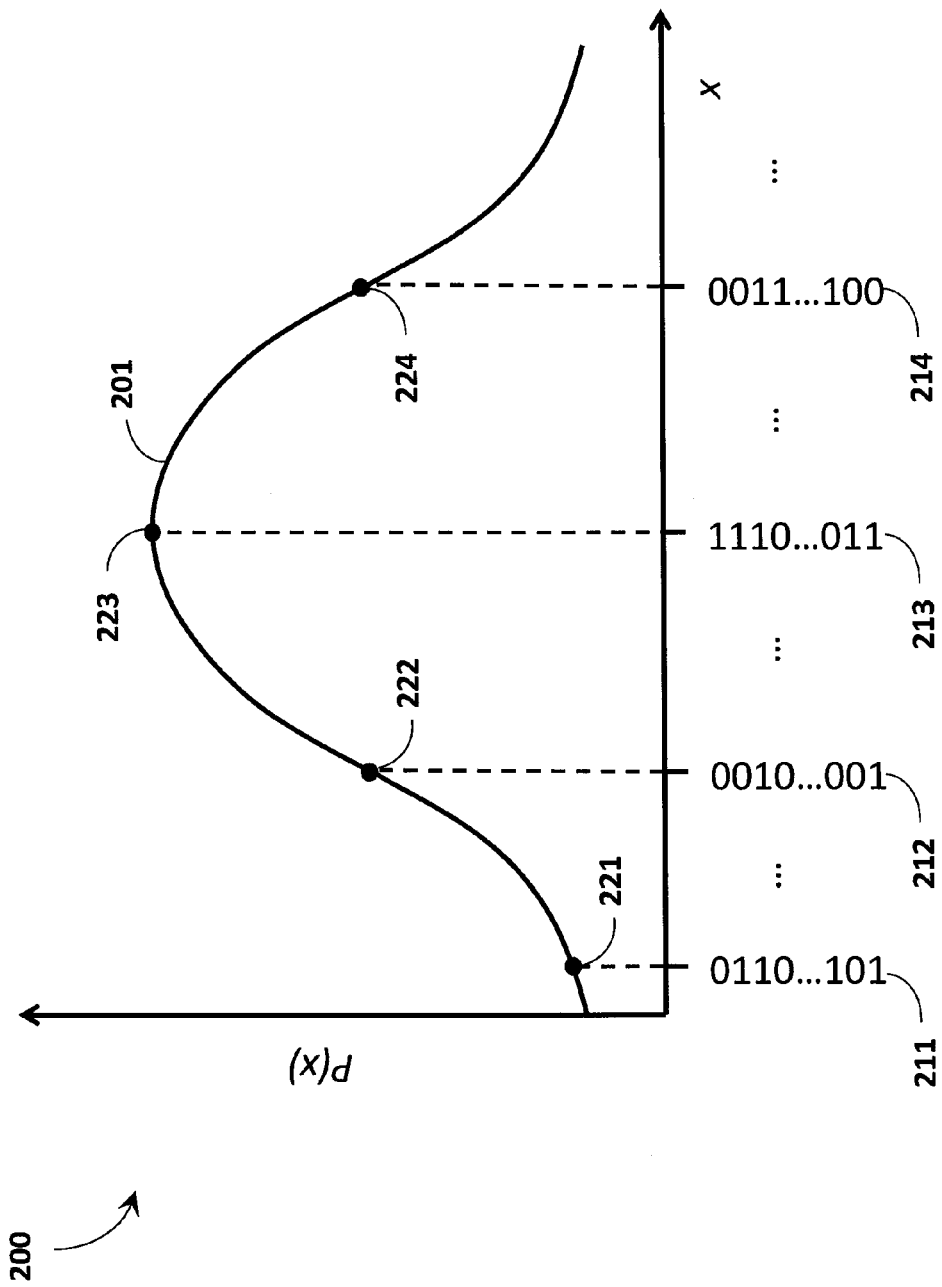
FIG. 2 is an illustrative graph of an exemplary probability distribution for a quantum processor having a specific configuration of programmable parameters, in accordance with the present systems and methods.

FIG. 2 shows an illustrative graph of an exemplary probability distribution 200 for a quantum processor having a specific problem formulation and/or configuration of programmable parameters, in accordance with the present systems and methods. The graph in FIG. 2 includes an x-axis labeled as "x" and a y-axis labeled as "P(x)." The x-axis lists all $2^N$ bit strings x that could be output by the quantum processor (i.e., all $2^N$ states of the quantum processor). Only an exemplary subset of four such bit strings (211, 212, 213, and 214) are shown in FIG. 2 to reduce clutter. The y-axis provides the probability P(x) that any given bit string x is output by the quantum processor for a specific problem formulation and/or configuration of programmable parameters. As illustrated in FIG. 2, bit string 211 has a corresponding probability, or P(x) value, at point 221 in the graph; bit string 212 has a corresponding probability, or P(x) value, at point 222 in the graph; bit string 213 has a corresponding probability, or P(x) value, at point 223 in the graph; and bit string 214 has a corresponding probability, or P(x) value, at point 224 in the graph. The probability distribution 200 of the quantum processor in any particular problem formulation and/or configuration of programmable parameters corresponds to the collection of all probabilities P(x) corresponding to all bit strings x of the quantum processor in that particular problem formulation and/or configuration of programmable parameters. An illustration of the shape of the probability distribution is given by a continuous line passing through all P(x) values at each corresponding x bit string, illustrated by curve 201 in FIG. 2.

In accordance with the present systems and methods, the shape of the probability distribution of a quantum processor may be characteristic of (i.e., dependent upon and/or particular to) the problem formulation and/or configuration of programmable parameters being employed. In other words, the shape of the probability distribution may change depending on how the quantum processor is programmed. The probability distribution 200 illustrated in FIG. 2 shows that some bit strings x may have a higher probability P(x) of being output by the quantum processor than other bit strings. Specifically, in probability distribution 200, bit string 213 has the highest probability 223 of being output by the quantum processor for the particular problem formulation and/or configuration of programmable parameters to which probability distribution 200 corresponds. As taught in US Patent Publication 2012-0023053, the state (bit string) with the highest probability of being output by a quantum processor programmed with a particular problem formulation and/or configuration of programmable parameters may typically correspond to a minimum energy configuration for the quantum processor and a good (e.g., the best) solution to that particular problem formulation. Thus, for probability distribution 200 shown in FIG. 2, bit string 213 is likely a good (and potentially the best) solution to the problem. This relationship between solution probability and solution quality is an inherent benefit to the underlying operation of the quantum processors described in the present systems and methods.

Adiabatic quantum computation and quantum annealing both attempt to resolve a minimum energy configuration for the elements of a quantum processor, subject to a specific problem formulation and/or configuration of programmable parameters. In either algorithm, the processor intrinsically tends to return a bit string corresponding to a relatively low energy configuration of the processor with higher probability compared to the probability of returning a bit string corresponding to a relatively high energy configuration of the quantum processor. Environmental influences such as noise and thermal energy can excite the processor during computation (i.e., during evolution) and result in a bit string being returned that is not the lowest energy configuration of the processor, but in general the bit string returned will tend to correspond to at least a "low-energy" state (if not the lowest energy state) of the quantum processor with high probability. Environmental factors may excite the quantum processor out of its lowest energy configuration, but it is still the underlying nature of the adiabatic quantum computation and quantum annealing algorithms described herein to stabilize in a low (e.g., the lowest) energy configuration available accounting for the influences of the environmental factors. These environmental factors can be random and their effects can be difficult to predict. Accordingly, as taught in US Patent Publication 2012-0023053, in many applications it is advantageous to run an adiabatic quantum computation and/or quantum annealing algorithm multiple times and to extract the "best" solution from the solution set generated.

The applications of adiabatic quantum computation and/or quantum annealing in the presence of environmental factors such as noise and thermal energy described in the present systems and methods may be treated as sampling processes, where the quantum processor is operated as a sample generator that intrinsically tends to provide samples from low-energy states with high probability. In other words, the probability distributions of the quantum processors described herein are such that the processors intrinsically tend to return low-energy states with high probability and high-energy states with low probability. In accordance with the present systems and methods, a sample generator that intrinsically provides samples from low-energy states with high probability may be particularly useful in solving combinatorial optimization problems, such as minimization problems.

While the quantum processors described herein intrinsically return low-energy states with high probability, the actual shape of the probability distribution corresponding to a quantum processor depends on how the quantum processor is programmed. In accordance with the present systems and methods, the shape of the probability distribution corresponding to a quantum processor may be deliberately adjusted or tuned so that high probability bit strings correspond to desired solutions to a computational problem.

Throughout this specification and the appended claims, reference is often made to the "shape" of a probability distribution. Unless the context requires otherwise, the "shape" of a probability distribution refers to the relative probabilities corresponding to the bit strings that may be output by the sample generator (e.g., quantum processor). In FIG. 2, curve 201 illustrates an embodiment of the shape of probability distribution 200; however, a person of skill in the art will appreciate that probability distribution 200 may be re-drawn with a different x-axis configuration such that the same relative probabilities corresponding to the bit strings result in a completely different curve 201. For example, since the x-axis in FIG. 2 is simply a list of bit strings, the list may be presented in any order. Alternative ordering of the bit strings along the x-axis of FIG. 2 may completely change the shape of curve 201, but (for a given problem formulation and/or configuration of programmable parameters) the relative probabilities for the bit strings will remain the same and thus, for the purposes of the present systems and methods, the "shape" of the probability distribution will be preserved. Thus, the shape of a probability distribution may, for example and in some instances, be regarded as a "topology" of the probability distribution.

In some embodiments, the shape of the probability distribution of a quantum processor may at least approximate a Boltzmann distribution.

The various embodiments described herein provide systems and methods for using a quantum processor to minimize an objective function by operating the quantum processor as a sample generator providing samples from a probability distribution and shaping the probability distribution to assign relative probabilities to samples based on their corresponding objective function values. The objective function may, for example, be of any arbitrary form (e.g., quadratic, non-quadratic, having a degree of two, having a degree greater than two, etc.) and does not itself need to be mapped directly to the quantum processor or even be completely characterized. For instance, the objective function may receive a discrete-valued input (e.g., a bit string) and return a number (i.e., a numeric value, such as a real number value) as an output corresponding to that input. The objective may include an oracle (i.e., a mechanism used by software engineers to determine whether a test has passed or failed). Thus, even though the quantum processor being employed may intrinsically solve a specific native problem (e.g., an Ising spin glass problem or a QUBO problem), in the present systems and methods there is no need to re-cast the objective function in an intermediate formulation that maps directly to the native problem of the quantum processor. Accordingly, the present systems and methods may be used to solve problems that wouldn't otherwise map directly to the quantum processors being employed and/or the present systems and methods may be used to facilitate a user's interactions with a quantum processor by eliminating the need to perform the re-casting and mapping steps associated with the "direct mapping" approach (previously described). For example, the present systems and methods may employ a quantum processor to solve problems having more variables than the numbers of qubits in the quantum processor and/or to solve problems having connectivity that is not present in, not physically available in, or otherwise different from the particular quantum processor (e.g., problems having higher connectivity than present or physically available in the quantum processor and/or higher-order interactions than present in the quantum processor and/or specific variable interactions otherwise not available in the quantum processor). The present systems and methods provide techniques of using quantum processors that are less dependent on the architecture of the processors themselves (compared to the direct mapping approach) and enable a broad range of problems to be solved.

Throughout this specification and the appended claims, the terms "shaping" and "to shape" in the context of a probability distribution (e.g., "shaping a probability distribution" and "to shape a probability distribution") refer to a process of changing the shape of a probability distribution. For example, "shaping" or "to shape" a probability distribution of a sample generator, such as a quantum processor, means changing at least one programmable parameter in a configuration of programmable parameters for the sample generator in order to change the relative probability of at least one state (e.g., bit string) being output by the sample generator. Referring to FIG. 2, probability distribution 200 corresponds to a specific configuration of programmable parameters for a quantum processor that produces, for example, a probability P(x) at 223 for bit string 213. "Shaping" probability distribution 200 may correspond to, for example, changing at least one programmable parameter of the quantum processor to produce a new configuration of programmable parameters such that bit string 213 has a probability P(x) that is no longer at 223, but is instead at a point either higher or lower (i.e., a point that has higher or lower probability) than point 223.

Shaping a probability distribution may include, for example, iteratively mapping samples corresponding to low values of the objective function to high probability regions of the probability distribution for a series of different configurations of programmable parameters for the quantum processor until the low-energy states of the quantum processor converge to low values of the objective function.

The probability distribution of a quantum processor may, for example, be shaped to effectively impose tabu constraints by assigning low probability to bit strings corresponding to samples that have previously been generated such that predominately new samples are explored in subsequent iterations. Assigning low probability to bit strings corresponding to samples that have previously been generated may itself be an iterative process. For example, in some embodiments, a bit string that is generated as a sample in a first iteration may be "slightly penalized" (i.e., assigned a slightly lower probability) in a second iteration, "slightly more penalized" (i.e., assigned an even lower probability) in a third iteration, and so forth until the bit string is eventually assigned a very low probability. The technique of gradually imposing tabu constraints over multiple iterations can help to avoid providing samples from local minima when a global minimum is sought.

Throughout this specification and the appended claims, the phrase "assigning probability" (e.g., "assigning high probability," "assigning low probability," etc.) is often used. The "assigning probability" may be implemented by, for example, adjusting an effective temperature. The quantum processors described herein may, for example, intrinsically tend to avoid providing (i.e., they may intrinsically assign low probability to) samples that have a high effective temperature. Thus, "assigning low probability" to a sample may be implemented by biasing the sample with a relatively high effective temperature. From this point of view, the iterative introduction of tabu constraints described above may be viewed as a type of annealing process, where the effective temperature of samples that have previously been generated is gradually increased over multiple iterations until the probability of repeating those samples is very low.

Throughout this specification and the appended claims, reference is often made to "minimizing an objective function." Those of skill in the art will appreciate that many computational problems (even maximization problems) may be formulated as a minimization of an objective function. The various embodiments described herein are intrinsically well-suited to minimization, but may be employed to solve any type of problem that can be formulated as a minimization of an objective function.

Figure 3A:
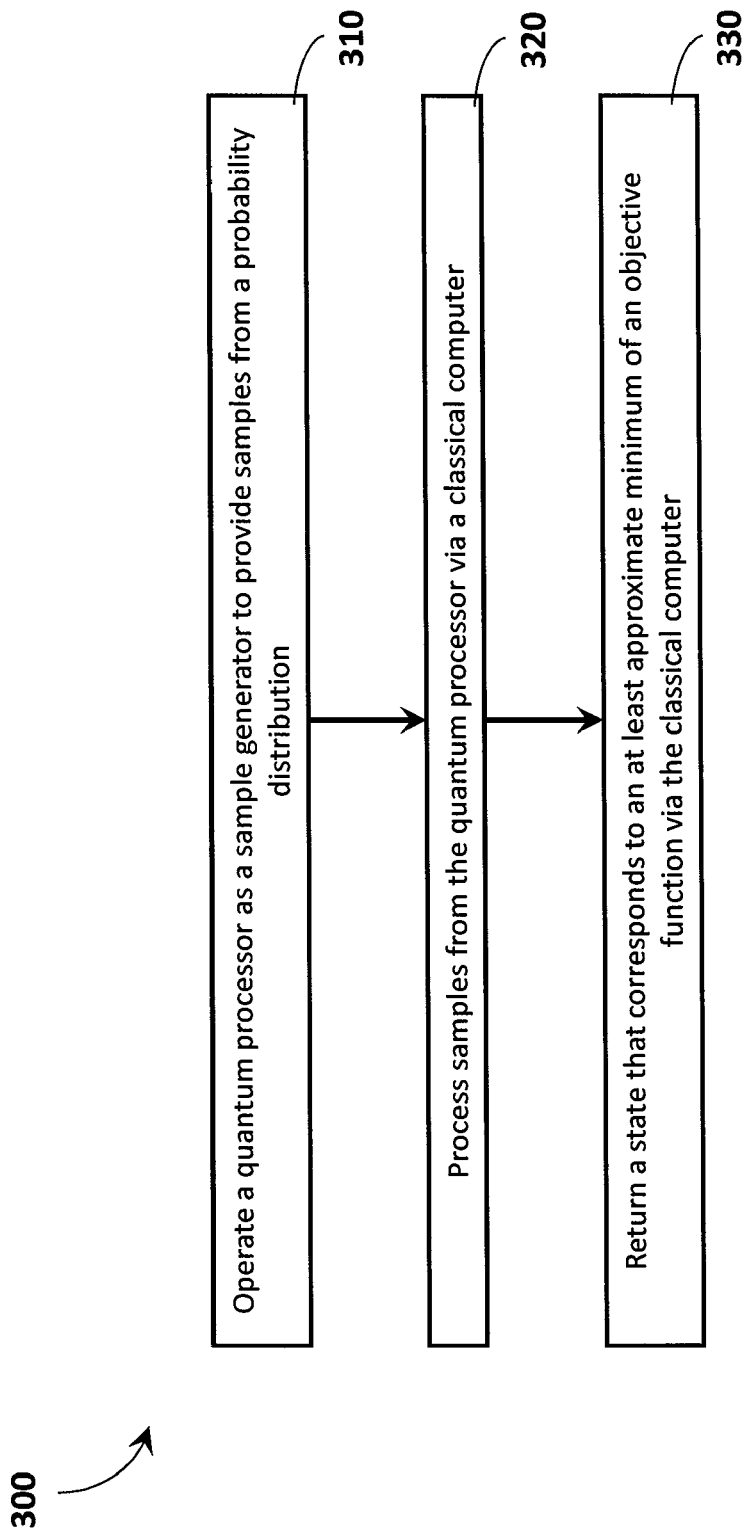
FIG. 3A is a flow-diagram showing a method of operating a quantum processor and a digital computer to at least approximately minimize an objective function in accordance with the present systems and methods.

FIG. 3A is a flow-diagram showing a method 300 of operating a quantum processor and a digital computer to at least approximately minimize an objective function in accordance with the present systems and methods. Method 300 includes three acts 310, 320, and 330, though those of skill in the art will appreciate that in alternative embodiments certain acts may be omitted and/or additional acts may be added. Those of skill in the art will appreciate that the illustrated order of the acts is shown for exemplary purposes only and may change in alternative embodiments. At 310, a quantum processor is operated as a sample generator to provide samples from a probability distribution. A shape of the probability distribution may depend on a configuration of a number of programmable parameters for the quantum processor with a number of low-energy states of the quantum processor respectively corresponding to a number of high probability samples of the probability distribution. At 320, the samples from the quantum processor are processed via a digital computer. A result of processing the samples from the quantum processor may be communicated via the digital computer to the operating of the quantum processor in order to, for example, provide at least one additional sample from the quantum processor based on the processing of the samples from the quantum processor. For example, the probability distribution of the quantum processor may be shaped based on the processing of the samples from the quantum processor via the digital computer. Shaping the probability distribution of the quantum processor may include, for example, changing the configuration of the number of programmable parameters for the quantum processor. At 330, a state that corresponds to an at least approximate minimum of the objective function is returned. The returned state may, for example, be represented by a bit string that corresponds to the minimum of the objective function. Alternatively, the returned state may be represented by a bit string that corresponds to a low-value (e.g., an approximation of the minimum) of the objective function.

Method 300 from FIG. 3A provides a high-level example of a method of operation in a hybrid problem solving system that comprises both a quantum processor and a digital computer to at least approximately solve a problem, where the problem being solved is the minimization of an objective function. Any and/or all of the high-level acts 310, 320, and 330 of method 300 may involve additional low-level details.

For example, FIG. 3B is a flow-diagram showing exemplary low-level details of a method 310 of operating a quantum processor as a sample generator to provide samples from a probability distribution (i.e., act 310 from FIG. 3A) in accordance with the present systems and methods. Method 310 includes four acts 311-314, though those of skill in the art will appreciate that in alternative embodiments certain acts may be omitted and/or additional acts may be added. Those of skill in the art will appreciate that the illustrated order of the acts is shown for exemplary purposes only and may change in alternative embodiments. At 311, a configuration of a number of programmable parameters for the quantum processor is defined via a digital computer. The configuration of the number of programmable parameters may, for example, correspond to a probability distribution over a set of states of the quantum processor. Furthermore, the configuration of the number of programmable parameters for the quantum processor may, for example, be defined based on a processing of the samples (i.e., act 320 from FIG. 3A) via the digital computer. At 312, the quantum processor is programmed with the configuration of the number of programmable parameters via a programming subsystem. At 313, the quantum processor is evolved via an evolution subsystem. Evolving the quantum processor may, for example, include performing at least one of adiabatic quantum computation or quantum annealing. At 314, a state of the quantum processor is read out via a readout subsystem. The state of the quantum processor that is read out corresponds to a sample from the probability distribution. In order to account for the effects of thermal noise and other environmental influences, acts 313 and 314 may, for example, be repeated multiple times if desired and a particular sample (e.g., the sample with the lowest energy or the sample that is read out most often) may be returned. Furthermore, all of acts 311-314 may be repeated multiple times in order to generate samples from multiple probability distributions.

Figure 3C:
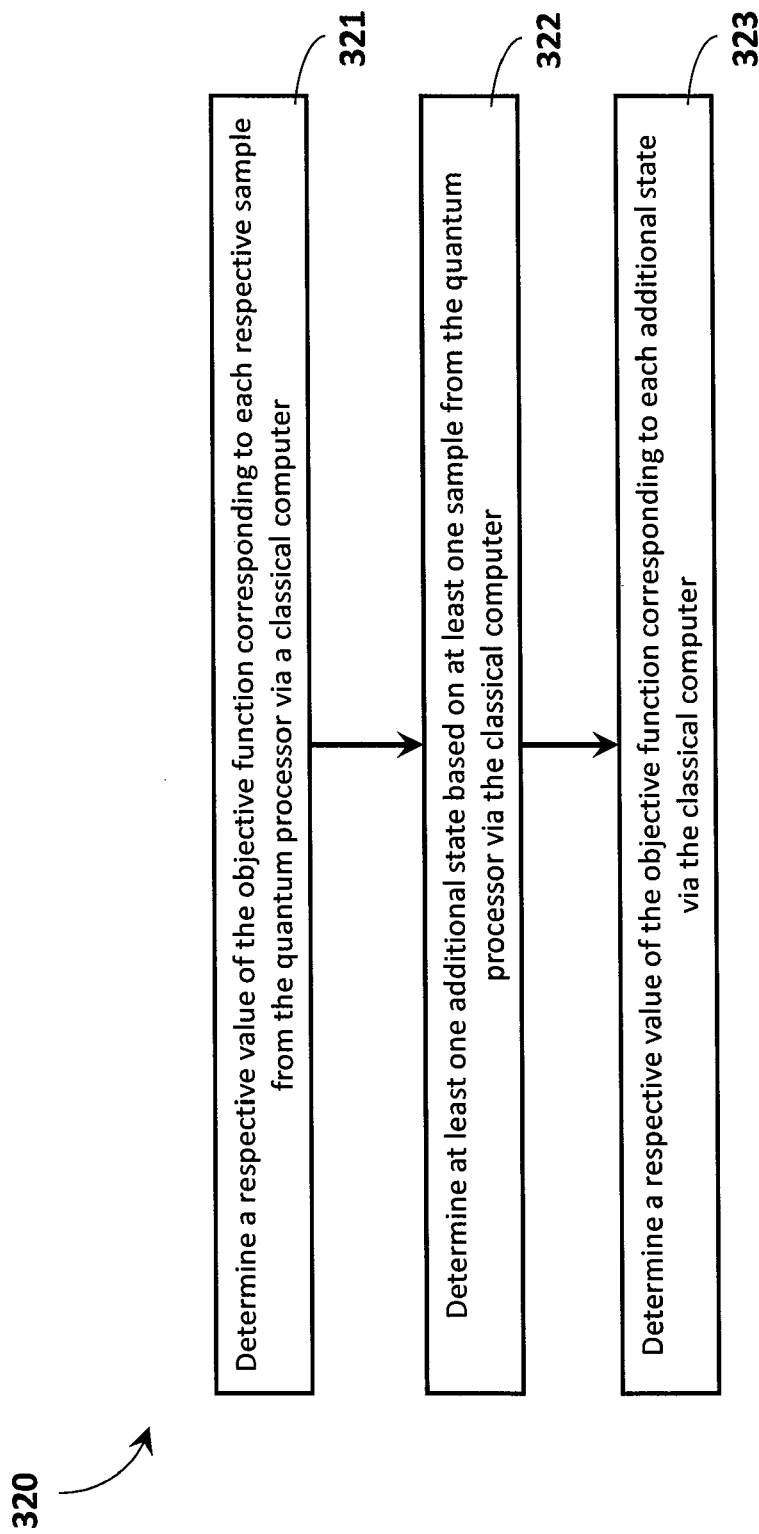
FIG. 3C is a flow-diagram showing exemplary low-level details of a method of processing samples from a quantum processor via a digital computer in accordance with the present systems and methods.

Similarly, FIG. 3C is a flow-diagram showing exemplary low-level details of a method 320 of processing samples from a quantum processor via a digital computer (i.e., act 320 from FIG. 3A) in accordance with the present systems and methods. Method 320 includes three acts 321-323, though those of skill in the art will appreciate that in alternative embodiments certain acts may be omitted and/or additional acts may be added. Those of skill in the art will appreciate that the illustrated order of the acts is shown for exemplary purposes only and may change in alternative embodiments. At 321, a respective value of the objective function corresponding to each respective sample from the quantum processor is determined via the digital computer. The digital computer may, for example, include an evaluation module to determine a respective value of the objective function corresponding to each respective sample from the quantum processor. At 322, at least one additional state is determined via the digital computer based on at least one sample from the quantum processor. The digital computer may, for example, include an exploration module to determine at least one additional state based on at least one sample from the quantum processor. A classical heuristic optimization algorithm may be performed via the digital computer to determine the at least one additional state based on at least one sample from the quantum processor. The classical heuristic optimization algorithm may include, for example, at least one of a local search algorithm, a tabu search algorithm, a simulated annealing algorithm, a genetic algorithm, or any combination thereof and/or any other classical heuristic optimization algorithm. As described in U.S. Pat. No. 8,175,995, at least one sample from the quantum processor may be cast as the starting point for a classical heuristic optimization algorithm via a digital computer in order to determine a new state (i.e., an additional state) that is an improvement on or refinement of the sample from the quantum processor. The at least one additional state may include a local state from a neighborhood of a sample from the quantum processor. At 323, a respective value of the objective function corresponding to each additional state is determined via the digital computer (e.g., via an evaluation module). As will be discussed in more detail below, processing samples from the quantum processor via the digital computer may also include, for example, constructing a model of the objective function via the digital computer and evolving the model via the digital computer based at least partially on the value of the objective function corresponding to at least one sample/state. As will also be discussed in more detail below, the digital computer may include a software stack having an abstraction module that stores, generates, and/or executes instructions for performing any and/or all of acts 321-323 of method 320. A user may interact with the abstraction module via a client library module, and the abstraction module may interact with a quantum processor via a machine language module.

Throughout this specification and the appended claims, reference is often made to a "neighborhood of a sample" and/or a "neighborhood of a state." The "neighborhood" of a sample (or state) is generally used to refer to a set of additional samples (or states) that are close to or within a vicinity of the sample (or state). For example, a sample that corresponds to a state of a quantum processor may correspond to a specific energy state of the quantum processor and the "neighborhood" of the sample may include other states of the quantum processor with respective energies that are within a certain range of the sample. Similarly, a sample that corresponds to a bit string may have a "neighborhood" that includes all other bit strings within a certain Hamming distance (i.e., within a certain number of bit flips) of the sample. For example, a bit string having N bits may have a neighborhood that includes all bit strings within a Hamming distance of 0.5 N, 0.25 N, 0.1 N, 0.05 N, etc. as appropriate for the specific application. In the case of the minimization of an objective function, the objective function may include a number of low-value regions (i.e., minima or wells) corresponding to local minima and a lowest-value region corresponding to a global minimum. A well typically includes multiple low-value states, with the minimum (i.e., the base of the well) corresponding to the lowest-value state within the well. Thus, in this case the "neighborhood" of a sample may include the other samples within the same well (i.e., local or global minimum) as the sample.

Furthermore, throughout this specification and the appended claims, the term "local" (as in "local state," "local sample," and "local bit string") is used to describe a state (or sample, or bit string) from within a neighborhood of another state (or sample, or bit string).

Figure 4:
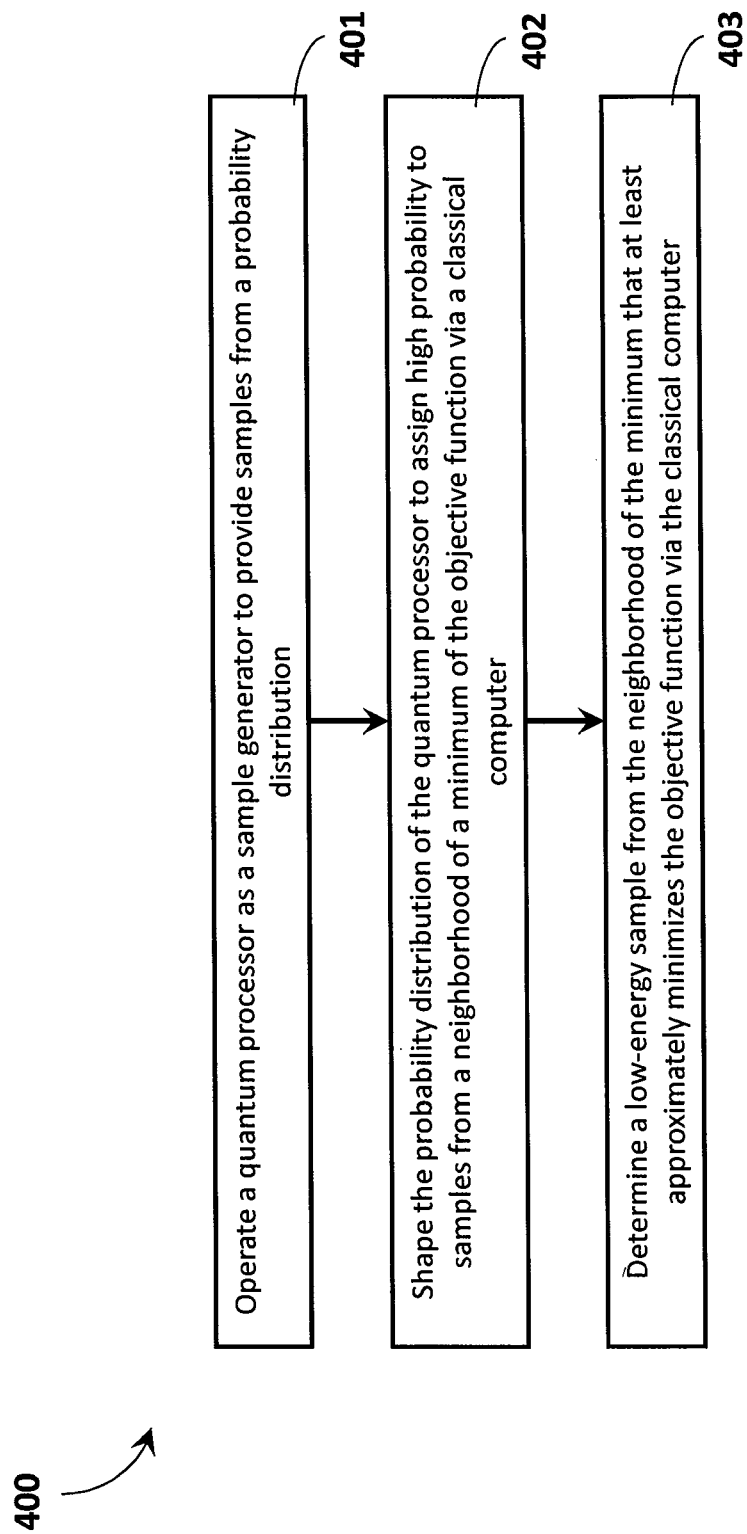
FIG. 4 is a flow-diagram showing a method of operating a quantum processor and a digital computer to at least approximately minimize an objective function having at least one minimum, in accordance with the present systems and methods.

FIG. 4 is a flow-diagram showing a method 400 of operating a quantum processor and a digital computer to at least approximately minimize an objective function having at least one minimum, in accordance with the present systems and methods. Here, the term "at least one minimum" is used to indicate that the objective function has at least a global minimum but may include one or more local minima as well. Method 400 includes three acts 401-403, though those of skill in the art will appreciate that in alternative embodiments certain acts may be omitted and/or additional acts may be added. Those of skill in the art will appreciate that the illustrated order of the acts is shown for exemplary purposes only and may change in alternative embodiments. At 401, the quantum processor is operated as a sample generator to provide samples from a probability distribution in substantially the same manner as that described for act 310 from method 300 (i.e., FIGS. 3A and 3B). Operating the quantum processor as a sample generator may include performing at least one of adiabatic quantum computation or quantum annealing. At 402, the probability distribution of the quantum processor is shaped via the digital computer to assign high probability to samples from a neighborhood of a minimum of the objective function. Preferably, the minimum is the global minimum of the objective function, but in practice this can be difficult to guarantee and the minimum may be a local minimum of the objective function. As an alternative to act 402 (or in combination therewith), the probability distribution of the quantum processor may be shaped via the digital computer to assign low probability to samples outside the neighborhood of a minimum of the objective function. Shaping the probability distribution to assign high probability to samples from a neighborhood of a minimum of the objective function (and likewise, to assign low probability to samples from outside a neighborhood of a minimum of the objective function) may include, for example, changing the configuration of a number of programmable parameters for the quantum processor via the digital computer. As previously described, each sample may correspond to a respective bit string having, for example, N bits and shaping the probability distribution of the quantum processor to assign high probability to samples from a neighborhood of a minimum may include shaping the probability distribution of the quantum processor to assign high probability to bit strings from within a Hamming distance of less than or equal to about 0.1 N from the minimum.

At 403, a low-energy sample from the neighborhood of the minimum that at least approximately minimizes the objective function is determined via the digital computer. Determining a low-energy sample from the neighborhood of the minimum that at least approximately minimizes the objective function may include determining a respective value of the objective function corresponding to each respective sample (i.e., each sample generated at 401) and returning a sample that at least approximately minimizes the objective function via the digital computer. Determining a low-energy sample from the neighborhood of the minimum that at least approximately minimizes the objective function may also include, for example, determining additional samples via the digital computer based on at least one of the samples from the quantum processor. As previously described, additional samples may be determined by performing a classical heuristic optimization algorithm such as, for example but not limited to, a local search algorithm, a tabu search algorithm, a simulated annealing algorithm, a path re-linking algorithm, and/or a genetic algorithm. The additional samples may include at least one local sample from a neighborhood of (e.g., if the samples are bit strings having N bits, then at least one local bit string from within a Hamming distance of about less than or equal to about 0.1 N from) at least one of the samples from the quantum processor.

The various embodiments described herein provide multiple techniques for shaping the probability distribution of the quantum processor. For example, the probability distribution of the quantum processor may be shaped by assigning high probability to samples that correspond to low values of the objective function. Also for example, the probability distribution of the quantum processor may be shaped by assigning low probability to samples that correspond to high values of the objective function. The exploration of new samples may be encouraged by, for example, assigning low probability to each sample that is generated to effectively apply tabu constraints to samples that have already been generated. In each of these techniques, shaping the probability distribution of the quantum processor is an iterative/recursive process where the quantum processor is initialized with a first configuration of programmable parameters, a set of samples are drawn from the quantum processor, and the set of samples is used to determine a new configuration of programmable parameters for the quantum processor. Thus, the result of a first quantum computation may be used to influence a second quantum computation in a manner somewhat analogous to that described in US Patent Publication 2008-0313114. This process may be repeated using any, all, or a subset of the techniques described above.

Figure 5:
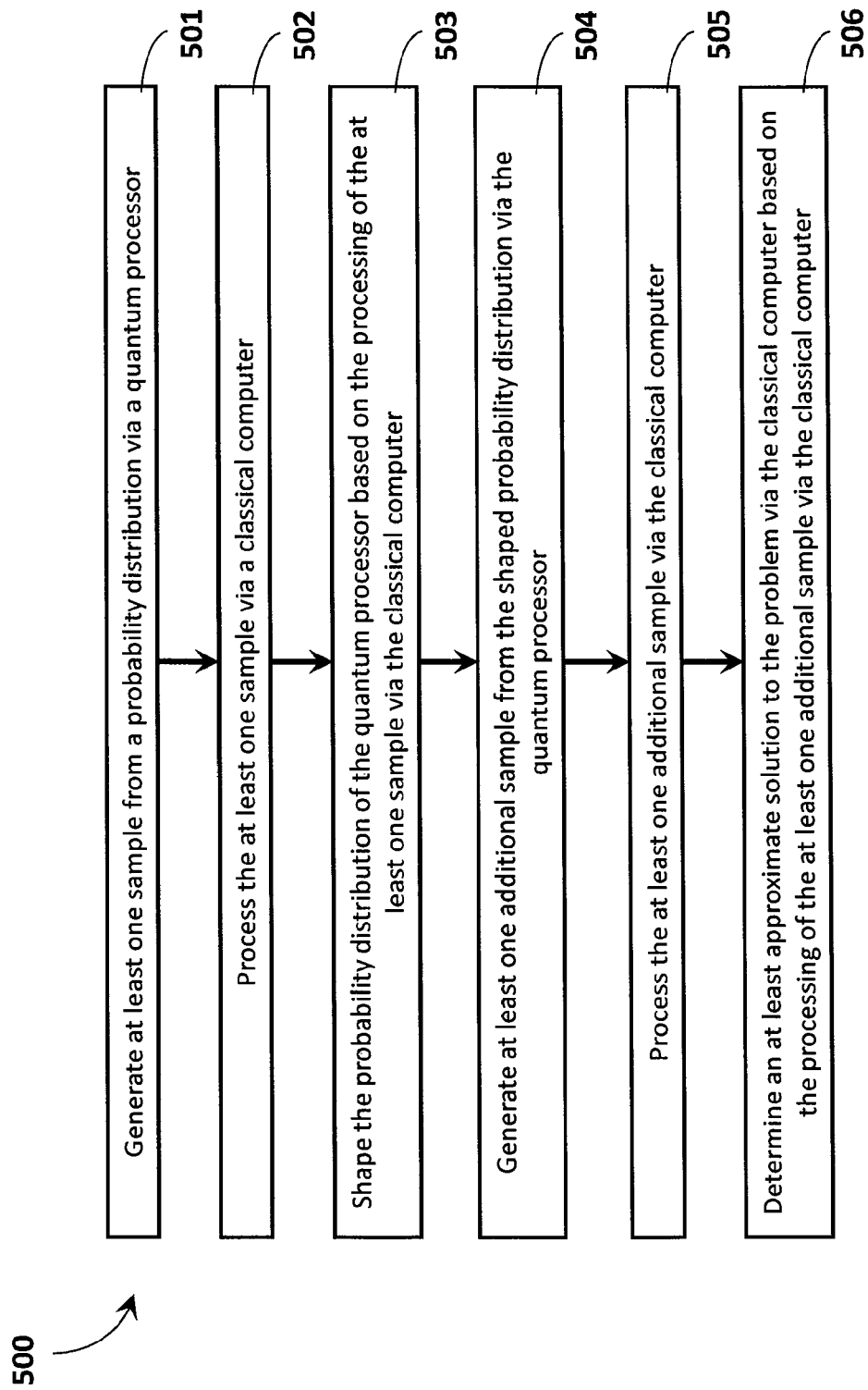
FIG. 5 is a flow-diagram showing a method of operating a quantum processor and a digital computer to at least approximately solve a problem in accordance with the present systems and methods.

FIG. 5 is a flow-diagram showing a method 500 of operating a quantum processor and a digital computer to at least approximately solve a problem in accordance with the present systems and methods. Method 500 includes six acts 501-506, though those of skill in the art will appreciate that in alternative embodiments certain acts may be omitted and/or additional acts may be added. Those of skill in the art will appreciate that the illustrated order of the acts is shown for exemplary purposes only and may change in alternative embodiments. At 501, at least one sample from a probability distribution is generated via the quantum processor. The shape of the probability distribution may depend on, for example, a configuration of a number of programmable parameters for the quantum processor such that a number of low-energy states of the quantum processor respectively correspond to a number of high probability samples of the probability distribution. As previously described, generating at least one sample from the probability distribution may include performing at least one of adiabatic quantum computation or quantum annealing via the quantum processor. At 502, the at least one sample is processed via the digital computer. As previously described, processing a sample may include any or all of: determining a result of the problem that corresponds to the sample; casting the sample as a starting point for a classical heuristic optimization algorithm such as (but not limited to) a local search algorithm, a tabu search algorithm, a simulated annealing algorithm, a path re-linking algorithm, and/or a genetic algorithm; and/or generating at least one local sample from a neighborhood of the sample. At 503, the probability distribution of the quantum processor is shaped via the digital computer based on the processing of the at least one sample. Shaping the probability distribution of the quantum processor may include, for example, changing the configuration of the number of programmable parameters for the quantum processor to produce a "shaped probability distribution." As previously described, shaping the probability distribution of the quantum processor based on the processing of the at least one sample may include any or all of: changing the configuration of the number of programmable parameters for the quantum processor to assign high probability to at least one sample, and/or changing the configuration of the number of programmable parameters for the quantum processor to assign low probability to at least one sample. At 504, at least one additional sample from the shaped probability distribution is generated via the quantum processor. At 505, the at least one additional sample is processed via the digital computer in, for example, substantially the same way as in act 502. At 506, an at least approximate solution to the problem is determined via the digital computer based on the processing of the at least one additional sample. The at least approximate solution to the problem may, for example, correspond to a sample from the quantum processor whose corresponding result of the problem (as determined in act 502 or 505) satisfies at least one solution criterion, such as (but not limited to) any or all of: a minimum degree of solution accuracy, a maximum allowed computation time, and/or a maximum allowed number of samples generated. Alternatively, the at least approximate solution to the problem may, for example, correspond to a sample from the digital computer resulting from a classical heuristic optimization algorithm based on a sample from the quantum processor, or a local sample from a neighborhood of a sample from the quantum processor as determined by the digital computer.

As previously described, the present systems and methods may be used to solve any type of problem, but are particularly well-suited for use in solving optimization problems, such as the problem of minimizing an objective function. At a general level, the present systems and methods describe operating a sample generator system that includes at least one quantum processor and at least one digital computer to generate samples, with no limitation on how the samples themselves are used. In other words, the samples may be used for any sampling application, not just solving a problem such as the minimization of an objective function. Exemplary sampling applications include, but are not limited to: modeling a system, determining a property of a system, processing a signal, and/or analyzing or otherwise processing data. Further exemplary sampling applications include, but are not limited to: Monte Carlo sampling, Metropolis-Hastings sampling, importance sampling, Umbrella sampling, etc.

Figure 6:
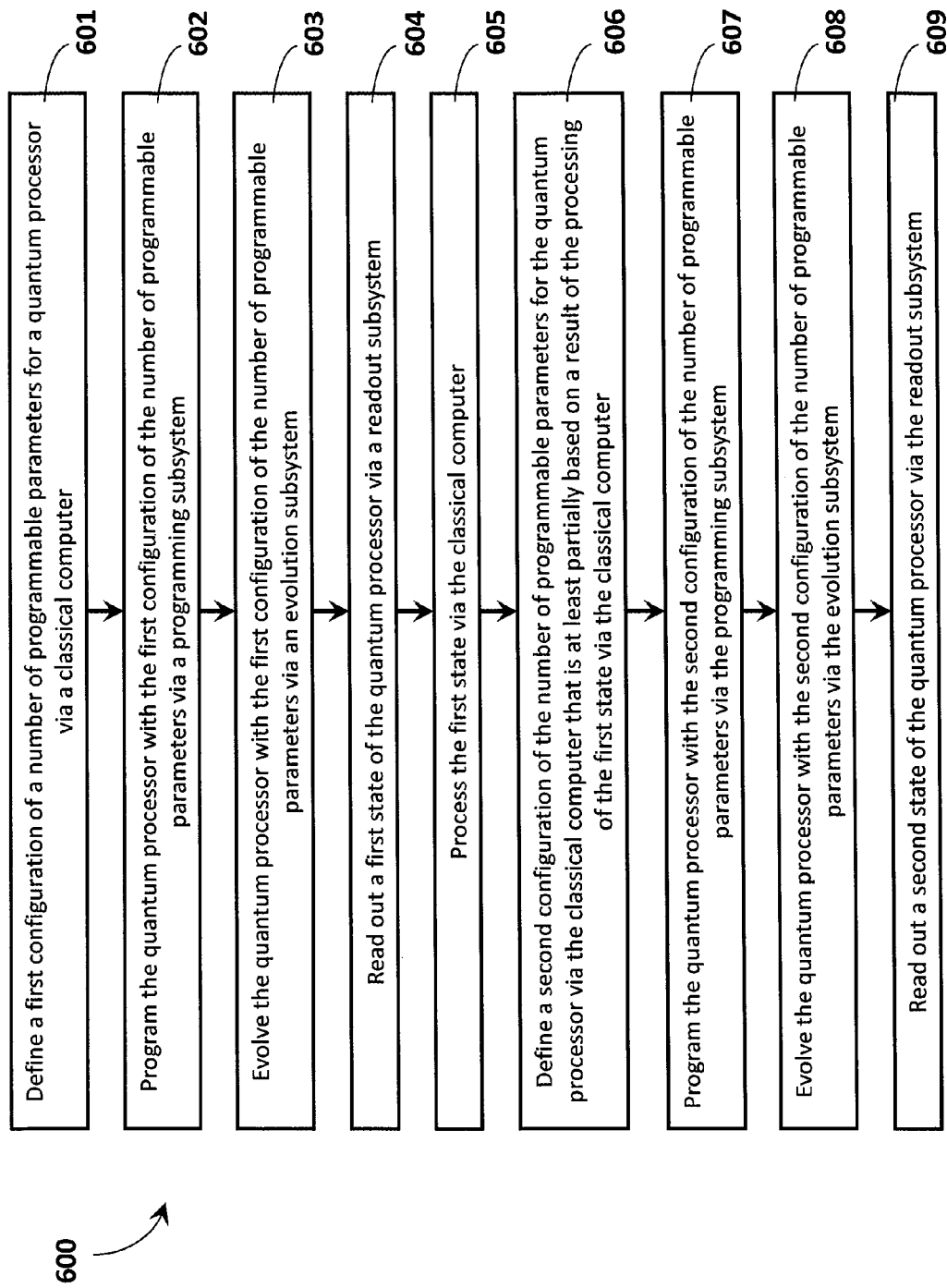
FIG. 6 is a flow-diagram showing a method of operating a sample generator system comprising at least one quantum processor and at least one digital computer to generate samples in accordance with the present systems and methods.

FIG. 6 is a flow-diagram showing a method 600 of operating a sample generator system comprising at least one quantum processor and at least one digital computer to generate samples in accordance with the present systems and methods. Method 600 includes nine acts 601-609, though those of skill in the art will appreciate that in alternative embodiments certain acts may be omitted and/or additional acts may be added. Those of skill in the art will appreciate that the illustrated order of the acts is shown for exemplary purposes only and may change in alternative embodiments. At 601, a first configuration of a number of programmable parameters for a (i.e., at least one) quantum processor is defined via a (i.e., at least one) digital computer. The number of programmable parameters may, for example, include programming signals for qubits and/or coupling devices that make up the quantum processor. For example, the quantum processor may be a superconducting quantum processor such as processor 100 from FIG. 1, employing superconducting flux qubits 101, 102 and superconducting coupling devices 111 providing communicative coupling between pairs of superconducting flux qubits. Thus, the first configuration of a number of programmable parameters may include a first configuration of the $h_i$ and $J_{ij}$ terms as explained in the context of FIG. 1 above. However, the number of programmable parameters may also include other parameters, including but not limited to: parameters controlling the evolution of the quantum processor, the thermalization time of the quantum processor, and/or the number of iterations to be run on the quantum processor. At 602, the quantum processor is programmed with the first configuration of the number of programmable parameters via a programming subsystem. The programming subsystem may include a plurality of programming interfaces, such as programming interfaces 122, 123, and 125 from FIG. 1. At 603, the quantum processor is evolved with the first configuration of the number of programmable parameters via an evolution subsystem. The evolution subsystem may include evolution interfaces, such as evolution interfaces 121 and 124. As previously described, evolving the quantum processor may involve performing at least one of adiabatic quantum computation and/or quantum annealing via the quantum processor, in which case evolving the quantum processor may include evolving a disordering signal that contributes off-diagonal terms to the system's Hamiltonian until, at the end of the evolution, the system is predominantly ordered with diagonal terms in the system's Hamiltonian dominating any off-diagonal terms. For example, at the end of the evolution the off-diagonal terms in the system's Hamiltonian may be substantially zero, whereas at some point earlier in the evolution (i.e., at some point where the annealing schedule s is less than 1, such as when s is near to but greater than zero, or when s ~0.5) the off-diagonal terms in the system's Hamiltonian may dominate any diagonal terms.

At 604, a first state of the quantum processor is read out via a readout subsystem. The readout subsystem may include readout devices, such as magnetometers 141, 142 from FIG. 1 for reading out the states of superconducting flux qubits 101, 102. The readout subsystem may employ latching devices such as those described in U.S. Pat. No. 8,169,231 and/or a non-dissipative readout scheme such as that described in PCT Patent Publication 2012-064974. As previously described, the first state may correspond to an N-bit string where each bit corresponds to a state of a respective one of N qubits in the quantum processor. In some applications, not all qubits in the quantum processor may be employed during a computation and/or not all states of the qubits in the quantum processor may need to be read out (in which case, the first state may correspond to an M-bit string where each bit corresponds to a state of a respective one of N qubits in the quantum processor, where M<N). At 605, the first state is processed via the digital computer. Processing the first state may include, for example, calculating a property of the first state via the digital computer. For example, since the first state corresponds to a sample from a probability distribution, processing the first state via the digital computer may include using the sample to calculate a property of the probability distribution and/or a property of the population from which the sample has been drawn. As previously described, method 600 may be used to determine an at least approximate minimum of an objective function, in which case the first state may correspond to a sample from a population of candidate inputs into the objective function and processing the first state may include inputting the first state into the objective function and determining a corresponding objective function value for the first state. However, method 600 may also be used for other sampling applications and processing the first state may involve inputting the first state into any equation, formula, model, data set, etc. depending on the specific application.

Processing the first state may also include determining at least one additional state based on the first state via the digital computer. For example, the digital computer may be used to model the system or population from which the first state was sampled and the first state may be used to update the model. Updating the model may include adding the first state to the model and/or casting the first state as a starting point for the digital computer to explore additional states (e.g., local states) in the neighborhood of the first state. At least one of the additional states may be added to the model. As previously described, determining additional states via the digital computer may include performing a classical heuristic optimization algorithm, such as but not limited to: a local search algorithm, a tabu search algorithm, a simulated annealing algorithm, a path re-linking algorithm, and/or a genetic algorithm based on the first state.

At 606, a second configuration of the number of programmable parameters for the quantum processor is defined via the digital computer. The second configuration of the number of programmable parameters may include a second configuration of $h_i$ and $J_{ij}$ terms for the quantum processor and may be at least partially based on a result of the processing of the first state via the digital computer. For example, the second configuration of the number of programmable parameters may define a probability distribution of the states of the quantum processor that assigns higher or lower probability to the first state based at least in part on the processing of the first state. At 607, the quantum processor is programmed with the second configuration of the number of programmable parameters via the programming subsystem. At 608, the quantum processor is evolved with the second configuration of the number of programmable parameters via the evolution subsystem. At 609, a second state of the quantum processor is read out via the readout subsystem. Method 600 may also include, for example, processing the second state via the digital computer and proceeding to define a third configuration of the number of programmable parameters for the quantum processor that is at least partially based on the processing of the second state via the digital computer. The acts of programming, evolving, and reading out the quantum processor may then be repeated using the third configuration of the number of programmable parameters to produce a third state. Thus, method 600 may include iterative and/or recursive feedback between drawing samples from the quantum processor, processing the samples via the digital computer, and reprogramming the quantum processor based on the processing of the samples until a sufficient quantity and/or quality of samples have be drawn to satisfy the requirements of the particular sampling application.

The various embodiments described herein provide methods of operating a sample generator system that includes a quantum processor and a digital computer, where the methods may be performed iteratively and/or recursively over any number of cycles. For example, the methods may be performed over multiple cycles until at least one exit criterion is met. Exemplary exit criteria include, but are not limited to: a minimum degree of solution accuracy, a maximum allowed computation time, a maximum allowed number of samples generated, a maximum number of iterations, a maximum allowed number of bit strings generated, and/or a real number value output by an objective function that is below a specified threshold.

Figure 7:
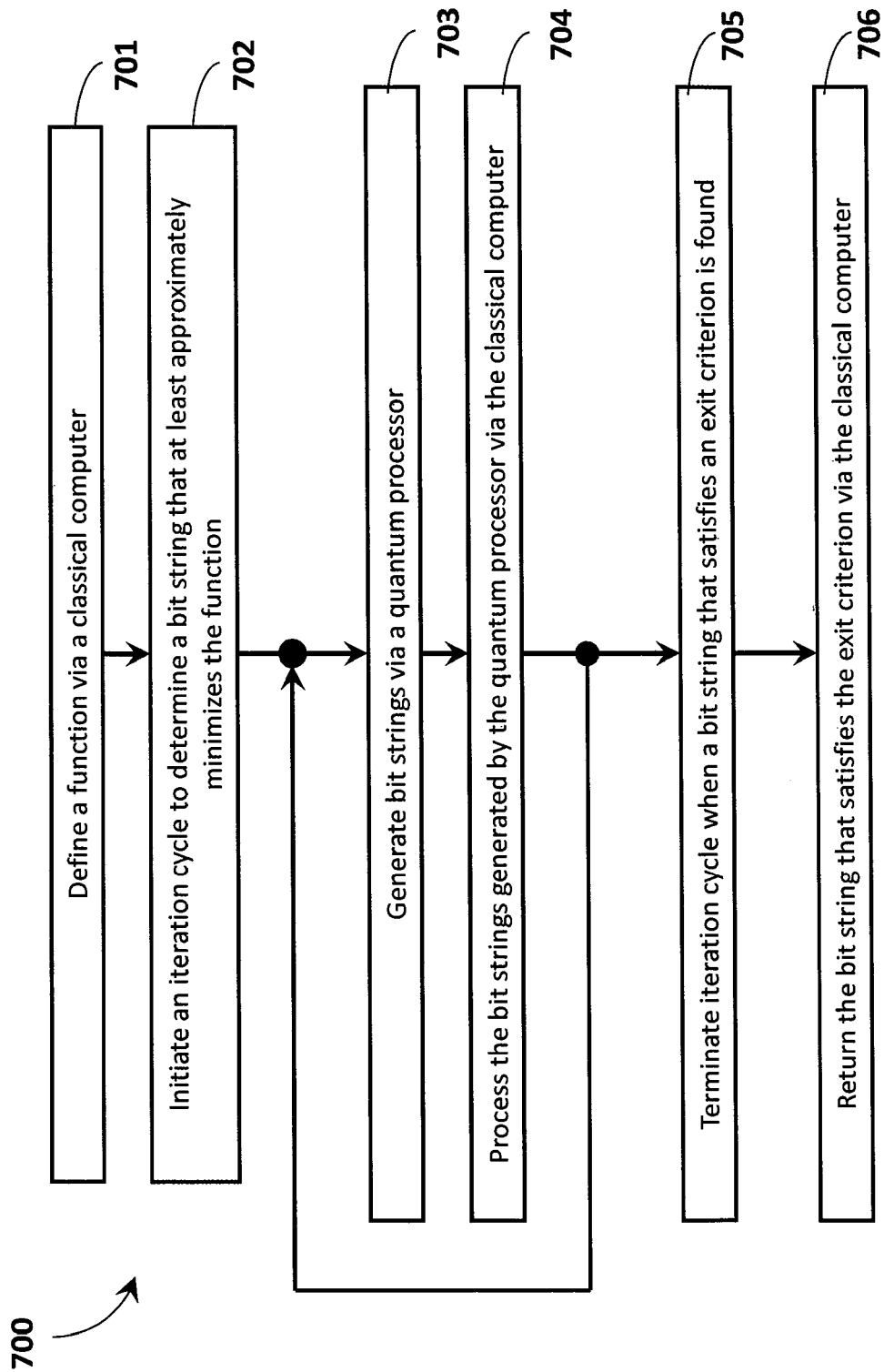
FIG. 7 is a flow-diagram showing an iterative method of operating a hybrid computer system comprising a quantum processor and a digital computer in accordance with the present systems and methods.

FIG. 7 is a flow-diagram showing an iterative method 700 of operating a hybrid computer system comprising a quantum processor and a digital computer in accordance with the present systems and methods. Method 700 includes six acts 701-706, though those of skill in the art will appreciate that in alternative embodiments certain acts may be omitted and/or additional acts may be added. Those of skill in the art will appreciate that the illustrated order of the acts is shown for exemplary purposes only and may change in alternative embodiments. At 701, a function is defined via the digital computer. The function may receive a bit string indicating binary states of a number of function parameters as an input and may provide a real number value as an output. At 702, an iteration cycle is initiated to determine a bit string that at least approximately minimizes the function, e.g., a bit string that at least approximately minimizes the real number value output from the function. The iteration cycle includes at least two acts, 703 and 704, though other acts and/or sub-acts may be included as well. At 703, bit strings are generated via the quantum processor, where each bit in a bit string corresponds to a state of a respective qubit in the quantum processor. Bit strings may be generated via, for example, adiabatic quantum computer and/or quantum annealing. At 704, the bit strings generated by the quantum processor are processed by the digital computer. Processing the bit strings may include determining a respective real number value output by the function for each bit string, or for a subset of the bit strings. This iteration cycle (i.e., acts 703 and 704) may be repeated any number of times. At 705, the iteration cycle is terminated (i.e., stopped) when a bit string that satisfies an exit criterion is found. At 706, the bit string that satisfies the exit criterion is returned via the digital computer. The function defined at 701 may, for example, include an objective function.

Figure 8:
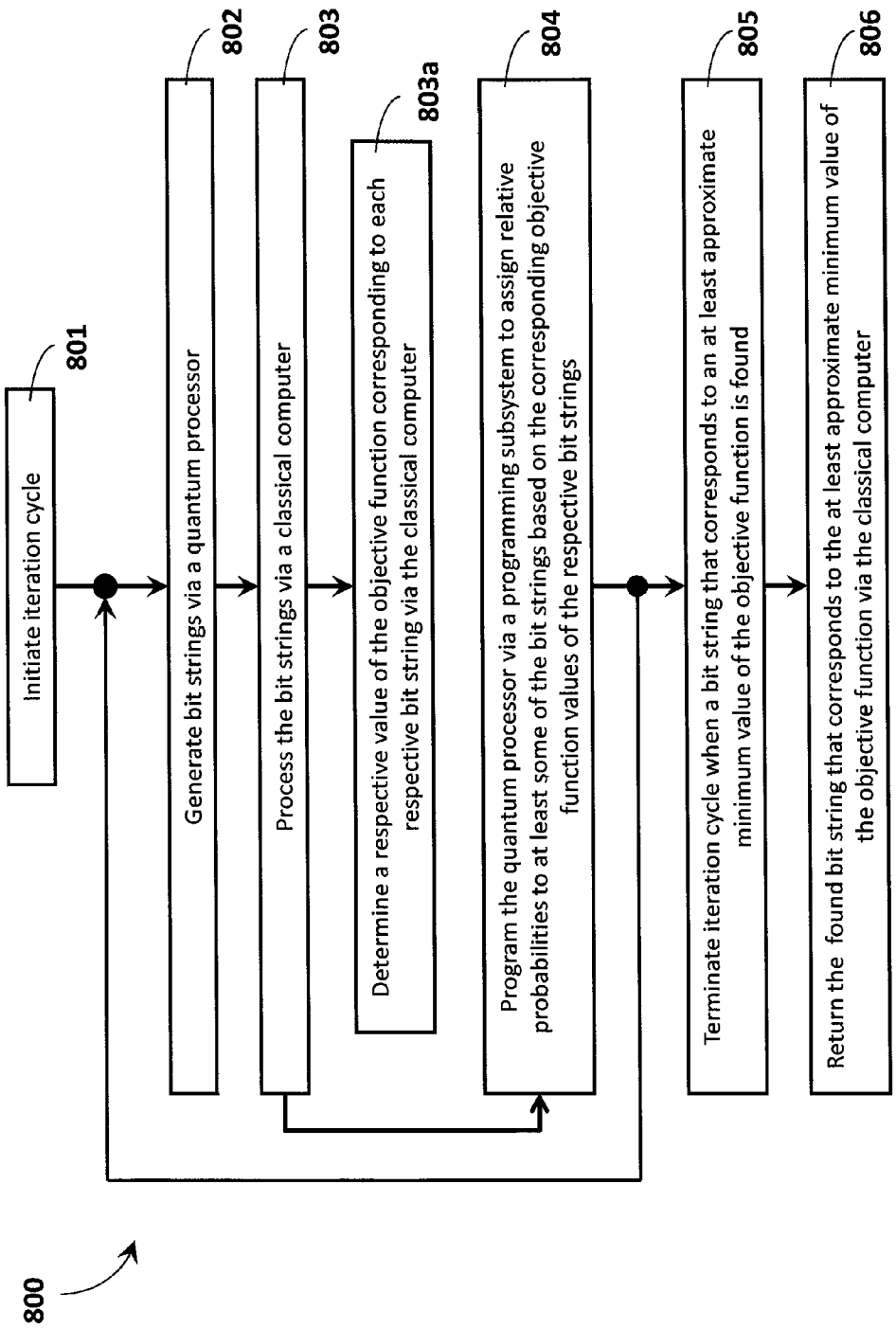
FIG. 8 is a flow-diagram showing an iterative method of operating a quantum processor and a digital computer to at least approximately minimize an objective function in accordance with the present systems and methods.

FIG. 8 is a flow-diagram showing an iterative method 800 of operating a quantum processor and a digital computer to at least approximately minimize an objective function in accordance with the present systems and methods. Method 800 includes six acts 801-806, though those of skill in the art will appreciate that in alternative embodiments certain acts may be omitted and/or additional acts may be added. Those of skill in the art will appreciate that the illustrated order of the acts is shown for exemplary purposes only and may change in alternative embodiments. At 801, an iteration cycle is initiated to find a bit string that corresponds to an at least approximate minimum value of the objective function. The iteration cycle includes at least three acts 802, 803, and 804, and one sub-act 803a, though other acts and/or sub-acts may be included as well. At 802, bit strings are generated via the quantum processor. Bit strings may be generated via, for example, adiabatic quantum computation and/or quantum annealing. At 803, the bit strings are processed via the digital computer. Processing the bit strings via the digital computer includes at least sub-act 803a, where a respective value of the objective function corresponding to each respective bit string is determined via the digital computer. At 804, the quantum processor is programmed via a programming subsystem to assign relative probabilities to at least some of the bit strings based on the corresponding objective function values of the respective bit strings. For example, a bit string having a relatively high corresponding objective function value may be assigned a relatively low probability; a bit string having a relatively low corresponding objective function value may be assigned a relatively high probability; and/or any bit string that has been generated may be assigned a relatively low probability in order to effectively enforce tabu constraints and encourage new bit strings (i.e., bit strings that have not previously been generated) to be generated. This iteration cycle (i.e., acts 802, 803 (including sub-act 803a) and 804) may be repeated any number of times. At 805, the iteration cycle is terminated (i.e., stopped) when a bit string that corresponds to an at least approximate minimum value of the objective function is found. At 806, the found bit string that corresponds to the at least approximate minimum value of the objective function is returned via the digital computer.

As previously described, processing the bit strings via the digital computer (i.e., act 803) may further include determining additional bit strings via the digital computer based on at least one of the bit strings from the quantum processor and determining a respective value of the objective function corresponding to each respective additional bit string via the digital computer. Accordingly, programming the quantum processor via the programming subsystem (i.e., act 804) may include assigning relative probabilities to at least some of the additional bit strings based on the corresponding objective function values of the respective additional bit strings. At 806, the found bit string may, for example, be a bit string that was generated via the quantum processor (at, for example, act 802) or the found bit string may, for example, be a bit string that was determined via the digital computer (at, for example, act 803) based on at least one of the bit strings from the quantum processor.

In accordance with the present systems and methods, a quantum processor may be programmed to assign relative probabilities to bit strings (i.e., states of the quantum processor), at least in part because adiabatic quantum computation and quantum annealing are algorithms that intrinsically tend to return a low-energy state of the quantum processor with high probability. In other words, a probability of the quantum processor outputting a state is inversely related to an energy of the state.

Figure 9:
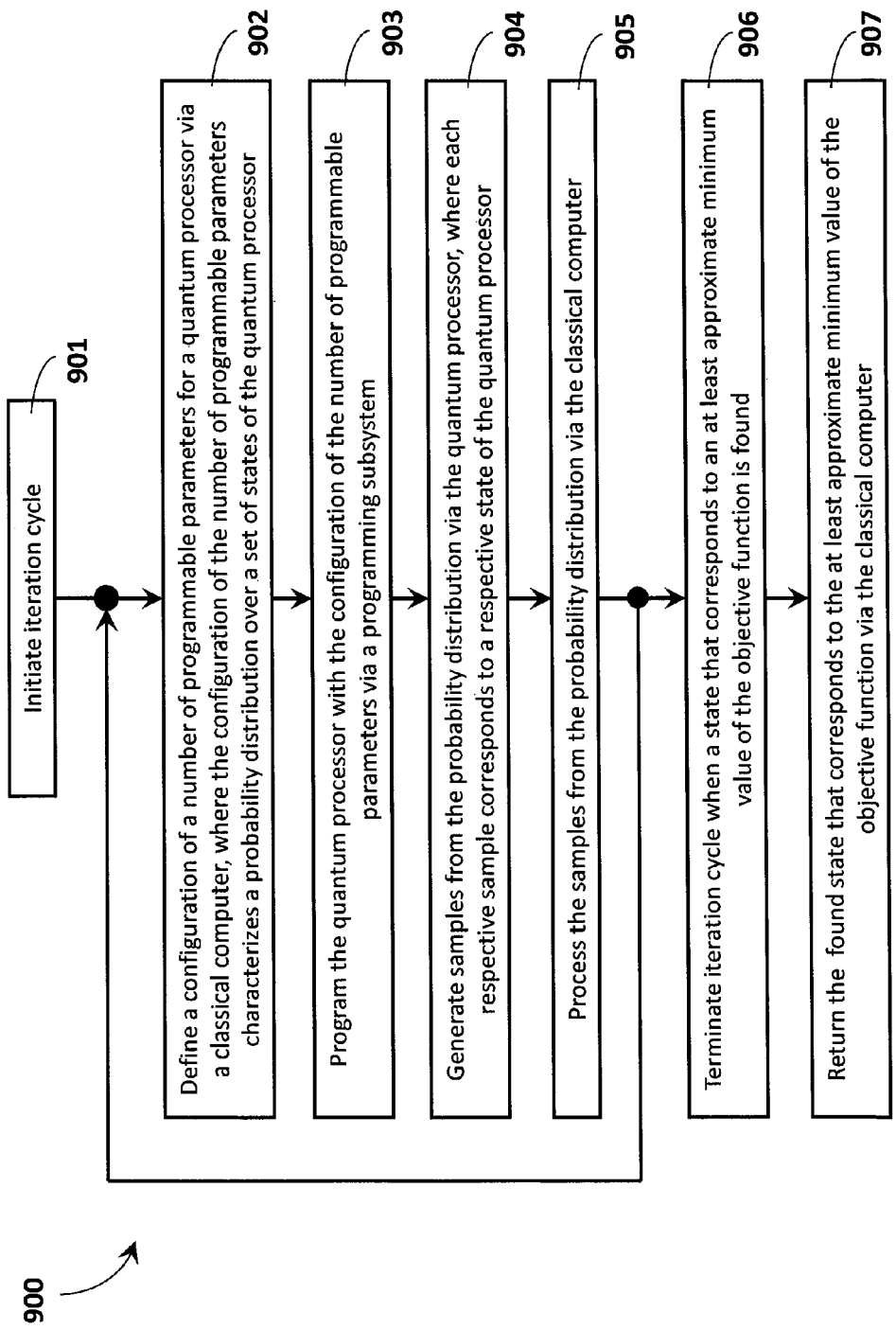
FIG. 9 is a flow-diagram showing an iterative method of operating a system that includes a quantum processor and a digital computer to at least approximately minimize an objective function, where a probability of the quantum processor outputting a state is inversely related to an energy of the state in accordance with the present systems and methods.

FIG. 9 is a flow-diagram showing an iterative method 900 of operating a system that includes a quantum processor and a digital computer to at least approximately minimize an objective function, where a probability of the quantum processor outputting a state is inversely related to an energy of the state in accordance with the present systems and methods. Method 900 includes seven acts 901-907, though those of skill in the art will appreciate that in alternative embodiments certain acts may be omitted and/or additional acts may be added. Those of skill in the art will appreciate that the illustrated order of the acts is shown for exemplary purposes only and may change in alternative embodiments. At 901, an iteration cycle is initiated to find a state that corresponds to an at least approximate minimum value of the objective function. The iteration cycle includes at least four acts 902, 903, 904, and 905, though other acts and/or sub-acts may be included as well. At 902, a configuration of a number of programmable parameters for the quantum processor is determined via the digital computer. The configuration may characterize a probability distribution over a set of states of the quantum processor, where a state of the quantum processor may be defined by the states of the qubits that make up the quantum processor. At 903, the quantum processor is programmed with the configuration of the number of programmable parameters via a programming subsystem. At 904, samples from the probability distribution are generated via the quantum processor, where each respective sample corresponds to a respective state of the quantum processor (i.e., a respective collection of qubit states). Samples may be generated via the quantum processor by performing adiabatic quantum computation and/or quantum annealing. At 905, the samples from the probability distribution are processed via the digital computer. Processing the samples via the digital computer includes at least determining a respective value of the objective function corresponding to each respective sample, or a subset of samples. For example, processing the sample via the digital computer may include determining a respective value of the objective function for only a subset of the most frequently returned samples from the quantum processor. At 906, the iteration cycle is terminated (i.e., stopped) when a state that corresponds to an at least approximate minimum value of the objective function is found. At 907, the found state that corresponds to the at least approximate minimum value of the objective function is returned via the digital computer.

The iteration cycle (i.e., acts 902, 903, 904 and 905) may be repeated any number of times. For example, the iteration cycle may include k iterations where k>0, and any given iteration may be identified as the $i^{th}$ iteration where $0<i \le k$. In accordance with the present systems and methods, the processing of the samples from the probability distribution (i.e., act 905) in an $i^{th}$ iteration may influence the defining of a configuration of a number of programmable parameters for the quantum processor (i.e., act 902) in an $(i+1)^{th}$ iteration, where i is an integer greater than zero. In other words, the defining of a configuration of a number of programmable parameters for the quantum processor (i.e., act 902) in an $(i+1)^{th}$ iteration may be influenced by the processing of the samples from the probability distribution (i.e., act 905) in the previous, $i^{th}$ iteration. For example, act 905 includes determining a respective value of the objective function corresponding to each respective sample in each $i^{th}$ iteration. The respective values of the objective function may be analyzed to determine a set of samples with low corresponding objective function values and the $(i+1)^{th}$ iteration may include defining a configuration of the number of programmable parameters for the quantum processor (i.e., act 902) that maps at least one sample from the set of samples with low corresponding objective function values from the $i^{th}$ iteration to a low-energy state of the quantum processor. Similarly, the respective values of the objective function may be analyzed to determine a set of samples with high corresponding objective function values and the $(i+1)^{th}$ iteration may include defining a configuration of the number of programmable parameters for the quantum processor (i.e., act 902) that maps at least one sample from the set of samples with high corresponding objective function values from the $i^{th}$ iteration to a high-energy state of the quantum processor. Furthermore, the influence each iteration may have on subsequent iterations may extend beyond successive iterations. Any $i^{th}$ iteration may influence any $(i+\alpha)^{th}$ iteration, where $0 \leq \alpha \leq (k-i)$, and/or any $(i+\alpha)^{th}$ iteration may be influenced by any $i^{th}$ iteration.

As previously described, processing the samples from the probability distribution via the digital computer (i.e., act 905) may further include determining additional samples via the digital computer based on at least one of the samples from the probability distribution and determining a respective value of the objective function corresponding to each respective additional sample via the digital computer. Additional samples may be determined, by, for example, a classical heuristic optimization algorithm and/or may include at least one local sample from a neighborhood of at least one of the samples from the probability distribution. Processing the samples from the probability distribution via the digital computer may also include constructing a model of the objective function via the digital computer and evolving the model based at least partially on the value of the objective function corresponding to at least one sample.

For the various embodiments described herein, in particular the various iterative and/or recursive methods described herein, the first configuration of programmable parameters for the quantum processor (i.e., corresponding to the first iteration of the algorithm, where i=1) may, for example, include a random set of programmable parameters (e.g., a random set of $h_i$ and $J_{ij}$ values) and/or a set of programmable parameters that produce a substantially flat probability distribution where all samples have substantially the same probability. Alternatively, the first configuration of programmable parameters may, for example, include any configuration, such as a known good configuration, or any particular configuration established via prior analysis or pre-processing of the relevant population (e.g., objective function).

The various embodiments described herein, may, in some applications, involve significant processing via a digital computer. Throughout this specification and the appended claims, the term "digital computer" is generally used to denote a "classical" or non-quantum computer used to perform digital processing steps. A digital computer may include a single stand-alone digital computer, or multiple digital computers in communication with one another, such as for example a distributed network of digital computers. Similarly, a quantum processor may include a single stand-alone quantum processor or multiple quantum processors in communication with one another, such as for example a distributed network of quantum processors.

A digital computer may be used to define an objective function that receives a bit string as an input and provides a real number as an output. The digital computer may be used to determine a configuration of programmable parameters for a quantum processor, and the quantum processor may then be used to generate bit strings (i.e., samples) to be input into the objective function. The subsequent acts of determining values of the objective function corresponding to the bit strings and determining a new configuration of programmable parameters for the quantum processor may all be performed using the digital computer. As described above, in some cases these acts may require that the digital computer include multiple digital computers in communication with one another, such as in a distributed network or "grid" if significant computing power is required. Thus, in some embodiments, the only function performed by a quantum processor in the present systems and methods is to generate samples based on a configuration of programmable parameters determined by a digital computer. Accordingly, the present systems and methods may be implemented in collaboration with substantial digital computer processing techniques.

Throughout this specification and the appended claims, reference is often made to constructing a model of a problem or population (e.g., a model of an objective function) via a digital computer and evolving the model via the digital computer based at least partially on the value of the objective function corresponding to at least one sample/state/bit string. A model may be used, for example, to determine configurations of a number of programmable parameters (i.e., $h_i$ and $J_{ij}$ terms) for a quantum processor and/or to, for example, estimate how changes to the programmable parameters may influence the probability distribution over the states of the quantum processor. A model may be used, for example, to determine additional states or samples based on samples from the quantum processor. Further details of exemplary classical modeling techniques that may be employed are described below, though a person of skill in the art will appreciate that these details are used herein for demonstrative purposes only and other techniques, algorithms, methods, etc. may similarly be employed. Any and/or all of the classical modeling acts described herein may be stored, generated, and/or executed via an abstraction module as part of a software stack in a digital computer as described in more detail later.

The various embodiments described herein may be used to minimize an objective function G(s) defined over strings s of length n consisting of binary values, such as ±1 values, or 0, 1 values depending on the problem formulation. The configuration $s_{min}$ returning the lowest objective value may be sought, and $s_{min}$ or a good approximation thereof may ultimately be returned. The number of variables n may, for example, be larger than the number of qubits available in the quantum processor. An initially random population of configurations $\{s_i\}$ may be generated, and corresponding objective values $\{G_i\}$ may be obtained by evaluating G(s) on all elements of the population. The population may be filtered to, for example, identify the best (i.e., lowest objective value) configurations. Based on the best configurations within the population a new population may be generated. The new population may be constructed to share attributes common in the current best configurations. In this way, the new population may be biased towards further decrease of the objective. A model capturing the statistical commonalities of good configurations may be constructed, and the quantum processor may be used to generate a new population having characteristics captured in the model.

The limited connectivity between qubits in a physical quantum processor may be accommodated by, for example, simultaneously defining multiple models on a digital computer with each model realizing a different mapping of problem variables to qubits. The multiple models may then be processed in parallel, with each model stored on a digital computer and representing a respective instance of, e.g., any or all of methods 300-900 described above. The basic cycle of GENERATE/EVALUATE/MODEL may be iterated with successive populations finding configurations s having progressively lower G(s). The process may terminate, for example, after a predefined number of iterations, a predefined maximum allowed computation time, or when further improvement stalls.

The techniques described herein can address problems having more variables than qubits present in the quantum processor. This may be accomplished, for example, by optimizing a smaller subset of variables in the context of fixed values for all remaining variables. The subset of "unfixed" variables are referred to herein as "floating variables." The number of floating variables may be equal to or less than the number of qubits in the quantum processor. The fixed variables may be assigned, for example, random fixed values or, for example, fixed values that correspond to known good (e.g., the best known) values for those variables. For example, if an M-bit string corresponds to the lowest known value of an objective function and the quantum processor has N qubits, where M>N, then samples of size N (or less) may be drawn from the quantum processor to explore other values for N (or fewer) of the floating variables while at least (M−N) of the variables are held fixed with their corresponding values from the known good M-bit string. In various iterations, the assignments of fixed variables and floating variables may change. For example, all or a subset of the N floating variables may then be assigned fixed values and all or a subset of the (M−N) fixed variables may then be operated as floating variables. This process may continue over multiple iterations and the size and/or structure and/or composition of any subset may change between iterations. The fixed variables may advantageously include, for example, at least some variables from a tabu list if such a list is employed in the algorithm, since variables in a tabu list are by definition fixed.

In some applications, the number of floating variables may be less than the number of qubits in the quantum processor. For example, when tabu constraints are imposed (e.g., according to a tabu list of variables identifying bits that are not permitted to flip) the number of remaining floating variables may be less than the number of qubits in the quantum processor. In such instances, it may be advantageous to map at least some fixed variables to any "spare" or available qubits in the quantum processor because doing so may enable the configuration of programmable parameters for the quantum processor to better characterize the objective function and thereby improve the quality of samples generated.

Alternatively, spare or available qubits in the quantum processor may be programmed as "extra," "hidden," or "auxiliary" variables and used to interact with any floating variables to which they are coupled. For example, an auxiliary variable may be programmed with an $h_i$ term and coupled to a floating variable via a $J_{ij}$ term, where both the $h_i$ term and the $J_{ij}$ term may be designed to affect (e.g., impose constraints on, influence the behavior of, etc.) the specific floating variable to which the auxiliary variable is coupled. In this way, auxiliary variables may be used to add more control and/or flexibility in the shaping of a probability distribution over the states of a quantum processor and/or to convey more information about a model into the probability distribution. When the state of the quantum processor is read out, the values of auxiliary variables may, in some instances, be ignored.

In accordance with the teachings of, for example, U.S. Pat. Nos. 7,984,012 and/or 8,174,305, spare or available qubits may also be used to extend a logical qubit over multiple qubits (e.g., by ferromagnetic coupling such that at least two qubits behave as one effective logical qubit) and realize additional coupling paths to other (logical) qubits. Such may, for instance, increase the effective connectivity between the variables of a model.

Expressed as pseudocode, an example of the various embodiments described herein that employs multiple models simultaneously and uses a path relinking algorithm to explore states in between models may be described as follows:
1. initialize population
2. initialize the best seen configuration and the corresponding best seen objective value
3. while an outer loop termination condition is not met
   (a) pick a subset of floating variables to be optimized over; the remaining variables are fixed to their value in the best configuration found thus far
   (b) initialize models defined over the floating variables
   (c) while an inner loop termination condition is not met
      draw samples from a quantum processor based on the current models
      evaluate G(s) on the samples
      periodically search using, for example, path relinking
      update the best seen configuration and the corresponding objective value for each model
      update the models based on samples
4. return the best configuration seen and the corresponding objective value Instructions for enacting the acts described in the above pseudocode may, for example, be stored, generated, and/or executed via an abstraction module as described in more detail later. Models which represent the statistical commonalities of a set of configurations may be represented in terms of the $h_i$ and $J_{ij}$ parameters (i.e., the configuration of the programmable parameters) that define a corresponding probability distribution for the quantum processor. Sampling from the quantum processor may, for example, realize alternative configurations having the desired statistical structure. Sampling from such models is difficult in general, but a quantum processor may enable such sampling to be achieved efficiently. As previously described, a model may be updated (i.e., a new configuration of programmable parameters representing a new probability distribution for the quantum processor) based, at least in part, on the samples generated by the quantum processor. In some embodiments, multiple models may be implemented simultaneously. Models may also be updated using classical digital processing techniques and, for instance, different models may interact with one another via a digital computer to produce further updates.

An example of a simple model is based on a single configuration s*. In this model $h_i$ and $J_{ij}$ may be set so that all configurations further (in Hamming distance) from s* have higher energy than the energy of configuration s* itself. When samples are generated via the quantum processor, configurations near (i.e., similar to) s* are more likely to be seen (i.e., have higher probability). This simple model thus mimics local search around s*. The "locality" (i.e., the size of the effective search space) may be tuned around each s* by introducing a temperature parameter. When the temperature is low only configurations very near to s* will typically be seen when the quantum processor is sampled. At higher temperatures configurations further from s* become more likely. The effects of temperature may be controlled, for example, with three parameters: init_temperature, temperature_scale, and max_temperature. init_temperature may be used to set the initial temperature used when a model is constructed centered on s*. It may occur that as populations evolve the same configuration s* is repeatedly generated. In such cases, the temperature may be progressively raised to explore configurations that are further and further away. temperature_scale may be used to control this effect. For example, every time s* is used in a model the temperature associated with s* may be multiplied by temperature_scale. Thus, temperature_scale may be a number slightly larger than 1. Raising the temperature fosters exploration further from s*, but if the temperature is raised too high than the search may become randomized. This effect may be limited by, for example, using max_temperature to set the maximal possible temperature associated with any s*.

More complex models using the simple building block described above may be employed. For example, a more complex model may combine two good configurations, e.g., $s_1$ and $s_2$, so that when the quantum processor is sampled configurations like either $s_1$ or $s_2$ are observed (or, alternatively, configurations like $s_1$ and $s_2$ may be observed). However, in comparison to sampling the two models (one for $s_1$ and one for $s_2$) independently, the joint model may favor configurations lying in between $s_1$ and $s_2$. In general, a model may be employed which combines any number of $s_i$. The number of combined configurations may be controlled by, for example, a parameter called merge_num. Any such model may induce correlations between the bits based on the set of $s_i$.

The architecture of the quantum processor may be limited to a specific connectivity allowing for interactions only between certain pairs of qubits. When mapping problem variables to qubits this permits interactions between certain variables and forbids interactions between others. Though the available connectivity between qubits cannot be altered for any given quantum processor, the mapping from variables to qubits may be different between models, thus realizing interactions between different variable pairs. In this way, the basic models discussed above may be improved by using different mappings from variables to qubits. Even for a common set of $s_i$, different mappings may realize different correlations between the elements of the configurations. Without prior insight into which correlations may be important, a number of randomly chosen mappings may be used, for example. The number of mappings may be controlled by, for example, a cluster_num parameter. The cluster_num parameter may set the number of models each using a different variable mapping. In this way, the user may not have to worry about the variable mappings being used in each model, as this is internal to the algorithm. As described above, each model may be tracked and stored using a digital computer.

This description of models and how they are generated from the best merge_num configurations of a population may also be extended to account for the effects of past models, i.e. models from previous populations. For example, old models may be decayed slowly, with the current model being biased to some extent towards the best configuration seen to that point in time. For example, a parameter alpha $\alpha$ may update the parameters of each of the cluster_num models as:

$$\theta_{t+1} = (1-\alpha)\theta_t + \alpha\theta(P)$$

where $\theta$ indicates the configuration of $h_i$ and $J_{ij}$ parameters, t indexes the generations of populations, and $\theta(P)$ generates a model from the current population P.

The gradual change of models described by the approach above may eventually result in stagnation where successive populations fail to decrease the objective. If the best objective value of any given model remains unchanged for a prolonged period, it may become necessary to make radical changes to the model in the hope of finding better regions of the search space. For example, a parameter unchanged_threshold may be used to trigger large scale model updates when the minimal objective value has remained unchanged for unchanged_threshold generations (e.g., iterations). For example, at least two types of large scale model changes may be applied to a stagnant model i: a) mutation updates that change the sign of some fraction of $h_i$ and $J_{ij}$ parameters (e.g., when a large scale change is triggered, mutation_fraction of the parameters may be negated); and/or b) cross-over updates where another random model j is selected, and the parameters of model j are merged with the parameters of model i. Which model change is performed may be determined, for example, by a mutation_prob parameter. In this case, the mutational update will be performed with probability mutation_prob and the crossover update with probability 1−mutation_prob.

The various methods described herein may terminate, for example, in at least one of three ways: the user may supply an objective value exit_threshold_value, such that when a configuration is found that has an objective value less than or equal to exit_threshold_value the corresponding configuration is returned; the user may provide max_iter_outer which limits the number of iterations of successive populations; and/or a timeout parameter can be used to ensure that the method terminates after roughly timeout seconds. The inner loop which identifies good settings of floating variables may iterate until, for example, the objective function stops decreasing. For example, once the objective value remains constant for max_unchanged_objective_inner, the inner optimization may terminate.

The present systems and methods may employ a path relinking algorithm to, for example, update a model or models. For example, if two good configurations are identified then it may be useful to examine alternate configurations in between the two good configurations which share attributes of both good configurations. Because path relinking may be a time consuming process, it can be advantageous to employ path relinking at a subset of inner loop iterations by, for example, introducing a path_relinking_wait_num parameter.

Path relinking may be applied between pairs of good configurations. If $s_i$(best) represents the best configuration found thus far by model i, path relinking may be used to potentially improve model $s_i$(best). Since the parameters of model i depend on $s_i$(best), any improvement to $s_i$(best) may modify model i. For each model j other than i, configurations in between $s_i$(best) and $s_j$(best) may be explored for potential improvements as follows:

the variables (e.g., bits) which differ between $s_i$(best) and $s_j$(best) may be identified. The number of differing variables may be denoted by d;

Each of the d variables may flipped and the objective measured at each of the d new configurations. The configuration having the least objective value (which may be more than the initial objective value) may be recorded and adopted so that the flipped variable is set to a new flipped state. This new configuration differs from $s_j$(best) in d−1 variables;

Over the next iterations, each of the remaining differing d−1 variables may be flipped and the objectives checked. Again, the configuration having minimal objective value may be recorded and adopted; and This process may be carried out until all d variables have been flipped and/or until $s_j$(best) is reached.

Of all the recorded states on the path from $s_i$(best) to $s_j$(best), the configuration having the lowest objective is identified. This new configuration may be adopted to replace either $s_i$(best) or $s_j$(best) if the corresponding objective value is lower than the objective of either $s_i$(best) or $s_j$(best). It may be advantageous to, for instance, only adopt a new configuration that is a given Hamming distance from either $s_i$(best) or $s_j$(best) (e.g., at least 2 bit-flips, at least 4 bit flips, etc.). A parameter path_relinking_min_dist may be used to set the minimal Hamming distance threshold required for adoption. Larger values of path_relinking_min_dist may foster greater exploration through the search space, but may make it more difficult to adopt new best states.

The exemplary modeling techniques described above employ methods inspired by local search, simulated annealing (i.e., temperature as a parameter for controlling the search), path re-linking, and genetic algorithms (i.e., small scale and large scale mutations). Those of skill in the art will appreciate that these and other methods may be employed and/or combined in the digital processing (e.g., classical modeling) acts of the various embodiments described herein. As a further illustration, an example of digital processing employing tabu search methods is now described. In order to distinguish from the previous example, the objective function G(s) is re-cast as f in the tabu-based example.

The exemplary tabu-based procedure is iterative with each iteration beginning with a "current" bit string. The first iteration may start from an initial bit string, such as a random bit string, a known approximate solution to a problem, or a bit string generated as a sample from a population by a quantum processor. In each iteration, the one bit-flip neighbors of the "current" bit string (i.e., neighbors within a Hamming distance of 1 from the "current" bit string) are found, though a person of skill in the art will appreciate that larger neighborhoods (such as two-flip neighbors) may be employed if desired. A "tabu list" is maintained which identifies bits that should not be flipped. The neighbors that have flipped a bit that is in the tabu list are removed from the valid neighbors. The best valid move may be taken and re-cast as the "current" bit string for the next iteration; however, if an invalid neighbor improves the best value then the move may be accepted. The chosen move is added to the tabu list, which can contain the maximum of tabu tenure (t) elements. The oldest element of the list will be removed if the size exceeds t. If the best value found is not improving for some number of iterations, the whole process may restart from another starting point with an empty tabu list. This procedure is briefly summarized in the pseudocode for algorithms 1, 2, 3 and 4 below:

---

Algorithm 1 Tabu search

---

Require: function f, tabu tenure t
Ensure: $y = \min_x f(x)$
1:   $x \leftarrow$ initial state
2:   $y \leftarrow f(x)$
3:   $L \leftarrow \{ \}$ ; tabu list
4:   while true do
5:       $N \leftarrow$ GenerateNeighbour s(x)
6:       $V \leftarrow$ ValidNeighbour s(x, N, L)
7:       $y_N \leftarrow f(N)$
8:       $y_V \leftarrow f(V)$
9:       $x_{old} \leftarrow x$
10:      if $\min(y_N) < y$ then
11:          $x \leftarrow N_{arg\ min(y_N)}$
12:          $y \leftarrow y_{N_{arg\ min(y_N)}}$
13:      else
14:          $x \leftarrow V_{arg\ min(y_V)}$
15:          $y \leftarrow Y_{V_{arg\ min(y_V)}}$
16:      end if
17:      $L \leftarrow$ UpdateL(L, $x_{old}$, x, t)
18:  end while

---

Algorithm 2 GenerateNeighbours(x)

---

Require: current state x
Ensure: N = neighbours of x
    $N \leftarrow$ all one bit flip neighbours of x

---

Algorithm 3 ValidNeighbours(x, N, L)

---

Require: the current state x, matrix of neighbours N and the tabu list L
Ensure: V = valid subset of N
    $V \leftarrow \{n_i | L \cap \{j | x_j \neq n_{ij}\} = \emptyset\}, \forall i, j$

---

Algorithm 4 UpdateL(L, $x_{old}$, x, t)

---

Require: tabu list L, the previous state $x_{old}$, the current state x and the tabu tenure t
Ensure: L = updated L
    $L \leftarrow L \cup \{j | x_j \neq x_{oldj}\}$
    if size(L) > t then
        Remove the oldest size(L) - t elements of L
    end if

---

As described in more detail later, instructions for executing the acts described in the pseudocode of Algorithms 1-4 above may, for example, be stored, generated, and/or executed via an abstraction module. To extend the neighbors of the "current" bit string using samples generated by a quantum processor, the procedure may be adapted to:

i) Approximate function f (or, similarly, G(s) from the previous example) with a function g whose connectivity matches that of the quantum processor;
   ii) Draw samples from the approximated function g (i.e., draw samples from the quantum processor); and
   iii) Augment the obtained samples with the original one local neighbors.

It may be advantageous to try to make g as close as possible to f based on some closeness measure. For example, the closeness of g to f may be measured by comparing their respective values for a set of configurations, or by at least comparing the ordering of their respective values on a set of configurations so that if f(a)<f(b) then g(a)<g(b), etc.

It may be preferable for effective samples from g to have a Hamming distance of two or more from the "current" bit string; otherwise, the union of the samples with the one local neighbors may not add any new information to the model (i.e., if a sample from g is a one local neighbor of the current bit string, then it will be found using Algorithm 2 above).

Algorithms 3 and 4 limit valid neighbors (within a Hamming distance k of the current bit string) to those having none of their differing bits (i.e., bits that differ from the current bit string) in the tabu list. Furthermore, Algorithms 3 and 4 cause the acceptance of a move to a valid neighbor to add all of the differing bits (up to k bits) to the tabu list. These two features of Algorithms 3 and 4 may be suitable for some applications, but may be overly limiting for other applications. Accordingly, Algorithms 3 and 4 may be respectively replaced by Algorithms 5 and 6 below (via, for example, an abstraction module) if fewer restrictions on the search space are desired.

---

Algorithm 5 ValidNeighbours(x, N, L)

---

Require: the current state x, matrix of neighbours N and the tabu list L
Ensure: V = valid subset of N
    $V \leftarrow \{n_i | L \cap \{j | x_j \neq n_{ij}\} \neq \{j | x_j \neq n_{ij}\}\}, \forall i, j$

---

Algorithm 6 UpdateL(L, $x_{old}$, x, t)

---

Require: tabu list L, the previous state $x_{old}$, the current state x and the tabu tenure t
Ensure: L = updated L
    $L \leftarrow L \cup$ Random member of $\{j | x_j \neq x_{oldj}\}$
    if size(L) > t then
        Remove the oldest size(L) - t elements of L
    end if

---

Algorithms 5 and 6 have been adapted so that any neighbor with at least one differing bit (i.e., at least one bit differing from the current bit string) that is outside of the tabu list is a valid neighbor and, in addition, moving to such a neighbor will only add one of the differing bits (chosen randomly) to the tabu list.

A person of skill in the art will appreciate that approximating f (i.e., specifying g) may be done in a variety of ways. An exemplary technique for specifying g to approximate f is now described, though a person of skill in the art will appreciate that this example is used for illustrative purposes only.

The approximation g≈f may be constructed based, for example, on two criteria: i) $g(s_1) < g(s_2)$ if and only if $f(s_1) < f(s_2)$ on a set of sample states, which ensures some modeling of f on the given population, and ii) the Hamming distance between samples of g and the current state s* is small, which ensures the "current" neighborhood is exploited before expanding to further exploration outside of the "current" neighborhood. Criterion i) is referred to herein as the "inequality constraint" and criterion ii) is referred to herein as the "locality constraint."

The quantum processor may have an underlying graph (i.e., a connectivity) defined by G=(V, E), where V is the set of working qubits and E is the set of working couplers. For the purposes of this example, the samples drawn from the quantum processor may be assumed to follow a Boltzmann distribution, such that the probability of a state s may be given by:

$$p(s) \propto e^{-1/T \Sigma_{i \in V} h_i s_i + \Sigma_{(i,j) \in E} J_{ij} s_i s_j}$$

which may equivalently be written as:

$$p(\mathbf{s}) \propto e^{-1/T \langle \theta, \phi(\mathbf{s}) \rangle}$$

θ=[h,J],

φ(s)=[φ_h(s),φ_J(s)], $\phi_h(s) = [s_i]$, $i \in V$, $\phi_J(s) = [s_{ij}]$, $(i,j) \in E$ where <a,b> represents the inner product of a and b, [a,b] denotes the concatenation of a and b, and [$a_i$] represents the vector of concatenation of $a_i$s. Furthermore, in this equivalent formulation s is assumed to be an Ising state (i.e., a ±1 binary variable), which can be obtained from a 0, 1 binary variable x as s=2x−1. Note that according to this formulation, minimizing <θ, φ(s)> would make the configuration s the most probable configuration. Moreover, there are many θ configurations that can minimize <θ, φ(s)> for a particular state s, e.g., θ=−φ(s), θ=[−φ_h(s), 0 x φ_J(s)], etc. θ configurations that minimize <θ, φ(s)> for a particular state s may be used, for example, to satisfy the locality constraint.

In order to satisfy the inequality constraint, g(s) may be defined as g(s)=<θ, φ(s)>/T, where T may be thought of as a temperature parameter. Using this formulation, configurations with lower value under g are more probable. If the population is sorted:

$f(s_1) \le f(s_2) \le \ldots \le f(s_m)$, then the inequality constraint imposes that:

$g(s_1) \le g(s_2) \le \ldots \le g(s_m)$.

Both the locality constraint and the inequality constraint may be combined as the optimization:

$$\min_\theta \|\theta_h + \phi_h(s^*)\|_1$$

subject to $\langle \theta, \phi(s_i) - \phi(s_{i+1}) \rangle \le c(f(s_i), f(s_{i+1}))$ $i = 1 \ldots m-1$ where $\theta_h$ is the h part of θ, s* is the current state, and m is the number of points in the population. Here, the function c(f($s_i$), f($s_{i+1}$)) may, for example, force some distance between g($s_i$) and g($s_{i+1}$) and may be defined in numerous ways. For example, some candidate c functions include, but are not limited to:

$$c(f(s_i), f(s_{i+1})) = -\mathbb{1}_{[f(s_i) = f(s_{i+1})]} \epsilon,$$

$$c(f(s_i), f(s_{i+1})) = \frac{f(s_i) - f(s_{i+1})}{\max_i f(s_{i+1}) - f(s_i)},$$

$$c(f(s_i), f(s_{i+1})) = \left\lfloor d \frac{f(s_i) - f(s_{i+1})}{\max_i f(s_{i+1}) - f(s_i)} \right\rfloor / d$$

where $\mathbb{1}[]$ is the indicator function, ε is a small number, ⌊ ⌋ is the floor function, and d represents the number of distinct non-zero values in c.

The optimization above may, for some applications, be infeasible based on the number of parameters in the model, the size of the input population, the configuration of the samples in the population, the choice of c function, etc. Therefore, at least some of the hard constraints may be relaxed by, for example, introducing slack variables δ. In addition, the non-linear norm one function may be replaced with its upper bound such that the optimization becomes a linear program as follows:

$$\min_{\theta, \delta, \xi} \sum_j \xi_j + \sum_i \delta_i$$

subject to $\langle \theta, \phi(s_i) - \phi(s_{i+1}) \rangle \le \delta_i + c(f(s_i), f(s_{i+1}))$, $i = 1 \ldots m-1$ $\theta_{hj} + \phi_h(s^*)_j \le \xi_j$, $j \in V$ $\theta_{hj} + \phi_h(s^*)_j \ge -\xi_j$, $j \in V$ $\delta_i \ge 0$, $\xi_j \ge 0$, $-1 \le \theta_h \le 1$, $-r \le \theta_J \le r$ The constant r, which bounds the J values, may be used to balance the trade-off between staying close to s* and modeling f. The constant r may take on any value depending on the specific application. As an example, the constant r may be set to ¼.

As previously described, if the number of variables exceeds the number of qubits available in the quantum processor (i.e., the number V in the G=(V, E) formulation above), then a subset of variables may be used when generating augmented neighbors and the remaining "unused" variables may be fixed according to the current state s*. However, the one local neighbors may still be used on the full set of variables in at least some iterations of the tabu search. Variables may be mapped to qubits in a variety of ways, including for example, grouping tabu iterations in phases and changing the mapping randomly at the beginning of each phase. In this way, each phase may start from a locally optimal state (which may, for example, be a sample generated by the quantum processor or may, for example, be a state derived from processing a sample from the quantum processor via the digital computer) and end when a next local optimum is found, so the assignment of the variables to qubits is fixed (but random) during the iterations of each phase and changes to, for example, another random assignment at the beginning of the next phase (or alternatively, to another assignment, such as an educated guess, a known good assignment, or an assignment based on some processing or analysis of the function). If it is found that a particular mapping is more successful than other mappings, then this mapping may be recorded and re-used in future iterations with some probability. A person of skill in the art will appreciate that the mapping from variables to qubits may also involve, for example, pre-processing or otherwise analyzing f to find a mapping that best matches some characteristic(s) of f, but such may, for some applications, be a computationally exhaustive procedure.

The exemplary modeling technique described above employs methods inspired by tabu search and gives one example of a technique for approximating a first function f with a second function g. Those of skill in the art will appreciate that these and other methods may be employed and/or combined in the digital processing (e.g., classical modeling) acts of the various embodiments described herein. As a further illustration, another example of digital processing to minimize a divergence between two probability distributions (i.e., two functions) is now described.

A mathematical description of the distribution $P(s|\theta)$ over n Ising spins s characterizing a quantum processor may be approximated as a Boltzmann distribution as:

$$P_\theta(s) = P(s|\theta) = \frac{\exp(-\langle\theta, \phi(s)\rangle)}{Z_{P_\theta}}$$

where $\theta$ is the vector (i.e., configuration) of programmable parameters in the quantum processor and $\phi(s)$ is the vector of Ising features:

$$\theta = [h_1 \ldots h_n J_{1,2} \ldots J_{n-1,n}]$$

$$\phi(s) = [s_1 \ldots s_n s_1 s_2 \ldots s_{n-1} s_n]$$

In accordance with the present systems and methods, a set of samples $D=\{s^{(i)}\}$ may be drawn from the quantum processor and used to fit (i.e., shape) the parameters of the Boltzmann distribution above by, for example, maximizing the log likelihood:

$$L(\theta) = \sum_s P_D(s) \ln P(s|\theta)$$

where $P_D(s) = \Sigma_i \delta(s-s^{(i)})/|D|$ is the empirical distribution for the quantum processor. $L(\theta)$ may be concave with a gradient given by:

$$\nabla_\theta L(\theta) = \mathbb{E}_{P_\theta}(\phi) - \mathbb{E}_{P_D}(\phi)$$

The minimization of $L(\theta)$ may be carried out, for example, with a quasi-Newton method such as the Broyden-Fletcher-Goldfarb-Shanno (BFGS) method that may build an approximation to the Hessian.

Using the above formulation, an objective function $G(s)$: $\{-1, +1\}^n \to R$ may be at least approximately minimized by operating the quantum processor as a sample generator providing samples from the probability distribution $P_\theta(s)$ and shaping $P_\theta(s)$ to assign high probability to states s having low $G(s)$ values. Using this model, shaping $P_\theta(s)$ may be done, for example, by minimizing the expectation:

$$O(\theta) = \mathbb{E}_{P_\theta}(G) = \sum_s G(s) P_\theta(s)$$

the gradient of which may be determined as:

$$\nabla_\theta O(\theta) = \mathbb{E}_{P_\theta}(G) \mathbb{E}_{P_\theta}(\phi) \mathbb{E}_{P_\theta}(G\phi)$$

A stochastic estimate of this gradient may be found, for example, using samples from the quantum processor. As an alternative to the expectation objective above, the probability distribution $P_\theta(s)$ may be shaped by minimizing a divergence between two probability distributions. For example, a target distribution $Q_\beta(s)$ may be defined as:

$$Q_\beta(s) = \frac{\exp(-\beta G(s))}{Z_Q}$$

where $\beta$ is an artificial inverse temperature parameter that controls the "flatness" of the distribution. By annealing $\beta$ (i.e., simulating the annealing of $\beta$ by sequentially computing $Q_\beta(s)$ over a range of $\beta$), $P_\theta(s)$ can be crafted to, for example, sample a wide variety of states early in the annealing to prevent premature trapping into a single, potentially suboptimal mode of $Q_\beta(s)$ and to gradually hone in on an at least approximate minimum for the divergence between $P_\theta(s)$ and $Q_\beta(s)$. The divergence between $P_\theta(s)$ and $Q_\beta(s)$ may be calculated using, for example, the Kullback-Leibler divergence or any other known method.

The exclusive Kullback-Leibler divergence between the target distribution $Q_\beta(s)$ and the probability distribution of the quantum processor $P_\theta(s)$ may be given by:

$$D(P_\theta \| Q_\beta) = \sum_s P_\theta(s) \log\left(\frac{P_\theta(s)}{Q_\beta(s)}\right)$$

which may be written as:

$$D(P_\theta \| Q_\beta) = \beta\left[\sum_s P_\theta(s) G(s) + \frac{1}{\beta} \sum_s \log P_\theta(s) P_\theta(s)\right] + \log Z_Q$$

Minimizing the term in the square brackets above (known as the "variational free energy") may yield a configuration of the probability distribution $P_\theta(s)$ (i.e., a shape of the probability distribution of the quantum processor that is defined by a configuration of a number of programmable parameters $\theta$) that is "closest" to the target distribution $Q_\beta(s)$. Thus, substituting the Boltzmann approximation for the probability distribution $P_\theta(s)$ over the states of the quantum processor enables the variational free energy to be defined as:

$$F_\beta(\theta) = \mathbb{E}_{P_\theta}(G) - \frac{1}{\beta}[\log Z_{P_\theta} + \langle\theta, \mathbb{E}_{P_\theta}(\phi)\rangle]$$

An exemplary method of constructing a model and evolving the model to shape the probability distribution of a quantum processor may involve minimizing the variational free energy $F_\beta(\theta)$ above for a sequence of increasing values of $\beta$. This technique may be viewed as a deterministic version of simulated annealing, but with stochasticity arising from the samples generated by the quantum processor. This approach is summarized in the pseudocode of Algorithm 7, below:

Algorithm 7: High-level algorithm to
sequentially optimize free energy

Input : $\theta_0$ - initial parameters
$N_{iter}$ - number of iterations
$\beta_i, \beta_f \geq \beta_i$ - initial and final values of $\beta$
Output: $\theta^*$ - minimizing parameters
begin
| for n = 1 ... $N_{iter}$ do
| | $\beta \leftarrow \beta_i + (n-1)(\beta_f - \beta_i)/(N_{iter} - 1)$
| | $\theta_n \leftarrow \arg\min_\theta F_\beta(\theta)$ (minimization
| | can be initialized with $\theta_{n-1}$)
| $\theta^* \leftarrow \theta_{N_{iter}}$ The various embodiments described herein provide systems and methods for using a quantum processor having a finite number of qubits and limited connectivity between those qubits (i.e., a quantum processor characterized by a graph G=(V, E)) to solve computational problems having an arbitrary number of variables and/or having arbitrary connectivity between variables. In other words, the present systems and methods enable a quantum processor to be used to solve a problem that has more variables than the number of qubits in the quantum processor and/or a connectivity that differs (e.g., is greater than or more complicated than) the connectivity of the quantum processor. In accordance with the present systems and methods, such problems may be solved by using the quantum processor to generate samples from a probability distribution and processing the samples via a digital computer, where processing the samples may include modeling the problem and using the samples to guide the model. It is not necessary for any details of the problem formulation to be known in order to employ the present systems and methods; rather, all that is necessary is that a mapping (such as a function) between inputs to and outputs from the problem be provided. The function itself may be provided and/or treated as a "blackbox" that maps inputs to outputs, where the problem may be defined, for example, as determining an input to the blackbox function that produces a minimum (or an at least approximate minimum) output from the blackbox function. The quantum processor may be used, for example, to generate samples that correspond to inputs into the blackbox function and a digital computer may be used, for example, to determine the output from the blackbox function that corresponds to each respective sample. The digital computer may also be used, for example, to shape the probability distribution over the states of the quantum processor to increase the probability that the quantum processor will provide samples that at least approximately minimize the blackbox function. However, while it is not required that any characteristics of the blackbox function be known in order to implement the present systems and methods, it can be advantageous to use any known information about any characteristic(s) of the blackbox function during the classical processing. For example, if the connectivity of the blackbox function is known, then the various illustrative classical processing techniques described above may be adapted to accommodate the known connectivity, which may, for example, reduce the size of the search space to only those states that satisfy the known connectivity constraints. For example, if it is known that the blackbox function is a QUBO function, then a model g used to approximate the function f may be simplified to employ only pair-wise connectivity between variables. Thus, the present systems and methods may include, for example, specialized formulations designed to be employed when some characteristics of the blackbox function are known. It can therefore be advantageous to, when possible, specifically design a blackbox function to implement such a specialization. For example, deliberately defining a blackbox function as a QUBO problem may simplify modeling of the problem and facilitate mappings to a quantum processor that implements pair-wise connectivity between qubits.

As an illustrative example, an objective function that is known to have QUBO form may be characterized by a matrix Q (as previously described). Q may specify pair-wise interactions between variables (i.e., quadratic terms) that may map to pair-wise couplings between qubits in a quantum processor. However, a quantum processor that employs pair-wise coupling between qubits may not necessarily provide pair-wise coupling between all qubits. In other words, the connectivity of the quantum processor may be such that each qubit may not be directly communicatively coupleable to every other qubit. Thus, unless matrix Q has the same connectivity as the quantum processor, Q may specify pair-wise interactions between variables that cannot be directly mapped to the quantum processor. If the connectivity of the quantum processor is defined by a matrix M (i.e., that specifies which qubits/variables are communicatively coupleable to which other qubits/variables), then a QUBO defined by a matrix Q that has a connectivity that is different from M may still be solved via the quantum processor in accordance with the present systems and methods. Such a QUBO may be solved, for example, by breaking the QUBO down into a set of other, smaller QUBOs that each have a connectivity that matches (or otherwise directly maps to) M.

For example, a QUBO characterized by a matrix Q that has connectivity that is different from that of the quantum processor M may be solved by setting
$Q = -W^T W/2 - M$ and defining a new objective function as:

$$F(\theta, x) = \operatorname*{argmin}_{\theta, x}\left\{\frac{1}{2}\|\theta\|^2 - \langle \theta, Wx \rangle - \langle x, Mx \rangle\right\}$$

whose global minimum is $(\theta^*, x^*)$ where $\theta^* = W^T x^*$ and $x^* = \arg\min_x \langle x, Qx \rangle$. Since M is the connectivity of the quantum processor, both $\min_\theta F(\theta, x)$ and $\min_x F(\theta, x)$ may be solved via the quantum processor. For example, block coordinate descent with alternating $\theta$ and x steps may be employed to solve a QUBO defined by a Q that does not match the connectivity of M. Such may use the sampling methods described in methods 300-900 if necessary; for example, if the number of variables is greater than the number of qubits in the quantum processor. The $\theta$ variables may be continuous and/or real-value variables while the x variables may be discrete (i.e., binary) variables. Thus, alternating $\theta$ and x steps employed to solve a QUBO may, for example, employ the techniques described in U.S. patent application Ser. No. 13/300,169, whereby a digital computer is used to minimize the function over the continuous (i.e., $\theta$) variables (i.e., $\min_\theta F(\theta, x)$) and a quantum processor is used to minimize the function over the discrete (i.e., x) variables (i.e., $\min_x F(\theta, x)$), where the quantum processor may, for example, be operated as a sample generator as described in the present systems and methods.

The various embodiments described herein (e.g., including methods 300-900) are generalized to handle any objective function (e.g., an objective function of any connectivity). The above description of adapting the various methods described herein to specifically handle an objective function of QUBO connectivity represents an example of specialization in the present systems and methods. In accordance with the present systems and methods, any of the various embodiments of general methods described herein (e.g., including methods 300-900) may be specialized and/or adapted for use in specific applications. A person of skill in the art will appreciate that the specialization of a general method for a specific application may improve the performance of the method for that specific application.

As previously described, many mathematical, statistical, classical and/or digital processing techniques may be employed in modeling a problem via a digital computer (based on samples generated by a quantum processor) in accordance with the present systems and methods. However, in some applications it may be preferable not to model the problem at all. In such instances, samples from the quantum processor may be used as starting points for the exploration of additional samples via the digital computer and/or the corresponding objective values of samples from the quantum processor may be used to shape the probability distribution of the quantum processor via the digital computer without attempting to model the objective function via the digital computer. A straightforward algorithm (instructions for which may, for example, be included in an abstraction module of the digital computer as described later) of:

draw a sample from the quantum processor;
evaluate the objective function value using the sample;
[optional: generate additional samples via the digital computer based on the sample form the quantum processor and evaluate the objective function values corresponding to the additional samples;]
change the configuration of programmable parameters for quantum processor to assign higher/lower probability to the sample(s) based on the objective function value(s);
repeat may be sufficient to determine a satisfactory solution for some problems.

Throughout this specification and the appended claims, interactions between a quantum processor and a digital computer are often described. For example, a digital computer may be used to define an objective function (e.g., a blackbox function) that receives a bit string as an input and returns a real number as an output. The present systems and methods may be employed to minimize any such objective function; however, in some embodiments it may be advantageous to ensure the objective function is smooth so that small changes in the input bit string produce small changes in the real number output.

A digital computer may also be used to determine an initial configuration of programmable parameters for the quantum processor and/or an initial configuration $s_i$ for a model. In accordance with the present system and methods, the initial configuration $s_i$ may be random, or it may be selected deliberately, for example, by first performing a classical heuristic optimization (e.g., local search, tabu search, simulated annealing, a genetic algorithm, and/or the like) via the digital computer to determine the initial configuration. Similar techniques may be employed to determine subsequent configurations throughout the iterative methods described herein. Similarly, as taught in U.S. Pat. No. 8,175,995, classical heuristic optimization techniques may be employed via the digital computer to refine the configurations output by the quantum processor. Thus, classical heuristic optimization techniques may be employed at various different stages in the present systems and methods to either refine the output from a quantum processor and/or to refine/determine the input to a quantum processor.

As previously described, throughout this specification and the appended claims the term "digital computer" is used generally to describe a "non-quantum" computer, such as a classical computer. For some applications, the various digital/classical processing tasks described herein (i.e., tasks or acts described as being done "via a digital computer") may be completed using a standard desktop or laptop computer. An exemplary digital computer employs at least one classical digital microprocessor (e.g., an Intel Pentium® processor such as an Intel i7 Quad Core® processor, Intel Atom® processor, ARM Cortex® CPU, etc.), field programmable gate array (FPGA), Application Specific Integrated Circuit (ASIC) or graphical processor unit (GPU, e.g., Nvidia GPU), or any number and/or combination of such processors. However, in other applications, some of the digital/classical processing tasks described herein (e.g., determining a respective value of an objective function corresponding to each respective state in a set of states) may be computationally intensive and may require a larger digital computing system, such as a high-performance computer system, workstation and/or a distributed computing platform or "grid" of digital computing systems. Thus, throughout this specification and the appended claims, the term "digital computer" is used generally to describe any non-quantum computing system (i.e., "non-quantum" in the sense that it does not make direct use of quantum phenomena, such as superposition and/or entanglement, in the computation process) designed to perform digital/classical processing tasks. For some applications, the present systems and methods may incorporate the implementation of a classical algorithm run on digital computer hardware, such as a "classical heuristic optimization algorithm." As used herein, the term "classical algorithm" refers to a computer algorithm that is suitable to be implemented on a digital computer (as opposed to, e.g., a quantum algorithm that would be suitable to be implemented on a quantum computer).

Furthermore, although various embodiments of the present systems and methods are described as comprising "a digital computer" and successive acts may be described as performed via "the digital computer," a person of skill in the art will appreciate that the present systems and methods may employ any number of digital computers (i.e., one or more digital computers) and successive acts (i.e., digital processing tasks) in any method may be performed on the same digital computer or on different digital computers (either in series or in parallel) that are in communication with one another, for example using conventional microprocessors that operate at non-critical temperatures (i.e., temperatures above which superconductivity is exhibited).

Figure 10:
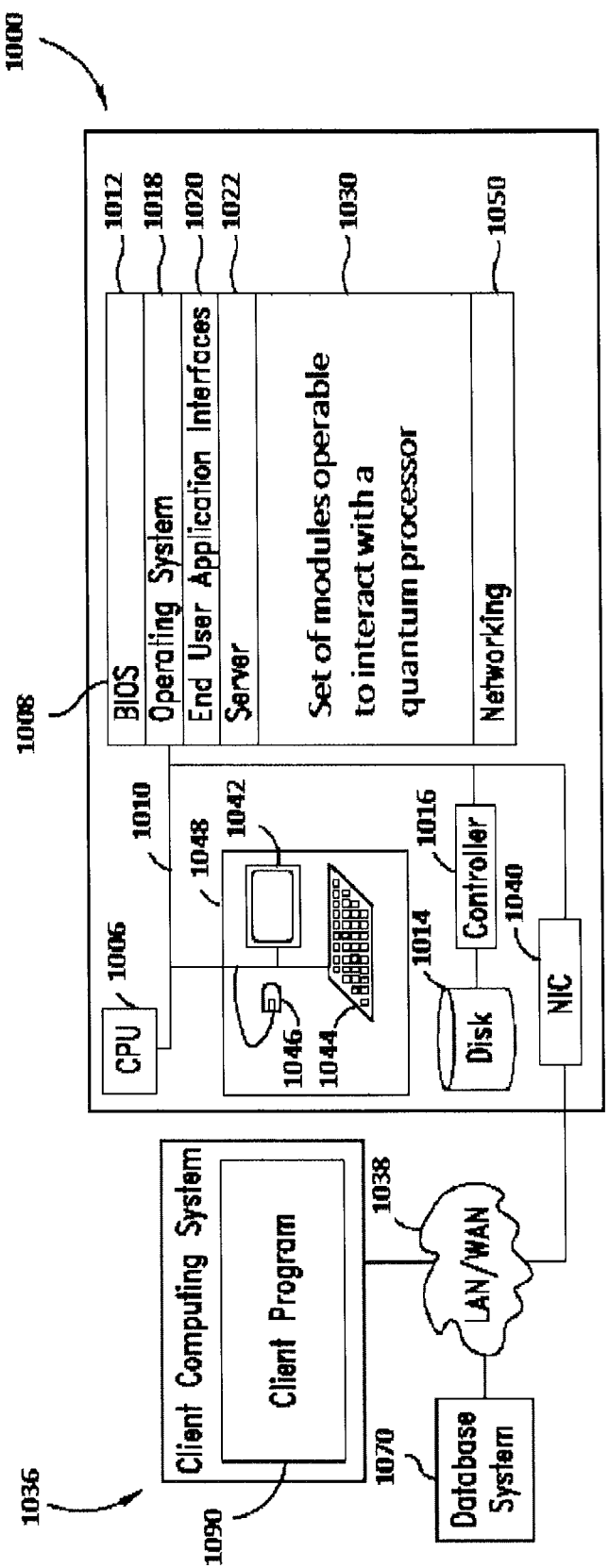
FIG. 10 illustrates an exemplary digital computer including a digital processor that may be used to perform digital processing tasks described in the present systems and methods.

FIG. 10 illustrates an exemplary digital computer 1000 including a digital processor 1006 that may be used to perform classical digital processing tasks described in the present systems and methods. Those skilled in the relevant art will appreciate that the present systems and methods can be practiced with other digital computer configurations, including hand-held devices, multiprocessor systems, microprocessor-based or programmable consumer electronics, personal computers ("PCs"), network PCs, mini-computers, mainframe computers, and the like. The present systems and methods can also be practiced in distributed computing environments, where tasks or modules are performed by remote processing devices, which are linked through a communications network. In a distributed computing environment, program modules may be located in both local and remote memory storage devices.

Digital computer 1000 may include at least one processing unit 1006 (i.e., digital processor), at least one system memory 1008, and at least one system bus 1010 that couples various system components, including system memory 1008 to digital processor 1006. Digital computer 1000 will at times be referred to in the singular herein, but this is not intended to limit the application to a single digital computer 1000. For example, there may be more than one digital computer 1000 or other classical computing device involved throughout the present systems and methods.

Digital processor 1006 may be any logic processing unit, such as one or more central processing units ("CPUs"), digital signal processors ("DSPs"), application-specific integrated circuits ("ASICs"), etc. Unless described otherwise, the construction and operation of the various blocks shown in FIG. 10 are of conventional design. As a result, such blocks need not be described in further detail herein, as they will be understood by those skilled in the relevant art.

System bus 1010 can employ any known bus structures or architectures, including a memory bus with a memory controller, a peripheral bus, and a local bus. System memory 1008 may include non-volatile memory such as read-only memory ("ROM") and volatile memory such as random access memory ("RAM") (not shown). A basic input/output system ("BIOS") 1012, which can form part of the ROM, contains basic routines that help transfer information between elements within digital computer 1000, such as during startup.

Digital computer 1000 may also include other non-volatile memory 1014. Non-volatile memory 1014 may take a variety of forms, including: a hard disk drive for reading from and writing to a hard disk, an optical disk drive for reading from and writing to removable optical disks, and/or a magnetic disk drive for reading from and writing to magnetic disks. The optical disk can be a CD-ROM or DVD, while the magnetic disk can be a magnetic floppy disk or diskette. Non-volatile memory 1014 may communicate with digital processor 1006 via system bus 1010 and may include appropriate interfaces or controllers 1016 coupled between non-volatile memory 1014 and system bus 1010. Non-volatile memory 1014 may serve as long-term storage for computer-readable instructions, data structures, program modules and other data for digital computer 1000. Although digital computer 1000 has been described as employing hard disks, optical disks and/or magnetic disks, those skilled in the relevant art will appreciate that other types of non-volatile computer-readable media may be employed, such a magnetic cassettes, flash memory cards, Bernoulli cartridges, Flash, ROMs, smart cards, etc.

Various program modules, application programs and/or data can be stored in system memory 1008. For example, system memory 1008 may store an operating system 1018, end user application interfaces 1020 and server applications 1022. In accordance with the present systems and methods, system memory 1008 may store at set of modules 1030 operable to interact with a quantum processor (not shown in FIG. 10).

System memory 1008 may also include one or more networking applications 1050, for example, a Web server application and/or Web client or browser application for permitting digital computer 1000 to exchange data with sources via the Internet, corporate Intranets, or other networks, as well as with other server applications executing on server computers. Networking application 1050 in the depicted embodiment may be markup language based, such as hypertext markup language ("HTML"), extensible hypertext markup language ("XHTML"), extensible markup language ("XML") or wireless markup language ("WML"), and may operate with markup languages that use syntactically delimited characters added to the data of a document to represent the structure of the document. A number of Web server applications and Web client or browser applications are commercially available, such as those available from Mozilla and Microsoft.

While shown in FIG. 10 as being stored in system memory 1008, operating system 1018 and various applications/modules 1020, 1022, 1030, 1050 and other data can also be stored in nonvolatile memory 1014.

Digital computer 1000 can operate in a networking environment using logical connections to at least one client computer system 1036 and at least one database system 1070. These logical connections may be formed using any means of digital communication, for example, through a network 1038, such as a local area network ("LAN") or a wide area network ("WAN") including, for example, the Internet. The networking environment may include wired or wireless enterprise-wide computer networks, intranets, extranets, and/or the Internet. Other embodiments may include other types of communication networks such as telecommunications networks, cellular networks, paging networks, and other mobile networks. The information sent or received via the logical connections may or may not be encrypted. When used in a LAN networking environment, digital computer 1000 may be connected to the LAN through an adapter or network interface card ("NIC") 1040 (communicatively linked to system bus 1010). When used in a WAN networking environment, digital computer 1000 may include an interface and modem (not shown), or a device such as NIC 1040, for establishing communications over the WAN. Non-networked communications may additionally, or alternatively be employed.

In a networked environment, program modules, application programs, data, or portions thereof can be stored outside of digital computer 1000. Those skilled in the relevant art will recognize that the logical connections shown in FIG. 10 are only some examples of establishing communications between computers, and other connections may also be used.

While digital computer 1000 may generally operate automatically, an end user application interface 1020 may also be provided such that an operator can interact with digital computer 1000 through different user interfaces 1048, including output devices, such as a monitor 1042, and input devices, such as a keyboard 1044 and a pointing device (e.g., mouse 1046). Monitor 1042 may be coupled to system bus 1010 via a video interface, such as a video adapter (not shown). Digital computer 1000 can also include other output devices, such as speakers, printers, etc. Other input devices can also be used, including a microphone, joystick, scanner, etc. These input devices may be coupled to digital processor 1006 via a serial port interface that couples to system bus 1010, a parallel port, a game port, a wireless interface, a universal serial bus ("USB") interface, or via other interfaces.

NIC 1040 may include appropriate hardware and/or software for interfacing with the elements of a quantum processor (not shown). In other embodiments, different hardware may be used to facilitate communications between digital computer 1000 and a quantum processor. For example, digital computer 1000 may communicate with a quantum processor via a direct electrical connection (e.g., via Universal Serial Bus, Firewire, or the like), a wireless connection (e.g., via a Wi-Fi® network), or an Internet connection.

Client computer system 1036 may comprise any of a variety of computing devices communicatively coupled to digital computer 1000, and may include a client program 1090 configured to properly format and send problems directly or indirectly to server application 1022. Once digital computer 1000 has determined a solution, server application 1022 may be configured to send information indicative of this solution back to client program 1090.

The various embodiments described herein provide systems and methods for solving computational problems by iteratively sampling from a probability distribution, evaluating the relative quality (e.g., relative value when a minimum value is sought) of the samples with respect to an objective function, and re-shaping the probability distribution to probabilistically provide more high quality samples (i.e., more samples corresponding to low values of the objective function) until, for example, the samples converge on a solution to the computational problem. Using this approach, a quantum processor may be used to solve a computational problem without ever having to map the computational problem itself directly to the quantum processor. Instead, the quantum processor is used as a sample generator providing samples from a probability distribution, and the probability distribution of the quantum processor is iteratively adjusted until, for example, the high probability states of the quantum processor converge on bit strings that correspond to low values of the objective function. As the probability distribution of the quantum processor begins to develop high probability regions in the neighborhoods of bit strings that correspond to low values of the objective function, more and more samples may inherently be drawn from these high probability regions providing bit strings that correspond to lower and lower values of the objective function until, for example, the bit strings converge on a minimum value of the objective function (or until a pre-determined number of iterations or computation time is completed). Furthermore, classical (i.e., "non-quantum") processing techniques may be employed to explore other states in the neighborhood of any sample from the quantum processor and/or to explore states in between samples from the quantum processor and/or to program the quantum processor to generate samples from a specific space. Since it is not necessary to map the computational problem itself directly to the quantum processor, the various embodiments described herein can greatly simplify the use of a quantum processor in solving a computational problem. In the present systems and methods, a user requires no knowledge of the operation of the quantum processor itself and may simply treat the quantum processor as a "black box" source of samples. In other words, the user does not need to learn to formulate their problem in terms of the $h_i$ and $J_{ij}$ programmable parameters of the quantum processor (i.e., the machine language of the quantum processor); rather, the user may only need to formulate their objective function so that it receives bit strings as inputs and returns numeric values as outputs. Furthermore, in the present systems and methods, the size and complexity of problems that may be solved using a particular quantum processor are not constrained by the number of qubits in the quantum processor and the connectivity between those qubits, thus greatly enhancing the utility and applicability of the quantum processors that are currently available for use.

The various embodiments described herein provide systems and methods for interacting with quantum processors. More specifically, the various embodiments described herein provide systems and methods for using a classical digital computer to communicate with a quantum processor via a multi-level software architecture comprising a set of modules, where at least one of the modules abstracts away from the machine language of the quantum processor to enable a user to employ familiar programming techniques to interact with the quantum processor.

In the various embodiments described herein, a digital computer (e.g., classical or digital computer 1000) may be used to interact with a quantum processor. A quantum processor may include a number of programmable elements, and interacting with a quantum processor may include programming the quantum processor with a particular problem formulation and/or configuration of programmable parameters by assigning specific values to these programmable elements. Interacting with a quantum processor may also include evolving the quantum processor (e.g., performing adiabatic quantum computation and/or quantum annealing) to determine a solution to the particular problem and reading out the solution from the quantum processor.

In accordance with the present systems and methods, a digital computer (e.g., digital computer 1000 from FIG. 10) may be operable to interact with a quantum processor (e.g., quantum processor 100 from FIG. 1) via a set of software modules (e.g., modules 1030 from FIG. 10). The digital computer (e.g., digital computer 1000) includes a digital processor (e.g., digital processor 1006) and a computer-readable memory (e.g., system memory 1008) communicatively coupled to the digital processor that stores a set of modules (e.g., modules 1030), each of the modules including a respective set of instructions executable by the digital processor to cause the digital processor to interact with the quantum processor (e.g., quantum processor 100).

Figure 11:
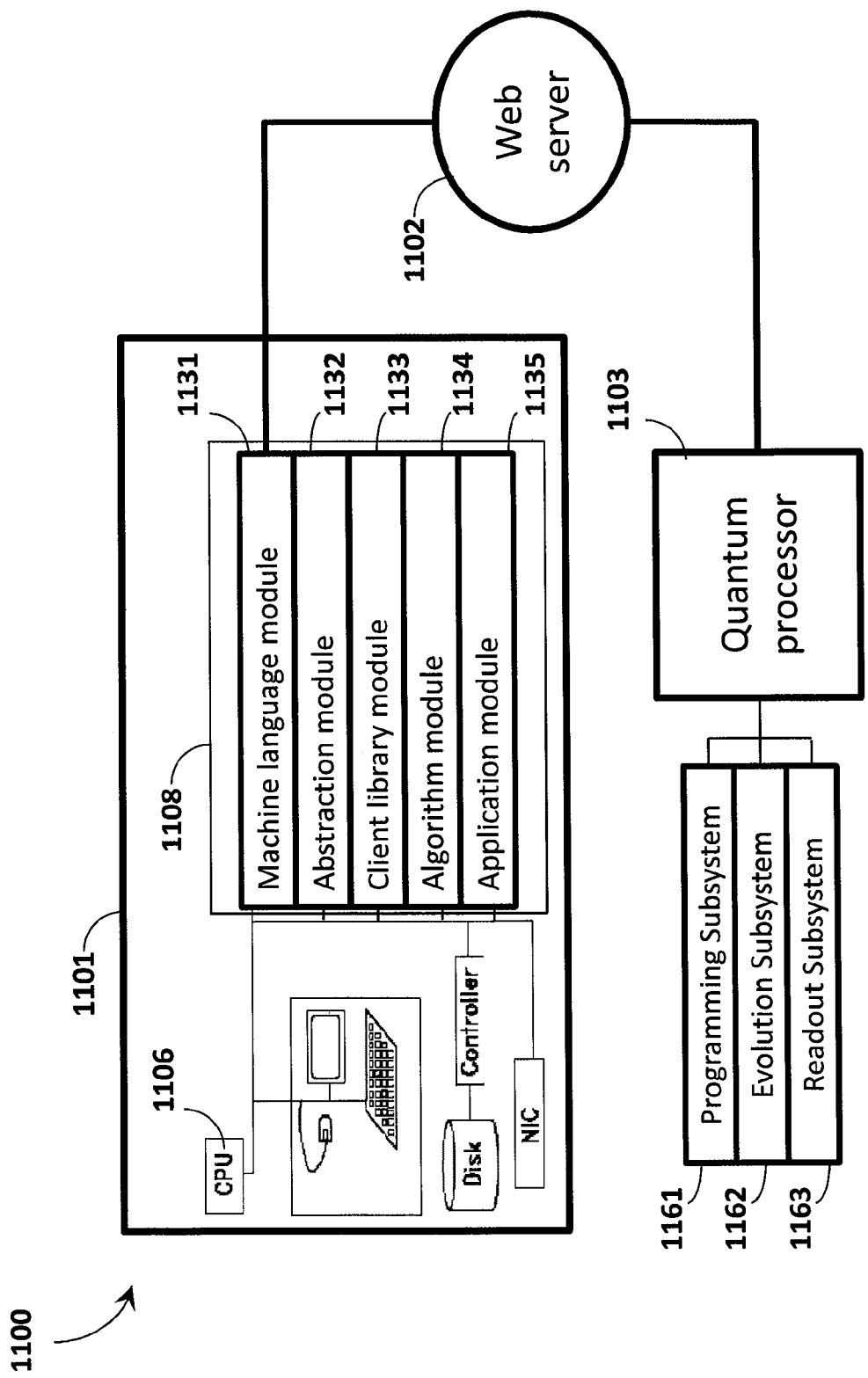
FIG. 11 is an illustrative schematic diagram of an exemplary hybrid computer system (i.e., a hybrid problem solving system) including a quantum processor and a digital computer employing software modules in accordance with the present systems and methods.

FIG. 11 is an illustrative schematic diagram of an exemplary hybrid computer system 1100 (i.e., a hybrid problem solving system, or a sample generator system as described herein) including a quantum processor 1103 and a digital computer 1101 employing software modules 1131-1135 in accordance with the present systems and methods. Quantum processor 1103 and digital computer 1101 are communicatively coupled to one another. Quantum processor 1103 may, for example, employ qubits and coupling devices in a manner that is substantially similar to that of quantum processor 100 in FIG. 1, though in practice quantum processor 1103 may employ significantly more qubits and coupling devices (e.g., on the order of hundreds, thousands, etc.) than illustrated in FIG. 1. Quantum processor 1103 may include and/or be in communication with three subsystems: programming subsystem 1161, evolution subsystem 1162, and readout subsystem 1163. As previously described, programming subsystem 1161 may include a set of programming interfaces (e.g., 122, 123, and 125 from FIG. 1) to program quantum processor 1103 with a configuration of programmable parameters; evolution subsystem 1162 may include a set of evolution interfaces (e.g., 121 and 124 from FIG. 1) to evolve quantum processor 1103 (e.g., to implement adiabatic quantum computation and/or quantum annealing); and readout subsystem 1163 may include a set of readout devices (e.g., 141 and 142 from FIG. 1) and/or other readout circuitry to read out a state of quantum processor 1103 (e.g., by reading out the respective states of the qubits in quantum processor 1103). Any or all of subsystems 1161, 1162, and/or 1163 (including any or all components thereof) may be integrated in quantum processor 1103 (i.e., included "on-chip" and packaged with quantum processor 1103) or may be separate from quantum processor 1103 and communicatively coupled therewith. In accordance with the present systems and methods, quantum processor 1103 may be operated as a sample generator to provide samples from a probability distribution, where a shape of the probability distribution depends on a configuration of a number of programmable parameters for quantum processor 1103 and a number of low-energy states of quantum processor 1103 respectively correspond to a number of high probability samples of the probability distribution. Quantum processor 1103 may include, for example, an adiabatic quantum processor and/or a processor that performs quantum annealing.

Digital computer 1101 may, in accordance with the present systems and methods, process samples from quantum processor 1103 and control the configuration of the number of programmable parameters for quantum processor 1103 to shape the probability distribution of quantum processor 1103. In terms of its physical construction, digital computer 1101 may be substantially similar to exemplary digital computer 1000 from FIG. 10. For example, digital computer 1101 includes digital processor 1106 and system memory 1108 (communicatively coupled to digital processor 1106) which may be substantially similar to digital processor 1006 and system memory 1008, respectively, from FIG. 10. A person of skill in the art will appreciate that either or each of digital (ie., classical) computer 1101 and quantum processor 1103 may include additional components not shown in FIG. 11 (such as, for example, the other components of digital computer 1000 from FIG. 10 not shown in digital computer 1101 of FIG. 11). In accordance with the present systems and methods, system memory 1108 stores a set of modules 1131, 1132, 1133, 1134, and 1135, each of which may include a respective set of instructions executable by digital processor 1106 to cause digital processor 1106 to interact with quantum processor 1103. For example, machine language module 1131 may generate programming instructions in the machine language of quantum processor 1103 for execution by programming subsystem 1161 of quantum processor 1103; abstraction module 1132 may generate, store, and/or execute instructions to process an objective function to be minimized via quantum processor 1103 and may invoke machine language module 1131 to generate programming instructions for programming subsystem 1161 that define configurations of a number of programmable parameters for quantum processor 1103; client library module 1133 may generate, store, and/or execute a program via at least one high-level programming language, the program including at least one objective function to be minimized via quantum processor 1103; algorithm module 1134 may generate, store, and/or execute an algorithm and invokes client library module 1133 to execute a program, where the algorithm includes at least one objective function to be minimized via quantum processor 1103; and application module 1135 may generate, store, and/or execute an end-use application and invokes algorithm module 1134 to execute an algorithm, where the end-use application includes at least one objective function to be minimized via quantum processor 1103. Each of modules 1131-1135 will now be discussed in more detail.

Machine language module 1131 generates programming instructions in the machine language of quantum processor 1103 for execution by programming subsystem 1161 of quantum processor 1103. A user may interact with quantum processor 1103 via machine language module 1131 by using machine language module 1131 to manually assign values to the individual programmable elements of quantum processor 1103 (e.g., manually assign $h_i$ values to the qubits 101, 102 and $J_{ij}$ values to the couplers 111). In other words, machine language module 1131 may generate programming instructions in the machine language of quantum processor 1103 for execution by programming subsystem 1161 via manual input of instructions by a user. Machine language module 1131 provides a user interface for, for example, implementing the previously-described "direct mapping" approach to programming quantum processor 1103. Interacting with quantum processor 1103 via machine language module 1131 is analogous to programming quantum processor 1103 in the "machine language" of quantum processor 1103. The "machine language" of quantum processor 1103 may include, for example, specific device-level programming signal definitions. For example, the machine language of quantum processor 100 from FIG. 1 may include an indication of the signal to be applied by programming interface 122 to qubit 101 in order to produce a desired h term in qubit 101, an indication of the signal to be applied by programming interface 123 to qubit 102 in order to produce a desired h term in qubit 102, and an indication of the signal to be applied by programming interface 125 to coupling device 111 in order to produce a desired J term in coupling device 111. The machine language of quantum processor 100 may also include, for example, an indication of the signal to be applied by evolution interfaces 121 and 124 to CJJ 131 of qubit 101 and CJJ 132 of qubit 102, respectively, in order to produce a desired Δ term (or desired Δ terms) in those devices, as well as an indication of the duration, evolution, and/or number of iterations of the Δ signal(s). The signals from the evolution interfaces in the evolution subsystem may define the evolution/annealing schedule of an implementation of adiabatic quantum computation and/or quantum annealing. This low-level programming environment may be advantageous for some applications and/or implementations of scientific experiments, but is very different from the programming of a digital computer and can be difficult for a user to learn and employ. In accordance with the present systems and methods, it can be advantageous for some applications to provide alternative modules (i.e., modules 1132-1135) to facilitate interactions with quantum processor 1103 via higher-level programming environments.

Abstraction module 1132 generates, stores, and/or executes instructions to process an objective function to be minimized via quantum processor 1103 and invokes machine language module 1131 that generates programming instructions for programming subsystem 1161 that define configurations of a number of programmable parameters for quantum processor 1103. Thus, abstraction module 1132 enables a user to interact with quantum processor 1103 without requiring the user to learn and program in the machine language of quantum processor 1103. In other words, abstraction module 1132 "abstracts away" the intricate details of programming the quantum processor from the programmer/user and enables general problem types (i.e., general "blackbox" functions) to be defined for interaction with quantum processor 1103. Abstraction module 1132 may automatically invoke machine language module 1131 to translate some aspect of processing an objective function (e.g., defined by a user) into the machine language of quantum processor 1103. In other words, machine language module 1131 may generate programming instructions in the machine language of quantum processor 1103 for execution by programming subsystem 1161 automatically in response to an invocation by abstraction module 1132. Abstraction module 1132 may "process an objective function" by employing any or all of the methods, acts, sub-acts, techniques, and/or algorithms described above, including but not limited to: methods 300-900 and/or their corresponding acts and sub-acts, algorithms 1-7, and the various examples of modeling a problem or population described previously.

As previously described, the types of problems that may be solved by any particular embodiment of quantum processor 1103, as well as the relative size and complexity of such problems, typically depend on many factors. Two such factors may include the number of qubits in quantum processor 1103 and the availability of couplings between the qubits in quantum processor 1103. While quantum processor 100 from FIG. 1 employs two qubits 101, 102 that are directly communicably coupleable via coupling device 111, a significantly larger quantum processor (e.g., a quantum processor having on the order of hundreds, thousands, etc. of qubits and/or coupling devices) may include some qubits that are not directly communicably coupleable with one another (due to, for example, spatial constraints in the quantum processor, limited availability of control circuitry, limited connectivity, noise isolation considerations, etc.). Having some qubits that are not directly communicably coupleable with one another can be advantageous (or, in some cases, necessary) in some respects, but can also influence how certain problems are mapped to quantum processor 1103. An objective function may involve interactions between variables (e.g., see the pair-wise interaction between $\sigma_i^z$ and $\sigma_j^z$ in equation 3). In some cases, every such interaction can be directly mapped to a corresponding coupling device (e.g., coupling device 111) in quantum processor 1103 and machine language module 1131 is operable to generate such a mapping. In other cases, some such interactions may not be directly mapped to a corresponding coupling device in quantum processor 1103. Machine language 1131 may accommodate such cases by generating more complicated mappings such as those described in U.S. Pat. No. 7,984,012, US Patent Publication 2011-0238607 and U.S. Pat. No. 8,174,305. However, such techniques are limited in their applicability. Using abstraction module 1132, the sampling techniques described in the present systems and methods may be employed to accommodate mapping constraints in the architecture of quantum processor 1103. A user may use abstraction module 1132 to process any discrete function to be optimized, where an input to the function is a bit string indicating the binary states of a number of function parameters and an output from the function is a real number value. Abstraction module 1132 may then invoke machine language module 1131 to automatically program the programmable elements of quantum processor 1103 without requiring the user to learn and employ the machine language of quantum processor 1103. Abstraction module 1132 may also, for example, generate, store and/or execute at least some of the classical digital processing tasks required for methods 300-900 described above and/or the associated classical modeling techniques. For example, abstraction module 1132 may generate, store and/or execute instructions for: determining a respective objective function value corresponding to each sample generated via quantum processor 1103; determining additional samples based on at least one sample from quantum processor 1103; performing classical heuristic optimization algorithms; constructing a model of an objective function; evolving a model of an objective function; etc. In other words, at least some of the various classical digital processing tasks of the methods for sampling a population, solving a problem, and/or minimizing an objective function described herein may be generated, stored and/or executed via abstraction module 1132.

Client library module 1133 generates, stores, and/or executes a program via at least one high-level programming language, where the program includes at least one objective function to be minimized via quantum processor 1103. Client library module 1133 may also invoke abstraction module 1132 that processes the objective function to be minimized via quantum processor 1103. In other words, abstraction module 1132 may process an objective function to be minimized via quantum processor 1103 automatically in response to an invocation by client library module 1133. For a user wishing to develop a program or application, or a user who is simply most familiar with a specific programming language, client library module 1133 provides the ability to use high-level programming languages to interact with quantum processor 1103. For example, client library module 1133 may include a collection of client libraries (and, if necessary, corresponding wrapper(s)) that translate code from a known high-level programming language into appropriate input parameters for abstraction module 1132 and/or into corresponding input parameters for machine language module 1131. Thus, client library module 1133 may interact with quantum processor 1103 through machine language module 1131 and this interaction may be (but is not required to be) mediated by abstraction module 1132. Exemplary high-level programming languages that may be employed in client library module 1133 include C, C++, Python, SQL, JAVA, LISP and MATLAB, though a person of skill in the art will appreciate that client library module 1133 may be operable to employ any high-level programming language, not just those languages listed as examples herein. Using client library module 1133, a user may develop a program or application using all of the standard features of any high-level programming language and within an integrated development environment (i.e., "IDE") with which the user is comfortable and familiar. However, client library module 1133 includes client libraries that enable the user to make calls to quantum processor 1103 wherever necessary in the program or application without learning or employing the machine language of quantum processor 1103. For example, a program or application may include an objective function to be minimized and a call to quantum processor 1103 may be necessary in order to produce an at least approximate minimum of the objective function.

Algorithm module 1134 generates, stores, and/or executes an algorithm, where the algorithm includes at least one objective function to be minimized by quantum processor 1103. Algorithm module 1134 may also invoke client library module 1133 that executes a program. For example, algorithm module 1134 may generate, store, and/or execute specific routines and/or subroutines for performing a particular algorithmic function so that a user may simply specify and provide data/parameters for a particular "mode of use" of quantum processor 1103 without having to develop the code for the corresponding algorithm. Algorithm module 1134 may be abstracted away from the underlying subroutine code to minimize the amount of programming required from the user. Exemplary algorithms or modes of use that may be generated, stored and/or executed in algorithm module 1134 include, but are not limited to, discrete optimization, supervised binary classification, supervised multiple label assignment, unsupervised feature learning, factoring, pattern matching, image recognition, protein folding, etc.

Application module 1135 generates, stores, and/or executes an end-use application, where the end-use application includes at least one objective function to be minimized by quantum processor 1103. Application module 1135 may also invoke algorithm module 1134 that executes an algorithm. In various applications, application module 1135 may invoke and/or employ any or all of modules 1131-1134, either directly or through another module. Application module 1135 may store and provide access to complete end-use applications that include, for example, stored data and customized user interfaces.

Some or all of modules 1131-1135 may be employed in the operation of the various embodiments of problem-solving methods described herein. For example, referring back to method 700 from FIG. 7, defining a function via the digital computer (act 701) may include defining the function via client library module 1133, processing bit strings generated by the quantum processor via the digital computer (act 704) may include processing the bit strings via abstraction module 1132 and generating bit strings via the quantum processor (act 703) may include programming the quantum processor with a configuration of programmable parameters via machine language module 1131 (either manually or automatically by invocation from, for example, abstraction module 1132). In this case, method 700 may further include providing programming instructions from machine language module 1131 to programming subsystem 1161 of quantum processor 1103 and executing the programming instructions via programming subsystem 1161.

Machine language module 1131 generates (either automatically in response to an invocation by a higher-level module such as modules 1132-1135 or by manual input of instructions by a user) machine language for programming the programmable elements of quantum processor 1103. The machine language may be sent from digital computer 1101 to quantum processor 1103, for example, via Web server 1102. For example, providing programming instructions from machine language module 1131 to programming subsystem 1161 may include providing the programming instructions from machine language module 1131 to programming subsystem 1161 via Web server 1102. As illustrated in FIG. 11, Web server 1102 may provide a Web interface between quantum processor 1103 and the machine language module 1131 of digital computer 1101, where machine language module 1131 may generate code in, for example, http; however, in other implementations Web server 1102 may interface with a different module or modules (e.g., any or all of modules 1132-1135) of digital computer 1101. Web server 1102 may parse incoming requests (i.e., incoming calls to quantum processor 1103) and/or queue and/or sort such requests so that multiple users and/or modules and/or applications can interact with quantum processor 1103. Thus, in hybrid system 1100, cloud-based interfacing is implemented within a much lower layer (i.e., the machine language layer for quantum processor 1103) than in conventional systems. This is analogous to a microprocessor being fed machine code over the Internet. The incorporation of cloud-based methodology also renders system 1100 compatible with typical high performance computing centers and/or server farms, which may be advantageous in situations where digital computer 1101 requires more computational resources (as previously described).

For example a remote connection may be established from client library module 1133 to quantum processor 1103 through machine language module 1131 using the following code written in Python (i.e., within client library module 1133):

```
from machine_language_module import RemoteConnection
# define the url and a valid token
url="http://myURL"
token="myToken001"
# create a remote connection using url and token
remote_connection=RemoteConnection(url, token)
# connect to a specific quantum processor
solver=remote_connection.get_solver("R4-7_C4_Zen2103_19091607-15-D4_C1R5-LP")
``` where "R4-7_C4_Zen2103_19091607-15-D4_C1R5-LP" is an exemplary name of a specific quantum processor 1103 in a network of multiple quantum processors.

And, to extend the example, the remote connection to quantum processor 1103 may use quantum processor 1103 to solve, for example, a four-variable QUBO problem:

```
from machine_language_module import RemoteConnection
# define the url and a valid token
url="http://myURL"
token="myToken001"
# create a remote connection using url and token
remote_connection=RemoteConnection(url, token)
# connect to a specific quantum processor
solver=remote_connection.get_solver("R4-7_C4_Zen2103_19091607-15-D4_C1R5-LP")
# define QUBO problem Q
Q=dict()
Q[(0, 0)]=100
Q[(0, 1)]=200
Q[(0, 2)]=300
Q[(0, 3)]=400
Q[(1, 1)]=500
Q[(1, 2)]=600
Q[(1, 3)]=700
Q[(2, 2)]=800
Q[(2, 3)]=900
Q[(3, 3)]=1000
# define embeddings
embeddings=[[48, 52], [49, 53], [50, 54], [51, 55]]
# create the embedding solver
embedding_solver=EmbeddingSolver(solver, embeddings)
# print the properties of the embedding solver
print embedding_solver.num_qubits
print embedding_solver.qubits
print embedding_solver.couplers
# solve the QUBO problem
answer_qubo=embedding_solver.solve_qubo(Q, num_reads=100)
print answer_qubo
# convert the QUBO to Ising
(h, J, offset)=qubo_to_ising(Q)
# solve the Ising problem
answer_ising=embedding_solver.solve_ising(h, J, num_reads=100)
print answer_ising
returns
embedding_solver.num_qubits: 4
embedding_solver.qubits=(0, 1, 2, 3)
embedding_solver.couplers=((0, 1), (0, 2), (0, 3), (1, 2), (1, 3), (2, 3))
answer_qubo=energies: [0.0]
num_occurrences: [100]
solutions: [[0, 0, 0, 0]]
answer_ising=energies: [−1975.0]
num_occurrences: [100]
solutions: [[−1, −1, −1, −1]]
```

Note that in the example above, the four-variable QUBO problem is "directly mapped" (i.e., embedded) to quantum processor 1103 using code written in client library module 1133 that invokes machine language module 1131. Abstraction module 1132 is not employed in this example. As described previously (and evidenced by the embedding code in the example above for a small, four-variable QUBO problem), the direct mapping approach can be very complicated. In accordance with the present systems and methods, abstraction module 1132 may be invoked from client library module 1133 to implement the various embodiments of methods described herein (e.g., methods 300-900) to produce a solution to a problem without requiring the user to embed/map the problem in QUBO form. Abstraction module 1132 may be called from client library module 1133 as, for example, a solver:

```
abstraction_module_solver=AbstractionModuleSolver(solver)
answer=abstraction_module_solver.solve(obj, num_vars, param_name=value, . . . )
```

Using the exemplary Python code above, a user may write code in client library module 1133 to call abstraction module 1132 as a solver rather than calling quantum processor 1103 itself directly (through machine language module 1131, as in the previous example), and abstraction module 1132 may interact with quantum processor 1103 to "solve" an objective function by implementing, for example, any and/or all of methods 300-900 and/or the classical processing/modeling tasks described herein.

Exemplary pseudocode for an instance of abstraction module 1132 that employs multiple models simultaneously with small model changes, large model changes, and path relinking between models is provided below:

Initialize
While termination criterion is not met
For i=1 to cluster_num
sampleSet{i}=Draw num_reads samples from quantum processor
Value{i}=Evaluate sampleSet{i} on black box function G
Update bestVal(i) and bestState(i),
If bestVal(i) is unchanged for unchanged_threshold iterations
LargeChange(θ{i}|θ{1 . . . cluster_num})
Else
Update(θ{i})
Do path relinking every path_relinking_wait_num iterations Each of modules 1131-1135 may interact with one another either directly or indirectly. As described above, application module 1135 may invoke and/or employ any or all of modules 1131-1134. Similarly, algorithm module 1134 may invoke and/or employ any or all of modules 1131-1133 and client library module 1133 may invoke and/or employ any or all of modules 1131-1132. In accordance with the present systems and methods, modules 1131-1135 may be programmatically architected in a hierarchical stack, with machine language module 1131 corresponding to the lowest-level programming environment (e.g., programming in the machine language of quantum processor 1103) and application module 1135 corresponding to the highest-level programming environment.

Figure 12:
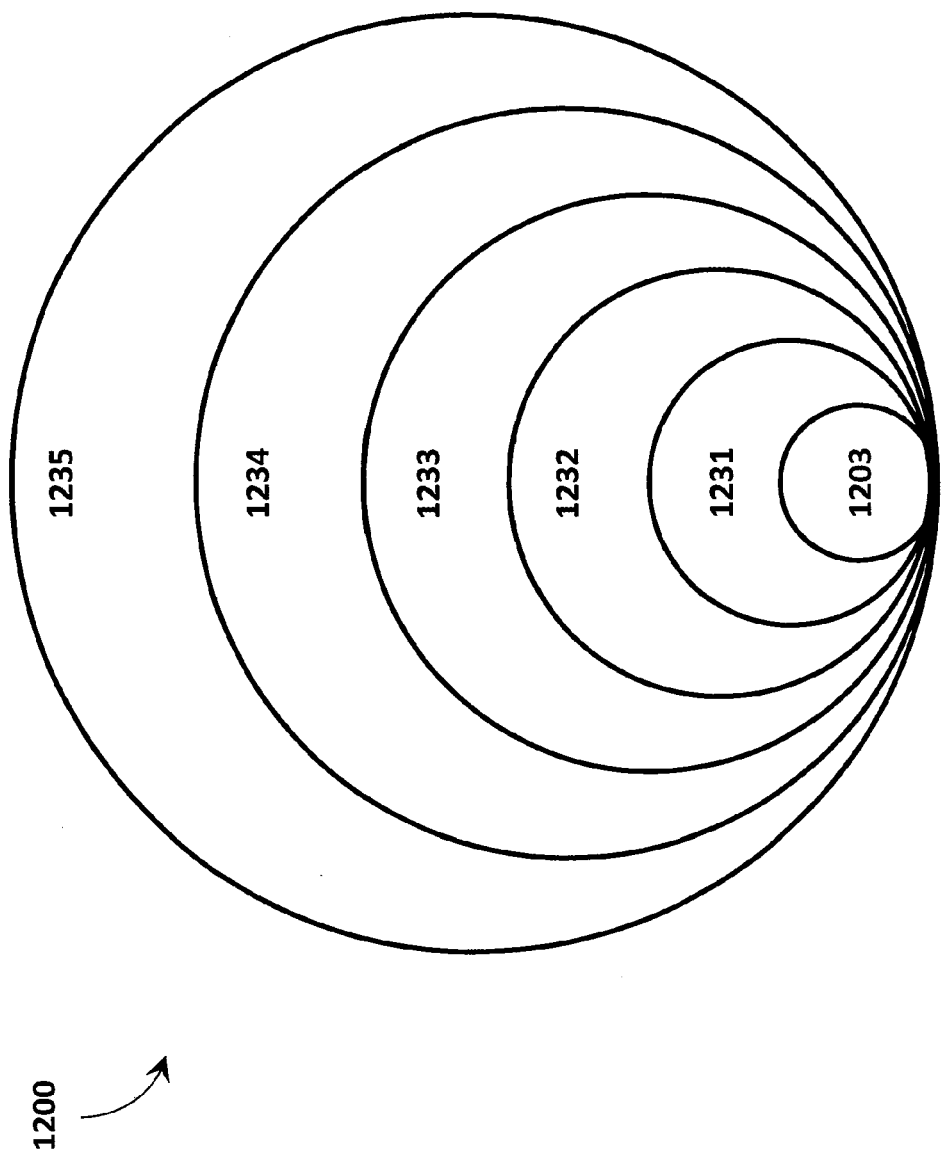
FIG. 12 is an illustrative diagram showing an exemplary hierarchical stack for the software modules from FIG. 11 in accordance with the present systems and methods.

FIG. 12 is an illustrative diagram showing an exemplary hierarchical stack 1200 for software modules 1131-1135 from FIG. 11 in accordance with the present systems and methods. In FIG. 12, circle 1203 corresponds to a quantum processor (i.e., analogous to quantum processor 1103 from FIG. 11), circle 1231 corresponds to a machine language module (i.e., analogous to machine language module 1131 from FIG. 11), circle 1232 corresponds to an abstraction module (i.e., analogous to abstraction module 1132 from FIG. 11), circle 1233 corresponds to a client library module (i.e., analogous to client library module 1133 from FIG. 11), circle 1234 corresponds to an algorithm module (i.e., analogous to algorithm module 1134 from FIG. 11), and circle 1235 corresponds to an application module (i.e., analogous to application module 1135 from FIG. 11). As illustrated in FIG. 12, machine language module 1231 may interact directly with the programmable elements of quantum processor 1203 (via, for example, a programming subsystem such as programming subsystem 1161); abstraction module 1232 may interact with quantum processor 1203 via machine language module 1231; client library module 1233 may interact with quantum processor 1203 via abstraction module 1232 and/or via machine language module 1231; algorithm module 1234 may interact with quantum processor 1203 via client library module 1233 and/or via abstraction module 1232 and/or via machine language module 1231; and application module 1235 may interact with quantum processor 1203 via algorithm module 1234 and/or via client library module 1233 and/or via abstraction module 1232 and/or via machine language module 1231. For example, a user may develop an end-use application in application module 1235 where the end-use application includes at least one objective function to be minimized. Application module 1235 may invoke algorithm module 1234 to either automatically generate an algorithm or execute a stored algorithm, which in turn invokes client library module 1233 to either automatically generate a program or execute a stored program. Client library module 1233 may then invoke abstraction module 1232 to process the objective function to be minimized (via, for example, the "sampling" and/or "modeling" methods described previously) and abstraction module 1232 may then invoke machine language module 1231 to generate programming instructions for quantum processor 1203 to achieve some aspect of the processing of the objective function via abstraction module 1232 (e.g., to provide samples from a probability distribution used in the processing of the objective function). Machine language module 1231 may then interact with quantum processor 1203 by using a programming subsystem (e.g., programming interfaces 122, 123, and 125 from FIG. 1) to assign the corresponding $h_i$ and $J_{ij}$ values to the programmable elements in quantum processor 1203.

In the example described above, the user's only direct point of interaction with hierarchical stack 1200 is via application module 1235. In response to the user's interaction with application module 1235, the remaining modules 1231-1234 and quantum processor 1203 are all invoked to automatically perform their respective operations. More specifically, in the example described above, algorithm module 1234 generates an algorithm automatically in response to an invocation by application module 1235 by executing a stored algorithm, client library module 1233 is generates a program using at least one high-level programming language automatically in response to an invocation by algorithm module 1234 by executing a stored program, abstraction module 1232 processes an objective function to be minimized by quantum processor 1203 automatically in response to an invocation by client library module 1233, and machine language module 1231 generates programming instructions in the machine language of quantum processor 1203 for execution by the programming subsystem of quantum processor 1203 automatically in response to an invocation by abstraction module 1232. However, in alternative applications, a user may manually interact with any or all of modules 1231-1234. For example, algorithm module 1234 may generate an algorithm by manual input of instructions by a user; client library module 1233 may generate a program using at least one high-level programming language by manual input of instructions by a user; abstraction module 1232 may process an objective function to be minimized by quantum processor 1203 by manual input of instructions by a user; and/or machine language module 1231 may generate programming instructions in the machine language of quantum processor 1203 for execution by the programming subsystem of quantum processor 1203 by manual input of instructions by a user.

For example, within the environment of client library module 1233, a user may invoke functionality from abstraction module 1232 and from machine language module 1231 in accordance with the sample code below:

from abstraction_module import Mapper
from machine_language_module import ConnectToQuantumProcessor
from machine_language_module import SolveViaQuantumProcessor
function_definition=[defined by user in client library module]
mapped_problem=Mapper(function_definition)
connect=ConnectToQuantumProcessor()
solver=connect.create_solver('quantum_processor')

solve_via_quantum_processor=SolveViaQuantumProcessor(solver, mapped_problem)
(answer, messages)=solve_via_quantum_processor.solve_problem(h_values, J_values)
returned_bit_string=answer['solutions'][0]

Similarly, algorithm module 1234 may invoke any of modules 1231-1233 and application module 1235 may invoke any of modules 1231-1234.

As previously described, algorithm module 1234 may generate, store, and/or execute an algorithm, where the algorithm includes at least one objective function to be minimized by quantum processor 1203. An example of an algorithm is a binary classification algorithm used in machine learning applications. Exemplary pseudocode for such an algorithm, presented here in Python, that may be generated, stored, and/or executed via algorithm module 1234 is as follows:

```
# Create a large number of weak classifiers, potentially thousands or millions
class WeakClassifierType1(input, params):
    Apply routine and parameters to an input to make a binary prediction (0/1)
    return prediction
class WeakClassifierType2(input, params):
    Apply routine and parameters to an input to make a binary prediction (0/1)
    return prediction
Etc.
# Create many weak classifiers from the classes defined above:
Function create_weak_classifier_ensemble():
    weak_classifier_object1=WeakClassifierType1(params1)
    weak_classifier_object2=WeakClassifierType1(params2)
    weak_classifier_object3=WeakClassifierType2(params3)
# Group weak classifiers into groups equal to, for example, the maximum size of the quantum processor graph G(V, E):
S=training_data_set
n=number of weak_classifiers/quantum_processor_graph_size
# n is the number of classifiers per group
g=quantum_processor_graph_size
w=array(size n)
# w holds the binary values assigned to each weak classifier which describes whether or not it is to be included in the final strong classifier. The bitstring w may be provided by the quantum processor 1203.
For i in range(num_groups):
    create_group(weak_classifier_ensemble[i*n:i*n+n])
# For each group, the goal is to minimize the objective function over all training data and all group binary variables. This is the part where the Abstraction Module 1232 may be called to minimize the objective function defined over w and S:
For i in range(num_groups):
    best_bitstring=argmin(w,S)
# Take the best bitstrings, extract all weak classifiers that made it through this stage, and regroup.
For i in range(0,len(bitstring):
    if bitstring[i] !=0:
        level2_groups.append(weak_classifier[i])
# Repeat the grouping procedure with the winners from the first round:
For i in range(num_groups_level2):
    create_group(level2_groups[i*n:i*n+n])
# Run the optimization step again:
For i in range(num_groups_level2):
    best_bitstring=argmin(w,S)
# This whole procedure may be repeated in an outer loop until num_groups_levelX<maximum_strong_classifier_size
(this may be decided by the user. For example, a user may use domain knowledge to begin with 1,000,000 weak classfiers, and end when the best 1000 weak classifiers are found by this iterative approach.)
```

The binary classification algorithm described above is an example of an algorithm (i.e., mode of use) that may be generated, stored, and/or executed via algorithm module 1234. The binary classification algorithm includes an objective function to be minimized via quantum processor 1203.

As previously described, application module 1235 may generate, store, and/or execute an end-use application, where the end-use application includes at least one objective function to be minimized by quantum processor 1203. An example of an end-use application that employs the binary classification algorithm described above is the identification of prohibited objects in images, such as in X-ray scans performed by security screening personnel in airports. Exemplary pseudocode for this end-use application is as follows:

```
# 3 things are necessary to implement the application:
# Step 1: Training data
# Step 2: Weak classifier definitions
# Step 3: An algorithmic framework
# Step 1: Obtain training data, which in this exemplary application is a set of images (X-Ray scans of objects such as luggage) which have been labeled (e.g., by a domain expert) as either containing a prohibited image (label is '1') or not containing a prohibited object (label is '0')
For image in image_set:
    Training_data_points[image]=load(image, filename 'i')
    Training_data_labels[image]=load(labels_for_images[image])
# Step 2: Construct weak classifiers using, for example, a color-histogram feature extraction approach. Each training image may be split into sub-blocks of pixels, which can overlap and be different sizes. The weak classifiers output may be determined by the color histograms of each of these blocks.
class WeakClassifier(i, params1):
    Locate block i in the image
    block_histogram=get_color_histogram( )
    if block_histogram has property(params1):
        output_vote=1
    else:
        output vote=0
params_array=[(histo_bin10>5), (histo_bin8<200), (histo_bin2<40 AND histo_bin12>5) . . . ]
# Parameters passed to the class may include features that the user can define, or they can be automatically generated from other code. For example, the first parameter above describes a function which checks whether or not the 10th bin of the histogram for a particular block in question has a value greater than 5.
# Create a large ensemble of such classifiers, potentially millions in the case of image analysis:
function create_weak_classifier_ensemble( )
    for i in range(number_of_blocks_in_image):
        params=params_array[i]
        weak_classifier_instance=WeakClassifier(i, params)
        weak_classifier_ensemble.append(weak_classifier_instance)
# Each weak classifier may return a binary value for a single image, and may return different vectors when operating on different images.
# Step 3: Craft an objective function following the exemplary binary classification algorithm described above (e.g.,
``` invoke algorithm module 1234), using the training data, the weak_classifier_ensemble, and a string of binary weights called w:
\# Initialize w a string of random binary values, e.g.
w=[0,1,1,1,0,0,0,1,0,1,1,0 . . . ]
\# The length of w is the number of weak_classifiers under consideration.
\# Define predicted label as a weak classifier operating on a piece of training data. Each time a weak classifier is called, the function to compute a label may run connect to a quantum processor, including either a local quantum processor or a quantum processor in the cloud (i.e., a quantum processor accessible via a remote connection).
predicted label=w[i]*weak_classifier_instance(i,image)
class ObjectiveFunction:
    compute argmin(w, training_data_points) of:
    {sum_over_all_training_data (label−predicted label)**2}
\# This gives an objective function which, when the binary weights in w are optimized, may return the lowest error in labeling images compared to the original (expert assigned) labels.
\# This objective function may now be passed to abstraction module 1232:
abstraction_module_solver=Abstraction ModuleSolver(objective_function, params)
answer=abstraction_module_solver.answer
\# This returns the best bit string for the set of weak_classifiers under consideration.
\# In order to complete the application, the entire code may be wrapped in a loop which implements the voting hierarchy algorithm as described in the binary classification algorithm example above.
strong_classifier=list(optimized_weak_classifiers)
\# The final result will be a strong classifier comprising multiple weak classifiers which can be applied to a new, unseen image. The strong classifier may give a yes (1) or no (0) vote, resulting in a prediciton about whether or not the new image contains a prohibited object. Here, if more than 50% of the weak classifiers vote yes, the outcome is yes, otherwise it is no.
function apply_final_strong_classifier( ):
    number_of_classifiers=length(strong_classifier)
    for weak_classifier_instance in optimized_weak_classifiers:
        sum_votes+=weak_classifier_instance(new image)
    if sum_votes>number_of_classifiers/2:
        output=1
    else:
        output=0
return output In accordance with the present systems and methods, modules 1231-1235 may, in some cases, be combined in various ways and/or any given module may be written as a library invoked by a higher-level module. For example, algorithm module 1234 may be combined with application module 1235, and/or client library module 1233 may be combined with algorithm module 1234, and/or abstraction module 1232 may be combined with client library module 1233, etc.; similarly, an algorithm stored in algorithm module 1234 may be invoked as a library by application module 1235, and/or a program stored in client library module 1233 may be invoked as a library by algorithm module 1234, etc.

Throughout this specification and the appended claims, adiabatic quantum computation and quantum annealing are used as examples of computational processes performed by a quantum processor. A person of skill in the art will appreciate that alternative forms of quantum computation, such as gate-model quantum computation, circuit-model quantum computation, and measurement-based quantum computation, may similarly be employed in conjunction with the present systems and methods. Adiabatic quantum computation and quantum annealing are used herein as exemplary processes only and are not intended to limit the scope of the present systems and methods to embodiments that employ those processes.

The various embodiments described herein teach sample generator systems and methods that intrinsically provide samples representing low-energy configurations with high probability. In other words, the probability of a sample being returned is inversely related to an energy of the sample. The present systems and methods teach that a quantum processor (e.g., a quantum processor performing adiabatic quantum computation and/or quantum annealing) may be operated as such a sample generator; however, the various embodiments described herein are not limited to systems and methods that employ a quantum processor. Alternative, "non-quantum processor" sample generator systems and methods may be used in the present systems and methods. For example, a software solver may be constructed, stored, and executed by a digital computer (via, for example, a solver module) where the software solver programmatically provides low-energy samples with high probability. For example, a software solver may be designed to emulate the behavior of a quantum processor. Such a software solver may be useful for some applications, but the performance of a quantum processor in the various sampling methods described herein may exceed the performance of a software solver for certain applications (e.g., applications having many variables and/or many local minima). Accordingly, the sample generator systems and methods described herein may, in various applications, include deterministic systems and methods and/or non-deterministic (e.g., stochastic) systems and methods.

The present systems and methods may, for example, provide fundamental improvements to a class of algorithms known as "Estimation of Distribution" ("EOD") algorithms. In particular, the present systems and methods are adapted for use with quantum processors and may outperform known EOD algorithms by employing quantum processors that are specifically designed to provide low-energy states with high probability. In typical EOD algorithms, a probability distribution may be sampled from at random. In accordance with the present systems and methods, a quantum processor designed to perform adiabatic quantum computation and/or quantum annealing may be employed to intrinsically sample from low-energy states with high probability, thereby enabling the quantum processor to converge on low values of the objective function faster and/or more effectively than known EOD algorithms implemented on digital computers.

Throughout this specification and the appended claims, qualitative terms such as "high" and "low" are often used to describe certain features, such as a "high/low probability," a "high/low objective value" and a "high/low-energy state." A person of skill in the art will appreciate that these terms are used in a relative sense. For example, a "high probability" corresponds to a probability that is "relatively high" compared to other probabilities in the system, such as a probability that is higher than an average probability, where the average probability may be a median probability, a mean probability, a mode probability, or the like. Thus, unless the specific context requires otherwise, the terms "high" and "low" as used in the present systems and methods may be construed as "higher than average" and "lower than average." However, in some applications, it can be advantageous to enforce a stricter meaning for these terms to define a more narrow range, such as defining "high" as "in the top x %" where x=50, 25, 10, 5, 1, or 0.1, etc. and/or defining "low" as "in the bottom y %" where y=50, 25, 10, 5, 1, or 0.1, etc.

Similarly, a person of skill in the art will appreciate that the terms "approximate" and "approximately" are used throughout this specification and the appended claims, as in "an approximate minimum value of an objective function," to indicate that the value obtained need not necessarily be the absolute minimum value and that an approximate minimum value may be sufficient for many applications. The term "approximate minimum" refers to a low value that satisfies at least one solution criterion, such as: a low-value below a specified threshold, a lowest value obtained within a specified amount of time, a lowest value obtained within a specified number of iterations, a lowest value obtained after a specified number of samples have been drawn, etc.

A person of skill in the art will appreciate that the names for the various software module described herein (e.g., modules 1131-1135 and 1231-1235) are used for illustrative purposes and are not intended to limit the role and/or function of the modules. For example, the term "abstraction module" is used to describe module 1132 (and 1232) to emphasize that this module enables a user to "abstract away" from the complicated machine language of a quantum processor and to instead interact with the quantum processor as a "black box" providing samples from a probability distribution in accordance with the present systems and methods. Thus, abstraction module 1131 (and 1232) could synonymously be referred to as a "black box module," or a "sampling module," or a "solver module," etc.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other methods of quantum computation, not necessarily the exemplary methods for quantum computation generally described above.

The various embodiments described above can be combined to provide further embodiments. All of the U.S. patents, U.S. patent application publications, U.S. patent applications, International (PCT) patent applications referred to in this specification and/or listed in the Application Data Sheet are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation in a hybrid problem solving system that comprises both a quantum processor and a digital computer to at least approximately solve a problem, the quantum processor and the digital computer communicatively coupled to one another and the quantum processor operated as a sample generator providing samples, the method comprising:

generating at least one sample from a probability distribution via the quantum processor, wherein a shape of the probability distribution depends on a configuration of a number of programmable parameters for the quantum processor and wherein a number of low-energy states of the quantum processor respectively correspond to a number of high probability samples of the probability distribution;

processing the at least one sample via the digital computer;

shaping the probability distribution of the quantum processor based on the processing of the at least one sample via the digital computer, wherein shaping the probability distribution of the quantum processor includes changing the configuration of the number of programmable parameters for the quantum processor to produce a shaped probability distribution;

generating at least one additional sample from the shaped probability distribution via the quantum processor;

processing the at least one additional sample via the digital computer; and determining an at least approximate solution to the problem via the digital computer based on the processing of the at least one additional sample via the digital computer.

2. The method of claim 1 wherein the problem includes an at least approximate minimization of an objective function and determining an at least approximate solution to the problem via the digital computer includes determining an at least approximate minimization of the objective function via the digital computer.

3. The method of claim 1 wherein processing the at least one sample via the digital computer includes determining a respective result of the problem that corresponds to each sample via the digital computer, and wherein processing the at least one additional sample via the digital computer includes determining a respective result of the problem that corresponds to each additional sample via the digital computer.

4. The method of claim 3 wherein determining an at least approximate solution to the problem via the digital computer includes returning a sample from the at least one additional sample if the result of the problem that corresponds to the sample from the at least one additional sample satisfies at least one solution criterion.

5. The method of claim 4 wherein returning the sample from the at least one additional sample if the result of the problem that corresponds to the sample from the at least one additional sample satisfies at least one solution criterion includes returning the sample from the at least one additional sample if the result of the problem that corresponds to the sample from the at least one additional sample satisfies at least one of: a minimum degree of solution accuracy, a maximum allowed computation time, or a maximum allowed number of samples generated.

6. The method of claim 1 wherein processing the at least one sample via the digital computer includes casting each sample as a respective starting point for a classical heuristic optimization algorithm via the digital computer, and wherein processing the at least one additional sample via the digital computer includes casting each additional sample as a respective starting point for a classical heuristic optimization algorithm via the digital computer.

7. The method of claim 6 wherein casting each sample as a respective starting point for a classical heuristic optimization algorithm via the digital computer includes casting each sample as a respective starting point for at least one of: a local search algorithm, a tabu search algorithm, a simulated annealing algorithm, a path re-linking algorithm, or a genetic algorithm; and wherein casting each additional sample as a respective starting point for a classical heuristic optimization algorithm via the digital computer includes casting each additional sample as a respective starting point for at least one of: a local search algorithm, a tabu search algorithm, a simulated annealing algorithm, a path re-linking algorithm, or a genetic algorithm.

8. The method of claim 6 wherein determining an at least approximate solution to the problem via the digital computer includes returning a result of casting each additional sample as a respective starting point for a classical heuristic optimization algorithm as the at least approximate solution to the problem via the digital computer.

9. The method of claim 1 wherein processing the at least one sample via the digital computer includes generating at least one respective local sample from a respective neighborhood of each sample via the digital computer, and wherein processing the at least one additional sample via the digital computer includes generating at least one respective local sample from a respective neighborhood of each additional sample via the digital computer.

10. The method of claim 9 wherein processing the at least one sample via the digital computer further includes determining a respective result of the problem that corresponds to each respective local sample from the respective neighborhood of each sample via the digital computer, and wherein processing the at least one additional sample via the digital computer further includes determining a respective result of the problem that corresponds to each respective local sample from the respective neighborhood of each additional sample via the digital computer.

11. The method of claim 10 wherein determining an at least approximate solution to the problem via the digital computer includes returning a local sample from the neighborhood of an additional sample if the result of the problem that corresponds to the local sample from the neighborhood of the additional sample satisfies at least one solution criterion.

12. The method of claim 11 wherein returning a local sample from the neighborhood of an additional sample if the result of the problem that corresponds to the local sample from the neighborhood of the additional sample satisfies at least one solution criterion includes returning the local sample from the neighborhood of the additional sample if the result of the problem that corresponds to the local sample from the neighborhood of the additional sample satisfies at least one of: a minimum degree of solution accuracy, a maximum allowed computation time, or a maximum allowed number of samples generated.

13. The method of claim 9 wherein each sample corresponds to a respective bit string having N bits and generating at least one respective local sample from a respective neighborhood of each sample via the digital computer includes generating at least one respective local sample from within a Hamming distance of less than or equal to about 0.1 N from each sample via the digital computer.

14. The method of claim 1 wherein shaping the probability distribution of the quantum processor based on the processing of the at least one sample via the digital computer includes at least one of: changing the configuration of a number of programmable parameters for the quantum processor to assign high probability to at least one sample based on the processing of the at least one sample via the digital computer, or changing the configuration of a number of programmable parameters for the quantum processor to assign low probability to at least one sample based on the processing of the at least one sample via the digital computer.

15. The method of claim 1 wherein generating at least one sample via the quantum processor includes performing at least one of adiabatic quantum computation or quantum annealing via the quantum processor.

16. The method of claim 1, further comprising:
constructing a model of the problem via the digital computer; and
evolving the model via the digital computer based at least partially on the processing of the at least one additional sample via the digital computer.

17. A hybrid problem solving system comprising:
a quantum processor that generates samples from a probability distribution, wherein a shape of the probability distribution depends on a configuration of a number of programmable parameters for the quantum processor and wherein a number of low-energy states of the quantum processor respectively correspond to a number of high probability samples of the probability distribution; and
a digital computer that processes the samples from the quantum processor and controls the configuration of the number of programmable parameters for the quantum processor to shape the probability distribution of the quantum processor, wherein the quantum processor and the digital computer are communicatively coupled to one another.

18. The system of claim 17 wherein the quantum processor includes a superconducting quantum processor comprising a plurality of superconducting qubits.

19. The system of claim 17 wherein the quantum processor includes at least one of an adiabatic quantum processor or a processor that performs quantum annealing.

20. The system of claim 17, further comprising:
a programming subsystem that programs the quantum processor with the configuration of programmable parameters;
an evolution subsystem that evolves the quantum processor; and
a readout subsystem that reads out a state of the quantum processor, wherein the state corresponds to a sample from the probability distribution.

21. The system of claim 17 wherein the digital computer comprises:
a machine language module that generates programming instructions in the machine language of the quantum processor; and
an abstraction module that processes an objective function to be minimized via the quantum processor and invokes the machine language module that generates programming instructions in the machine language of the quantum processor that define the configuration of the number of programmable parameters for the quantum processor.

22. The system of claim 17, further comprising:
a Web server communicatively coupled between the quantum processor and the digital computer such that the quantum processor and the digital computer are communicatively coupled to one another via the Web server.

23. A method of operation in a hybrid problem solving system that comprises both a quantum processor and a digital computer communicatively coupled to one another to at least approximately minimize an objective function, the method comprising:
operating the quantum processor as a sample generator to provide samples from a probability distribution, wherein a shape of the probability distribution depends on a configuration of a number of programmable parameters for the quantum processor and a number of low-energy states of the quantum processor respectively correspond to a number of high probability samples of the probability distribution, and wherein operating the quantum processor as a sample generator comprises:

defining a configuration of the number of programmable parameters for the quantum processor via the digital computer, wherein the configuration of the number of programmable parameters corresponds to a probability distribution over a set of states of the quantum processor;

programming the quantum processor with the configuration of the number of programmable parameters via a programming subsystem;

evolving the quantum processor via an evolution subsystem; and reading out a state of the quantum processor via a readout subsystem, wherein the state of the quantum processor corresponds to a sample from the probability distribution;

processing samples from the quantum processor via the digital computer, wherein processing samples from the quantum processor via the digital computer comprises:

determining a respective value of the objective function corresponding to each respective sample from the quantum processor via the digital computer;

determining at least one additional state based on at least one sample from the quantum processor via the digital computer; and determining a respective value of the objective function corresponding to each additional state via the digital computer; and returning a state that corresponds to an at least approximate minimum of the objective function via the digital computer.

24. The method of claim 23 wherein determining at least one additional state based on at least one sample from the quantum processor via the digital computer includes performing a classical heuristic optimization algorithm to determine at least one additional state based on at least one sample from the quantum processor via the digital computer.

25. The method of claim 24 wherein performing a classical heuristic optimization algorithm to determine at least one additional state based on at least one sample from the quantum processor via the digital computer includes performing at least one of: a local search algorithm, a tabu search algorithm, a simulated annealing algorithm, a path re-linking algorithm, or a genetic algorithm, via the digital computer.

26. The method of claim 23 wherein determining at least one additional state based on at least one sample from the quantum processor via an digital computer includes determining at least one local state from a neighborhood of at least one sample from the quantum processor via the digital computer.

27. The method of claim 26 wherein each state corresponds to a respective bit string having N bits and determining at least one local state from a neighborhood of at least one sample from the quantum processor via the digital computer includes determining at least one local state from within a Hamming distance of less than or equal to about 0.1 N from at least one sample from the quantum processor via the digital computer.

28. The method of claim 23 wherein evolving the quantum processor via an evolution subsystem includes performing at least one of adiabatic quantum computation or quantum annealing.

29. The method of claim 23 wherein operating the quantum processor as a sample generator to provide samples from a probability distribution further comprises:

re-defining a configuration of the number of programmable parameters for the quantum processor via the digital computer based on the processing of the samples from the quantum processor via the digital computer;

re-programming the quantum processor with the configuration of the number of programmable parameters via the programming subsystem;

re-evolving the quantum processor via the evolution subsystem; and reading out a state of the quantum processor via the readout subsystem, wherein the state of the quantum processor corresponds to a sample from the probability distribution.

30. The method of claim 23 wherein defining a configuration of a number of programmable parameters for the quantum processor via the digital computer includes defining the configuration of the number of programmable parameters for the quantum processor based on the processing of the samples from the quantum processor via the digital computer, and further comprising:

communicating a result of the processing of at least a first sample from the quantum processor via the digital computer to the operating of the quantum processor as a sample generator in order to provide at least one additional sample from the quantum processor based on the processing of the at least a first sample from the quantum processor.

31. The method of claim 30, further comprising:

shaping the probability distribution of the quantum processor based on the processing of the at least a first sample from the quantum processor via the digital computer, wherein shaping the probability distribution of the quantum processor includes changing the configuration of the number of programmable parameters for the quantum processor.

32. The method of claim 23 wherein processing samples from the quantum processor via the digital computer further comprises:

constructing a model of the objective function via the digital computer; and evolving the model via the digital computer based at least partially on the value of the objective function corresponding to at least one state.

33. A hybrid problem solving system to at least approximately minimize an objective function, the hybrid problem solving system comprising:

a quantum processor that provides samples from a probability distribution, wherein a shape of the probability distribution depends on a configuration of a number of programmable parameters for the quantum processor and a number of low-energy states of the quantum processor respectively correspond to a number of high probability samples of the probability distribution; and a digital computer that:

defines a configuration of the number of programmable parameters for the quantum processor, wherein the configuration of the number of programmable parameters corresponds to a probability distribution over a set of states of the quantum processor;

determines a respective value of the objective function corresponding to each respective sample from the quantum processor;

determines at least one additional state based on at least one sample from the quantum processor;

determines a respective value of the objective function corresponding to each additional state; and returns a state that corresponds to an at least approximate minimum of the objective function.

34. The hybrid system of claim 33, further comprising:
a programming subsystem that programs the quantum processor with the configuration of the number of programmable parameters;
an evolution subsystem that evolves the quantum processor to provide samples from the probability distribution; and
a readout subsystem that reads out a state of the quantum processor, wherein the state of the quantum processor corresponds to a sample from the probability distribution.

35. The hybrid system of claim 34 wherein the quantum processor includes at least a portion of at least one of the programming subsystem, the evolution subsystem, or the readout subsystem.

36. The hybrid system of claim 33 wherein the quantum processor includes a superconducting quantum processor and a plurality of superconducting qubits.

37. A method of operating a quantum processor and a digital computer to at least approximately minimize an objective function, the method comprising:
until a bit string that corresponds to an at least approximate minimum value of the objective function is found, iteratively:
generating bit strings via the quantum processor;
processing the bit strings via the digital computer, wherein processing the bit strings via the digital computer includes determining a respective value of the objective function corresponding to each respective bit string via the digital computer; and
programming the quantum processor via a programming subsystem to assign relative probabilities to at least some of the bit strings based on the corresponding objective function values of the respective bit strings; and
in response to finding a bit string that corresponds to an at least approximate minimum value of the objective function:
stopping the iteration; and
returning the found bit string that corresponds to the at least approximate minimum value of the objective function via the digital computer.

38. The method of claim 37 wherein processing the bit strings via the digital computer further comprises:
determining additional bit strings via the digital computer based on at least one of the bit strings from the quantum processor; and
determining a respective value of the objective function corresponding to each respective additional bit string via the digital computer.

39. The method of claim 38 wherein determining additional bit strings via the digital computer based on at least one of the bit strings from the quantum processor includes performing a classical heuristic optimization algorithm to determine at least one additional bit string based on at least one of the bit strings from the quantum processor via the digital computer.

40. The method of claim 39 wherein performing a classical heuristic optimization algorithm to determine at least one additional bit string based on at least one of the bit strings from the quantum processor via the digital computer includes performing at least one of: a local search algorithm, a tabu search algorithm, a simulated annealing algorithm, a path re-linking algorithm, or a genetic algorithm, via the digital computer.

41. The method of claim 38 wherein determining additional bit strings via the digital computer based on at least one of the bit strings from the quantum processor includes determining at least one local bit string from a neighborhood of at least one of the bit strings from the quantum processor via the digital computer.

42. The method of claim 41 wherein each bit string includes N bits and determining at least one local bit string from a neighborhood of at least one of the bit strings from the quantum processor via the digital computer includes determining at least one local bit string from within a Hamming distance of less than or equal to about 0.1 N from at least one of the bit strings from the quantum processor via the digital computer.

43. The method of claim 38 wherein returning the found bit string that corresponds to the at least approximate minimum value of the objective function via the digital computer includes returning a bit string that was determined via the digital computer based on at least one of the bit strings from the quantum processor.

44. The method of claim 37 wherein returning the found bit string that corresponds to the at least approximate minimum value of the objective function via the digital computer includes returning a bit string that was generated via the quantum processor.

45. The method of claim 37 wherein generating bit strings via the quantum processor includes performing at least one of adiabatic quantum computation or quantum annealing via the quantum processor.

46. The method of claim 37 wherein programming the quantum processor via a programming subsystem to assign relative probabilities to at least some of the bit strings based on the corresponding objective function values of the respective bit strings includes at least one of: programming the quantum processor via the programming subsystem to assign a high probability to at least one bit string having a low corresponding objective function value or programming the quantum processor via the programming subsystem to assign a low probability to at least one bit string having a high corresponding objective function value.

47. The method of claim 37 wherein processing the bit strings via the digital computer further comprises:
constructing a model of the objective function via the digital computer; and
evolving the model via the digital computer based at least partially on the value of the objective function corresponding to at least one bit string.

48. A system to at least approximately minimize an objective function, the system comprising:
a quantum processor;
a digital computer; and
a programming subsystem;
wherein until a bit string that corresponds to an at least approximate minimum value of the objective function is found:
the quantum processor generates bit strings;
the digital computer processes the bit strings and determines a respective value of the objective function corresponding to each respective bit string; and
the programming subsystem programs the quantum processor to assign relative probabilities to at least some of the bit strings based on the corresponding objective function values of the respective bit strings; and in response to finding a bit string that corresponds to an at least approximate minimum value of the objective function:
the digital computer returns the found bit string that corresponds to the at least approximate minimum value of the objective function and stops until a new problem is received.

49. The system of claim 48, further comprising:
an evolution subsystem that evolves the quantum processor to generate bit strings; and
a readout subsystem that reads out a bit string from the quantum processor, wherein each bit in the bit string corresponds to a state of a respective qubit in the quantum processor.

50. The hybrid system of claim 49 wherein the quantum processor includes at least a portion of at least one of the programming subsystem, the evolution subsystem, or the readout subsystem.

51. The hybrid system of claim 48 wherein the quantum processor includes a superconducting quantum processor and a plurality of superconducting qubits.

52. A method of using both a quantum processor and a digital computer to at least approximately minimize an objective function having at least one minimum, the method comprising:
operating the quantum processor as a sample generator to provide samples from a probability distribution, wherein a shape of the probability distribution depends on a configuration of a number of programmable parameters for the quantum processor and a number of low-energy states of the quantum processor correspond to a number of high probability samples of the probability distribution;
shaping the probability distribution of the quantum processor to assign high probability to samples from a neighborhood of a minimum of the objective function via the digital computer; and
determining a low-energy sample from the neighborhood of the minimum that at least approximately minimizes the objective function via the digital computer.

53. The method of claim 52, further comprising:
shaping the probability distribution of the quantum processor to assign low probability to samples outside the neighborhood of the minimum of the objective function via the digital computer.

54. The method of claim 52 wherein the at least one minimum of the objective function includes a global minimum of the objective function and at least one local minimum of the objective function, and wherein shaping the probability distribution of the quantum processor to assign high probability to samples from a neighborhood of a minimum of the objective function via the digital computer includes shaping the probability distribution of the quantum processor to assign high probability to samples from a neighborhood of either the global minimum or a local minimum via the digital computer.

55. The method of claim 52 wherein each sample corresponds to a respective bit string having N bits, and wherein shaping the probability distribution of the quantum processor to assign high probability to samples from a neighborhood of a minimum of the objective function via the digital computer includes shaping the probability distribution of the quantum processor to assign high probability to bit strings within a Hamming distance of less than or equal to about 0.1 N of the minimum.

56. The method of claim 52 wherein determining a low-energy sample from the neighborhood of the minimum that at least approximately minimizes the objective function via the digital computer comprises:
determining a respective value of the objective function corresponding to each respective sample via the digital computer; and
returning a sample that at least approximately minimizes the objective function via the digital computer.

57. The method of claim 56 wherein determining a low-energy sample from the neighborhood of the minimum that at least approximately minimizes the objective function via the digital computer further comprises:
determining additional samples via the digital computer based on at least one of the samples from the quantum processor.

58. The method of claim 57 wherein determining additional samples via the digital computer based on at least one of the samples from the quantum processor includes performing a classical heuristic optimization algorithm to determine at least one additional sample based on at least one of the samples from the quantum processor via the digital computer.

59. The method of claim 58 wherein performing a classical heuristic optimization algorithm to determine at least one additional sample based on at least one of the samples from the quantum processor via the digital computer includes performing at least one of: a local search algorithm, a tabu search algorithm, a simulated annealing algorithm, a path re-linking algorithm, or a genetic algorithm, via the digital computer.

60. The method of claim 57 wherein determining additional samples via the digital computer based on at least one of the samples from the quantum processor includes determining at least one local sample from a neighborhood of at least one of the samples from the quantum processor via the digital computer.

61. The method of claim 60 wherein each sample corresponds to a respective bit string having N bits and determining at least one local sample from a neighborhood of at least one of the samples from the quantum processor via the digital computer includes determining at least one local bit string within a Hamming distance of less than or equal to about 0.1 N of at least one of the bit strings from the quantum processor via the digital computer.

62. The method of claim 52 wherein operating the quantum processor as a sample generator includes performing at least one of adiabatic quantum computation or quantum annealing via the quantum processor.

63. The method of claim 52 wherein operating the quantum processor as a sample generator comprises:
programming the quantum processor with the configuration of the number of programmable parameters via a programming subsystem;
evolving the quantum processor via an evolution subsystem; and
reading out a state of the quantum processor via a readout subsystem, wherein the state of the quantum processor corresponds to a sample from the probability distribution.

64. The method of claim 63 wherein shaping the probability distribution of the quantum processor to assign high probability to samples from a neighborhood of a minimum of the objective function via the digital computer includes changing the configuration of the number of programmable parameters for the quantum processor via the digital computer.

65. A system to at least approximately minimize an objective function having at least one minimum, the system comprising:

a quantum processor that provides samples from a probability distribution, wherein a shape of the probability distribution depends on a configuration of a number of programmable parameters for the quantum processor and a number of low-energy states of the quantum processor correspond to a number of high probability samples of the probability distribution; and a digital computer that shapes the probability distribution of the quantum processor to assign high probability to samples from a neighborhood of a minimum of the objective function and determines a low-energy sample from the neighborhood of the minimum that at least approximately minimizes the objective function.

66. The system of claim 65, further comprising:

a programming subsystem that programs the quantum processor with the configuration of the number of programmable parameters;

an evolution subsystem that evolves the quantum processor to provide samples from the probability distribution; and a readout subsystem that reads out a state of the quantum processor, wherein the state of the quantum processor corresponds to a sample from the probability distribution.

67. The system of claim 66 wherein the quantum processor includes at least a portion of at least one of the programming subsystem, the evolution subsystem, or the readout subsystem.

68. The system of claim 65 wherein the quantum processor includes a superconducting quantum processor and a plurality of superconducting qubits.

69. A method of operating a sample generator system that includes at least one quantum processor, at least one digital computer, a programming subsystem, an evolution subsystem, and a readout subsystem to generate samples, the method comprising:

defining a first configuration of a number of programmable parameters for the at least one quantum processor via the at least one digital computer, wherein the first configuration of the number of programmable parameters characterizes a first probability distribution over a set of states of the at least one quantum processor;

programming the at least one quantum processor with the first configuration of the number of programmable parameters via the programming subsystem;

evolving the at least one quantum processor with the first configuration of the number of programmable parameters via the evolution subsystem;

reading out a first state of the at least one quantum processor via the readout subsystem, wherein the first state of the at least one quantum processor corresponds to a first sample from the first probability distribution;

processing the first state via the at least one digital computer;

defining a second configuration of the number of programmable parameters for the at least one quantum processor via the at least one digital computer, wherein the second configuration of the number of programmable parameters characterizes a second probability distribution over the set of states of the at least one quantum processor, and wherein the second configuration of the number of programmable parameters is at least partially based on a result of the processing of the first state via the at least one digital computer;

programming the at least one quantum processor with the second configuration of the number of programmable parameters via the programming subsystem;

evolving the at least one quantum processor with the second configuration of the number of programmable parameters via the evolution subsystem; and reading out a second state of the at least one quantum processor via the readout subsystem, wherein the second state of the at least one quantum processor corresponds to a first sample from the second probability distribution.

70. The method of claim 69 wherein processing the first state via the at least one digital computer includes calculating a property of the first state via the at least one digital computer.

71. The method of claim 70 wherein processing the first state via the at least one digital computer includes inputting the first state into an objective function and determining a corresponding objective function value for the first state via the at least one digital computer.

72. The method of claim 69 wherein processing the first state via the at least one digital computer includes determining at least one additional state based on the first state via the at least one digital computer.

73. The method of claim 72 wherein determining at least one additional state based on the first state via the at least one digital computer includes performing a classical heuristic optimization algorithm to determine at least one additional state based on the first state via the at least one digital computer.

74. The method of claim 73 wherein performing a classical heuristic optimization algorithm to determine at least one additional state based on the first state via the at least one digital computer includes performing at least one of a local search algorithm, a tabu search algorithm, a simulated annealing algorithm, a path re-linking algorithm, or a genetic algorithm, via the at least one digital computer.

75. The method of claim 72 wherein determining at least one additional state based on the first state via the at least one digital computer includes determining at least one local state from a neighborhood of the first state via the at least one digital computer.

76. The method of claim 75 wherein the first state corresponds to a bit string having N bits and determining at least one local state from a neighborhood of the first state via the at least one digital computer includes determining at least one bit string within a Hamming distance of less than or equal to about 0.1 N of the first state via the at least one digital computer.

77. The method of claim 69 wherein evolving the at least one quantum processor with the first configuration of the number of programmable parameters via the evolution subsystem includes performing at least one of adiabatic quantum computation or quantum annealing via the at least one quantum processor, and wherein evolving the at least one quantum processor with the second configuration of the number of programmable parameters via the evolution subsystem includes performing at least one of adiabatic quantum computation or quantum annealing via the at least one quantum processor.

78. The method of claim 69 wherein defining a second configuration of the number of programmable parameters for the at least one quantum processor via the at least one digital computer, the second configuration of the number of programmable parameters which characterizes a second probability distribution over the set of states of the at least one quantum processor, includes defining the second configuration of the number of programmable parameters for the at least one quantum processor such that the second probability distribution assigns higher or lower probability to the first state of the at least one quantum processor.

79. The method of claim 69, further comprising:
processing the second state via the at least one digital computer;
defining a third configuration of the number of programmable parameters for the at least one quantum processor via the at least one digital computer, wherein the third configuration of the number of programmable parameters characterizes a third probability distribution over the set of states of the at least one quantum processor, and wherein the third configuration of the number of programmable parameters is at least partially based on a result of the processing of the second state via the at least one digital computer;
programming the at least one quantum processor with the third configuration of the number of programmable parameters via the programming subsystem;
evolving the at least one quantum processor with the third configuration of the number of programmable parameters via the evolution subsystem; and
reading out a third state of the at least one quantum processor via the readout subsystem, wherein the third state of the at least one quantum processor corresponds to a first sample from the third probability distribution.

80. A sample generator system to generate samples from a probability distribution, the system comprising:
a quantum processor;
a digital computer that defines configurations of a number of programmable parameters for the quantum processor, wherein each configuration of the number of programmable parameters characterizes a respective probability distribution over a set of states of the quantum processor, and processes states of the quantum processor;
a programming subsystem that programs the quantum processor with configurations of the number of programmable parameters;
an evolution subsystem that evolves the quantum processor with configurations of the number of programmable parameters; and
a readout subsystem that reads out states of the quantum processor, wherein each respective state of the quantum processor corresponds to a respective sample from a probability distribution defined by a respective configuration of the number of programmable parameters for the quantum processor.

81. The system of claim 80 wherein the quantum processor includes at least a portion of at least one of the programming subsystem, the evolution subsystem, or the readout subsystem.

82. The system of claim 80 wherein the quantum processor includes a superconducting quantum processor and a plurality of superconducting qubits.

83. A method of operation in a system that includes a quantum processor, a digital computer, and a programming subsystem, to at least approximately minimize an objective function, wherein a probability of the quantum processor outputting a state is inversely related to an energy of the state, the method comprising:
until a state that corresponds to an at least approximate minimum value of the objective function is found, iteratively:
defining a configuration of a number of programmable parameters for the quantum processor via the digital computer, wherein the configuration of the number of programmable parameters characterizes a probability distribution over a set of states of the quantum processor;
programming the quantum processor with the configuration of the number of programmable parameters via the programming subsystem;
generating samples from the probability distribution via the quantum processor, wherein each respective sample corresponds to a respective state of the quantum processor; and
processing the samples from the probability distribution via the digital computer, wherein processing the samples via the digital computer includes determining a respective value of the objective function corresponding to each respective sample via the digital computer; and
in response to finding a state that corresponds to an at least approximate minimum value of the objective function:
stopping the iteration; and
returning the found state that corresponds to the at least approximate minimum value of the objective function via the digital computer.

84. The method of claim 83 wherein processing the samples from the probability distribution via the digital computer further comprises:
determining additional samples via the digital computer based on at least one of the samples from the probability distribution; and
determining a respective value of the objective function corresponding to each respective additional sample via the digital computer.

85. The method of claim 84 wherein determining additional samples via the digital computer based on at least one of the samples from the probability distribution includes performing a classical heuristic optimization algorithm to determine at least one additional sample based on at least one of the samples from the probability distribution via the digital computer.

86. The method of claim 85 wherein performing a classical heuristic optimization algorithm to determine at least one additional sample based on at least one of the samples from the probability distribution via the digital computer includes performing at least one of: a local search algorithm, a tabu search algorithm, a simulated annealing algorithm, a path re-linking algorithm, or a genetic algorithm, via the digital computer.

87. The method of claim 84 wherein determining additional samples via the digital computer based on at least one of the samples from the probability distribution includes determining at least one local sample from a neighborhood of at least one of the samples from the probability distribution via the digital computer.

88. The method of claim 87 wherein each respective sample corresponds to a respective bit string having N bits and determining at least one local sample from a neighborhood of at least one of the samples from the probability distribution via the digital computer includes determining at least one local bit string within a Hamming distance of less than or equal to about 0.1 N of at least one of the samples from the probability distribution via the digital computer.

89. The method of claim 84 wherein returning the found state that corresponds to the at least approximate minimum value of the objective function via the digital computer includes returning a sample that was determined via the digital computer based on at least one of the samples from the probability distribution.

90. The method of claim 83 wherein returning the found state that corresponds to the at least approximate minimum value of the objective function via the digital computer includes returning a sample that was generated via the quantum processor.

91. The method of claim 83 wherein generating samples from the probability distribution via the quantum processor includes performing at least one of adiabatic quantum computation or quantum annealing via the quantum processor.

92. The method of claim 83 wherein the processing of the samples from the probability distribution via the digital computer in an $i^{th}$ iteration influences the defining of a configuration of a number of programmable parameters for the quantum processor via the digital computer in an $(i+1)^{th}$ iteration, where i is an integer greater than zero.

93. The method of claim 92 wherein determining a respective value of the objective function corresponding to each respective sample via the digital computer in the $i^{th}$ iteration includes determining a set of samples with low corresponding objective function values, and wherein the defining of a configuration of a number of programmable parameters for the quantum processor via the digital computer in the $(i+1)^{th}$ iteration includes defining a configuration of the number of programmable parameters for the quantum processor that maps at least one sample from the set of samples with low corresponding objective function values from the $i^{th}$ iteration to a low-energy state of the quantum processor.

94. The method of claim 92 wherein determining a respective value of the objective function corresponding to each respective sample via the digital computer in the $i^{th}$ iteration includes determining a set of samples with high corresponding objective function values, and wherein the defining of a configuration of a number of programmable parameters for the quantum processor via the digital computer in the $(i+1)^{th}$ iteration includes defining a configuration of the number of programmable parameters for the quantum processor that maps at least one sample from the set of samples with high corresponding objective function values from the $i^{th}$ iteration to a high-energy state of the quantum processor.

95. The method of claim 83 wherein the system further includes an evolution subsystem and a readout subsystem, and wherein generating samples from the probability distribution via the quantum processor includes:
evolving the quantum processor via the evolution subsystem; and
reading out a state of the quantum processor via the readout subsystem, wherein the state of the quantum processor corresponds to a sample from the probability distribution.

96. The method of claim 83 wherein processing the samples from the probability distribution via the digital computer further comprises:
constructing a model of the objective function via the digital computer; and
evolving the model via the digital computer based at least partially on the value of the objective function corresponding to at least one sample.

97. A hybrid system to at least approximately minimize an objective function, the hybrid system comprising:
a quantum processor;
a digital computer; and
a programming subsystem;
wherein until a state that corresponds to an at least approximate minimum value of the objective function is found:
the digital computer defines a configuration of a number of programmable parameters for the quantum processor, wherein the configuration of the number of programmable parameters characterizes a probability distribution over a set of states of the quantum processor;
the programming subsystem programs the quantum processor with the configuration of the number of programmable parameters;
the quantum processor generates samples from the probability distribution, wherein each respective sample corresponds to a respective state of the quantum processor; and
the digital computer processes the samples from the probability distribution, by determining a respective value of the objective function corresponding to each respective sample; and
in response to finding a state that corresponds to an at least approximate minimum value of the objective function:
the digital computer returns the found state that corresponds to the at least approximate minimum value of the objective function and stops until a new problem is received.

98. The hybrid system of claim 97, further comprising:
an evolution subsystem that evolves the quantum processor to generate samples from the probability distribution; and
a readout subsystem that reads out a state of the quantum processor, wherein the state of the quantum processor corresponds to a sample from the probability distribution.

99. The hybrid system of claim 98 wherein the quantum processor includes at least a portion of at least one of the programming subsystem, the evolution subsystem, or the readout subsystem.

100. The hybrid system of claim 97 wherein the quantum processor includes a superconducting quantum processor and a plurality of superconducting qubits.

101. A method of operating a hybrid computer system comprising a quantum processor having a plurality of qubits and a digital computer having a digital processor and a nontransitory computer-readable memory communicatively coupled to the digital processor, the method comprising:
defining a function via the digital computer, wherein an input to the function is a bit string indicating binary states of a number of function parameters and an output from the function is a real number value;
determining a bit string that at least approximately minimizes the real number value output from the function, by:
until a bit string that satisfies an exit criterion is found, iteratively:
generating bit strings via the quantum processor, wherein each bit in a bit string corresponds to a state of a respective qubit in the quantum processor;
processing the bit strings generated by the quantum processor via the digital computer, wherein processing the bit strings includes determining a respective real number value output by the function for each bit string via the digital computer; and
in response to finding the bit string that satisfies an exit criterion:
stopping the iteration; and
returning the bit string that satisfies the exit criterion via the digital computer.

102. The method of claim 101 wherein the nontransitory computer-readable memory stores a machine language module to generate programming instructions in the machine language of the quantum processor, and wherein defining a function via the digital computer includes generating programming instructions corresponding to the function in the machine language of the quantum processor via the machine language module.

103. The method of claim 102 wherein the nontransitory computer-readable memory stores an abstraction module to process the function and invoke the machine language module to generate programming instructions that define a configuration of a number of programmable parameters for the quantum processor, and wherein processing the bit strings generated by the quantum processor via the digital computer includes processing the bit strings generated by the quantum processor via the abstraction module.

104. The method of claim 102 wherein the quantum processor includes a programming subsystem, and further comprising:
providing the programming instructions from the machine language module to the programming subsystem.

105. The method of claim of claim 104 wherein the hybrid computer system further comprises a Web server, and wherein providing the programming instructions from the machine language module to the programming subsystem includes providing the programming instructions from the machine language module to the programming subsystem via the Web server.

106. The method of claim 102 wherein the quantum processor includes a programming subsystem, an evolution subsystem, and a readout subsystem, and wherein generating bit strings via the quantum processor comprises:
executing the programming instructions from the machine language module via the programming subsystem;
evolving the quantum processor via the evolution subsystem; and
reading out bit values via the readout subsystem.

107. The method of claim 101 wherein at least one exit criterion includes at least one of: a maximum number of iterations, a maximum allowed computation time, a maximum allowed number of bit strings generated, or a real number value output by the function that is below a specified threshold.

108. The method of claim 101 wherein generating bit strings via the quantum processor comprises performing at least one of adiabatic quantum computation or quantum annealing.

109. The method of claim 101 wherein processing the bit strings generated by the quantum processor via the digital computer further includes:
determining additional bit strings via the digital computer based on at least one of the bit strings from the quantum processor; and
determining a respective real number value output by the function for each respective additional bit string via the digital computer.

110. The method of claim 109 wherein determining additional bit strings via the digital computer based on at least one of the bit strings from the quantum processor includes performing a classical heuristic optimization algorithm to determine at least one additional bit string based on at least one of the bit strings from the quantum processor via the digital computer.

111. The method of claim 110 wherein performing a classical heuristic optimization algorithm to determine at least one additional bit string based on at least one of the bit strings from the quantum processor via the digital computer includes performing at least one of: a local search algorithm, a tabu search algorithm, a simulated annealing algorithm, a path re-linking algorithm, or a genetic algorithm, via the digital computer.

112. The method of claim 109 wherein determining additional bit strings via the digital computer based on at least one of the bit strings from the quantum processor includes determining at least one local bit string from a neighborhood of at least one of the bit strings from the quantum processor via the digital computer.

113. The method of claim 112 wherein each bit string includes N bits and determining at least one local bit string from a neighborhood of at least one of the bit strings from the quantum processor via the digital computer includes determining at least one local bit string within a Hamming distance of less than or equal to about 0.1 N of at least one of the bit strings from the quantum processor via the digital computer.

114. The method of claim 101 wherein processing the bit strings generated by the quantum processor via the digital computer further includes:
constructing a model of the function via the digital computer; and
evolving the model via the digital computer based at least partially on the real number value output by the function for at least one bit string.

115. A hybrid computer system comprising:
a quantum processor comprising:
a plurality of programmable elements;
a programming subsystem that receives programming instructions in a machine language of the quantum processor and executes the programming instructions to program the programmable elements in accordance with the programming instructions; and
a digital computer including a digital processor and a computer-readable memory communicatively coupled to the digital processor that stores a set of modules, each of the modules including a respective set of instructions executable by the digital processor to cause the digital processor to interact with the quantum processor, wherein the set of modules comprises:
a machine language module that generates programming instructions in the machine language of the quantum processor for execution by the programming subsystem of the quantum processor; and
an abstraction module that processes an objective function to be minimized via the quantum processor and invokes the machine language module that generates programming instructions for the programming subsystem that define a configuration of programmable parameters for the programmable elements of the quantum processor.

116. The hybrid computer system of claim 115, further comprising:
a Web server that provides a Web interface between the quantum processor and the machine language module of the digital computer.

117. The hybrid computer system of claim 115 wherein the quantum processor includes a superconducting quantum processor and the plurality of programmable elements includes a plurality of superconducting qubits.

118. The hybrid computer system of claim 117 wherein the plurality of programmable elements further includes a plurality of coupling devices to provide communicative coupling between qubits.

119. The hybrid computer system of claim 115 wherein the machine language module generates programming instructions in the machine language of the quantum processor for execution by the programming subsystem of the quantum processor via manual input of instructions by a user.

120. The hybrid computer system of claim 115 wherein the machine language module generates programming instructions in the machine language of the quantum processor for execution by the programming subsystem of the quantum processor automatically in response to an invocation by the abstraction module.

121. The hybrid computer system of claim 115 wherein the abstraction module processes an objective function to be minimized via the quantum processor via manual input of instructions by a user.

122. The hybrid computer system of claim 115 wherein the set of modules further comprises:
    a client library module that generates, stores, and executes a program via at least one high-level programming language, the program including at least one objective function to be minimized via the quantum processor.

123. The hybrid computer system of claim 122 wherein the client library module includes a plurality of client libraries and the at least one high-level programming language includes at least one of C, C++, Python, SQL, JAVA, LISP and MATLAB.

124. The hybrid computer system of claim 122 wherein the abstraction module processes an objective function to be minimized via the quantum processor automatically in response to an invocation by the client library module.

125. The hybrid computer system of claim 122 wherein the set of modules further comprises:
    an algorithm module that generates, stores, and executes an algorithm and invoke the client library module to execute a program, wherein the algorithm includes at least one objective function to be minimized via the quantum processor.

126. The hybrid computer system of claim 125 wherein the algorithm generated, stored, and executed by the algorithm module includes at least one of supervised binary classification, supervised multiple label assignment, or unsupervised feature learning.

127. The hybrid computer system of claim 125 wherein the set of modules further comprises:
    an application module that generates, stores, and executes an end-use application and invokes the algorithm module that executes an algorithm, wherein the end-use application includes at least one objective function to be minimized via the quantum processor.

\* \* \* \* \*